United States Patent [19]
Bache

[11] Patent Number: 4,588,443
[45] Date of Patent: May 13, 1986

[54] SHAPED ARTICLE AND COMPOSITE MATERIAL AND METHOD FOR PRODUCING SAME

[75] Inventor: Hans H. Bache, Hjallerup, Denmark

[73] Assignee: Aktieselskabet Aalborg Pottland-Cement-Fabrik, Aalborg, Denmark

[21] Appl. No.: 336,380

[22] PCT Filed: May 1, 1981

[86] PCT No.: PCT/DK81/00048
§ 371 Date: Dec. 30, 1981
§ 102(e) Date: Dec. 30, 1981

[87] PCT Pub. No.: WO81/03170
PCT Pub. Date: Nov. 12, 1981

[30] Foreign Application Priority Data

May 1, 1980 [DK] Denmark ............ 1945/80
Feb. 6, 1981 [DK] Denmark ............ 538/81
Feb. 27, 1981 [DK] Denmark ............ 907/81

[51] Int. Cl.$^4$ .............. B32B 13/00; C04B 15/00; C04B 31/00
[52] U.S. Cl. ............ 106/97; 106/89; 106/90; 106/98
[58] Field of Search ............ 106/90, 98, 89, 97

[56] References Cited
U.S. PATENT DOCUMENTS

| | | | |
|---|---|---|---|
| 2,410,954 | 11/1946 | Sharp | 106/98 |
| 3,880,664 | 4/1975 | Schulze | 106/98 |
| 4,046,583 | 9/1977 | Collepardi | 106/90 |
| 4,111,711 | 9/1978 | Kiehl et al. | 106/98 |
| 4,118,242 | 10/1978 | Kjohl et al. | 106/98 |
| 4,255,195 | 3/1981 | Holter et al. | 106/98 |

*Primary Examiner*—Mark L. Bell
*Attorney, Agent, or Firm*—Stiefel, Gross, Kurland & Pavane

[57] ABSTRACT

Densified systems and articles made therefrom which contain a composite material comprising a coherent matrix of homogeneously arranged inorganic particles (A) of a size of from about 50 Å to about 0.5 $\mu$, such as silica dust, and densely packed particles (B) having a size of from 0.5–100 $\mu$ such as Portland Cement and which are at least one order of magnitude larger than the particles A, and embedded in the matrix, solid particles C made from material having a strength exceeding that of ordinary sand and stone used for ordinary concrete, such as refractory grade bauxite and a surface active dispersing agent. Particles A are homogeneously distributed and especially densely packed, in the void volume between the particles B and are made from an easily flowable composite material containing a very low amount of liquid such as water and an extremely high amount of a dispersing agent such as a concrete superplastisizer. High quality concrete made from a Portland Cement/silica dust matrix with refractory grade bauxite embedded therein exhibits high compressive strength and may be used as a replacement for plastic, glass and steel. High performance fiber/metal matrix composites with substantially improved compressive strength and abrasion resistance are produced.

61 Claims, 76 Drawing Figures

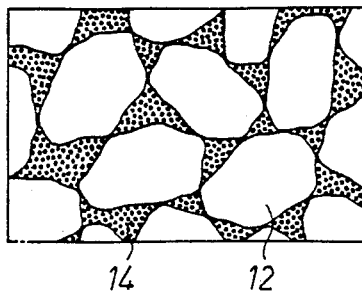
Fig. 1.
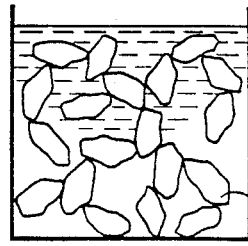
Fig. 6.
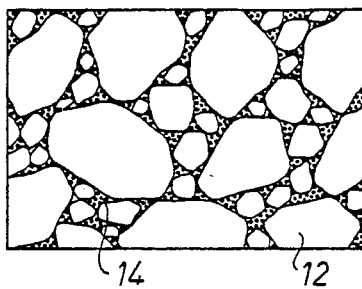
Fig. 2.
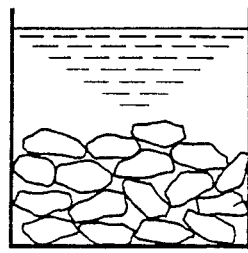
Fig. 7.
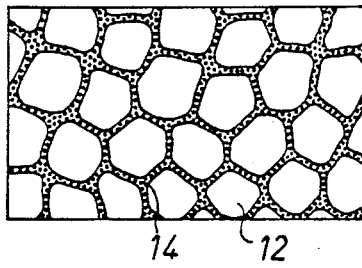
Fig. 3.
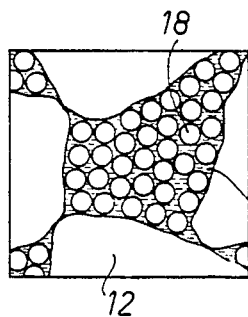
Fig. 8.
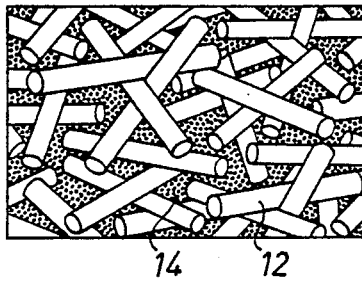
Fig. 4.
Fig. 9.
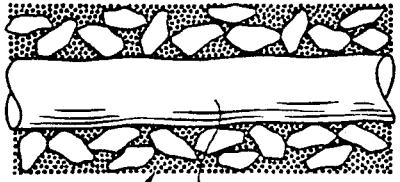
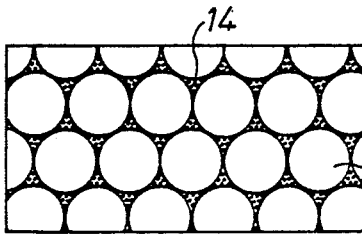
Fig. 5.
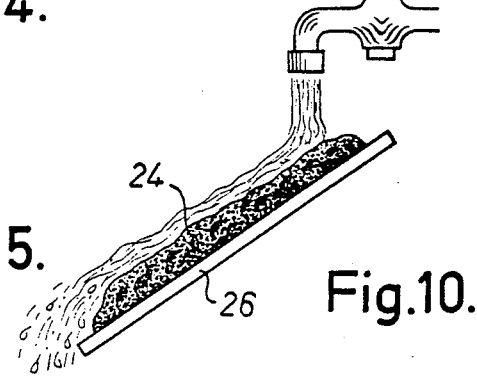
Fig. 10.

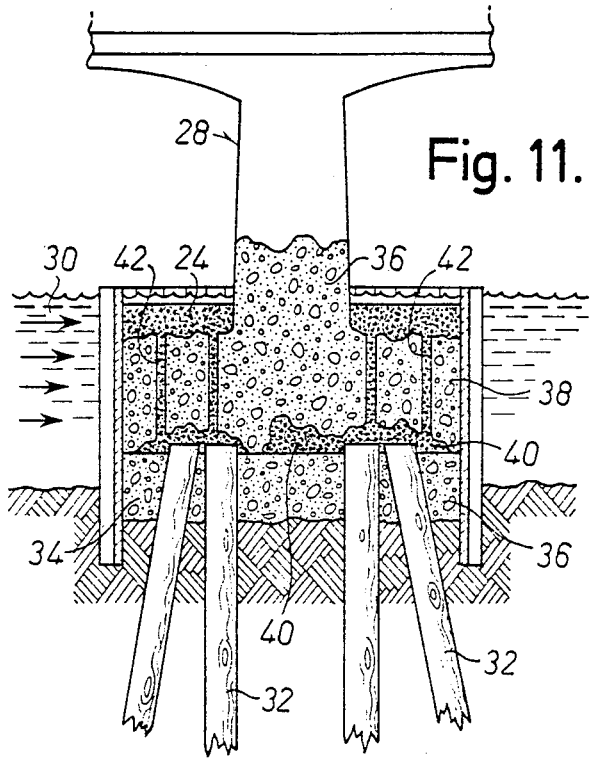
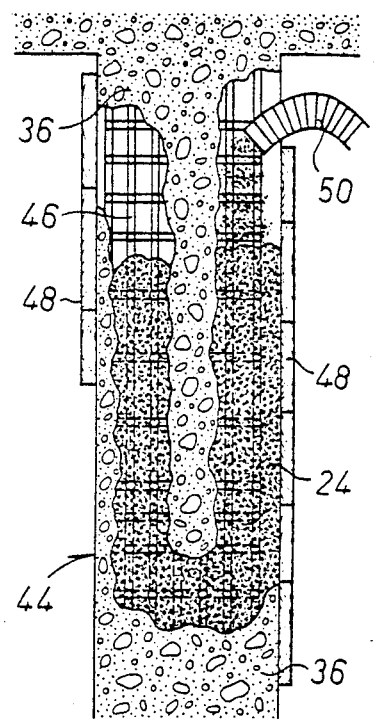
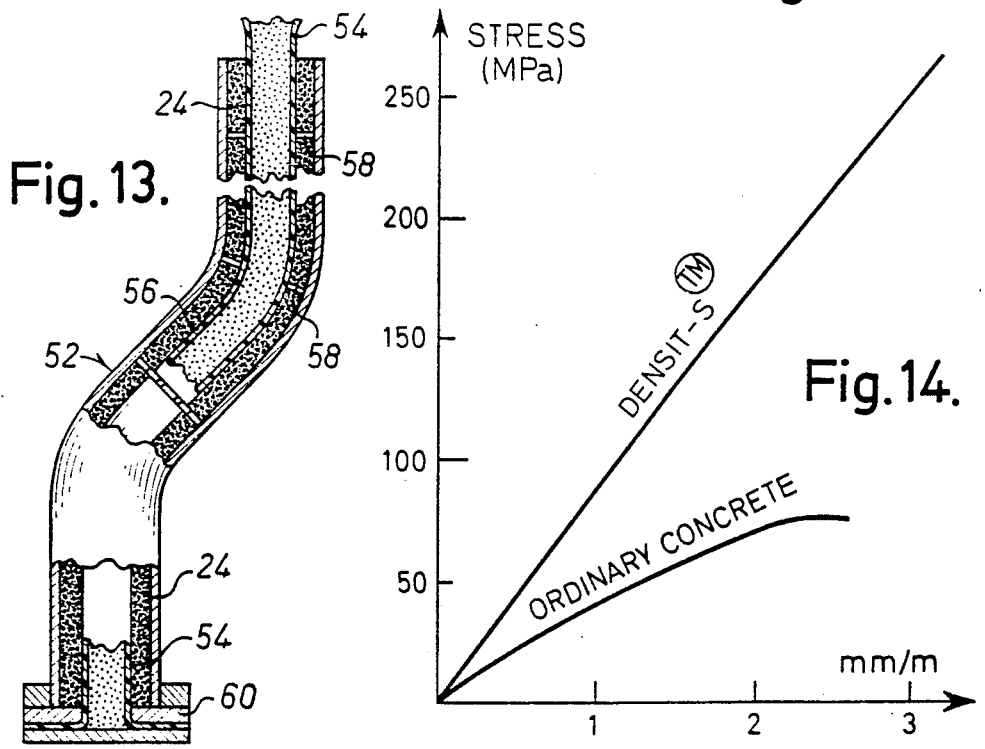

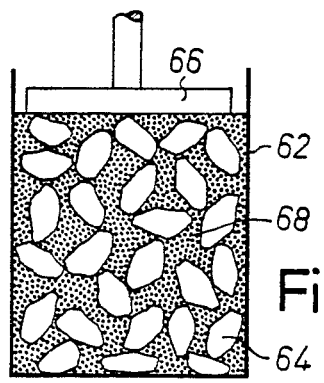
Fig. 15.
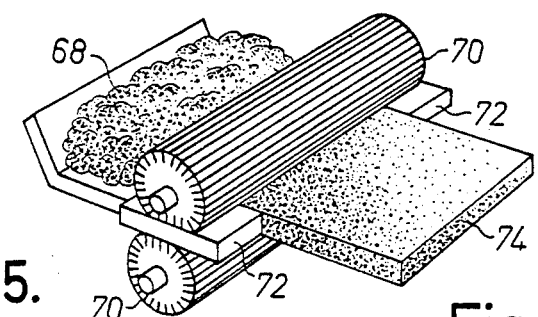
Fig. 18.
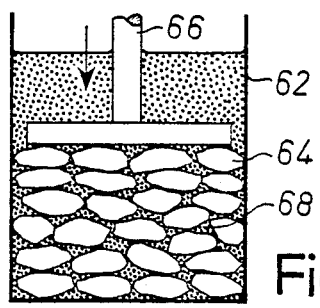
Fig. 16.
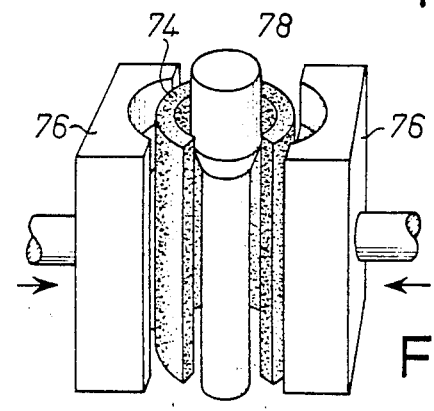
Fig. 19.
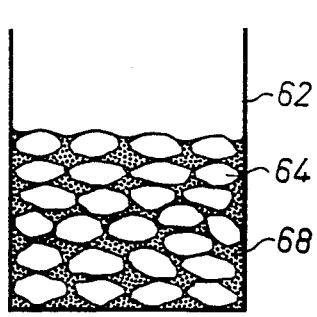
Fig. 17.
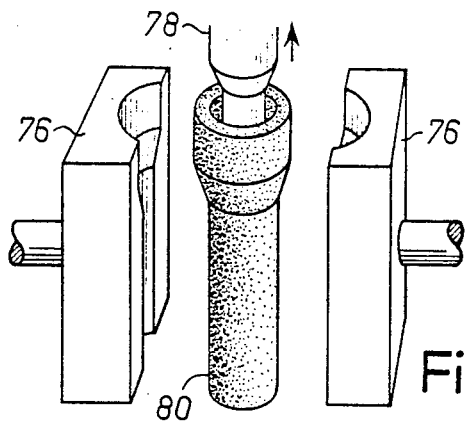
Fig. 20.
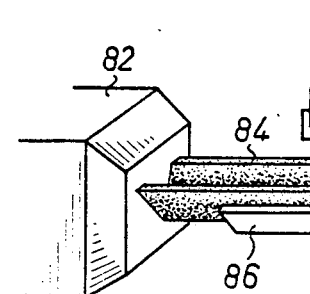
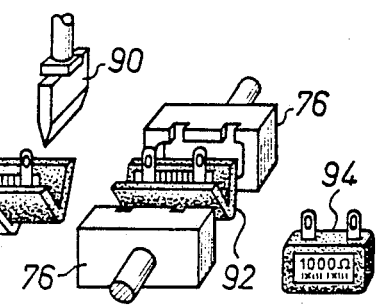
Fig. 21.

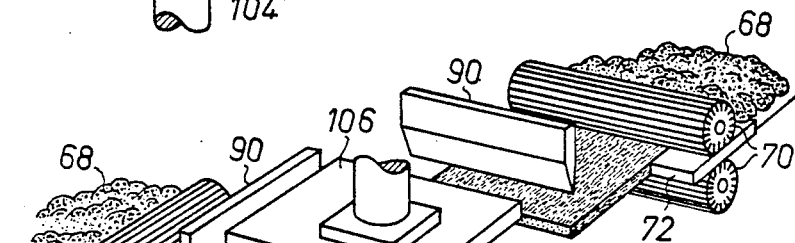
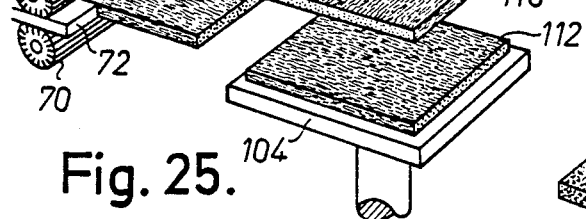
Fig. 25.

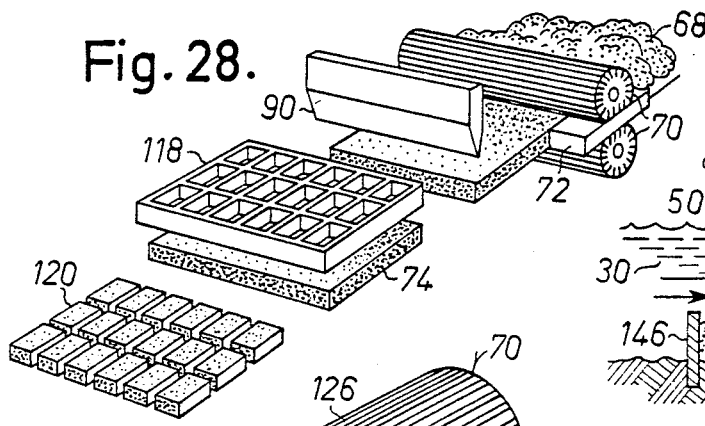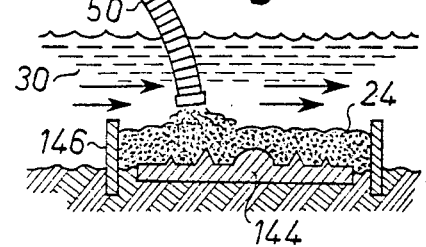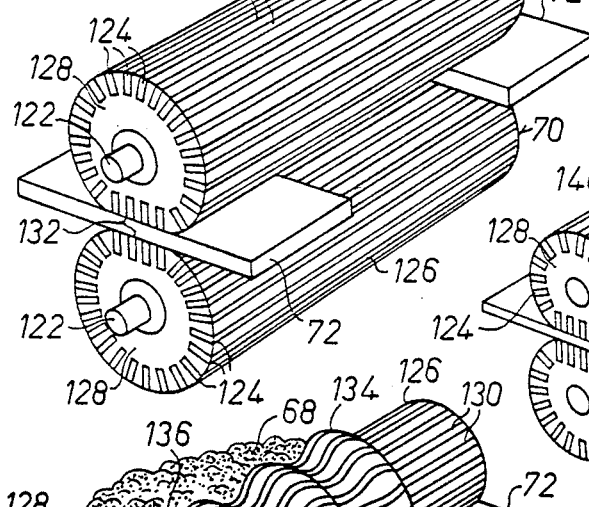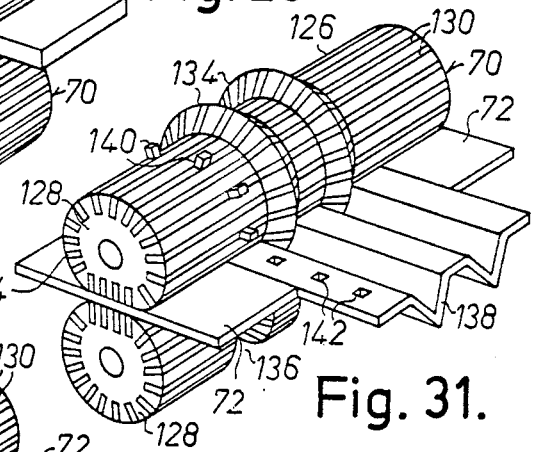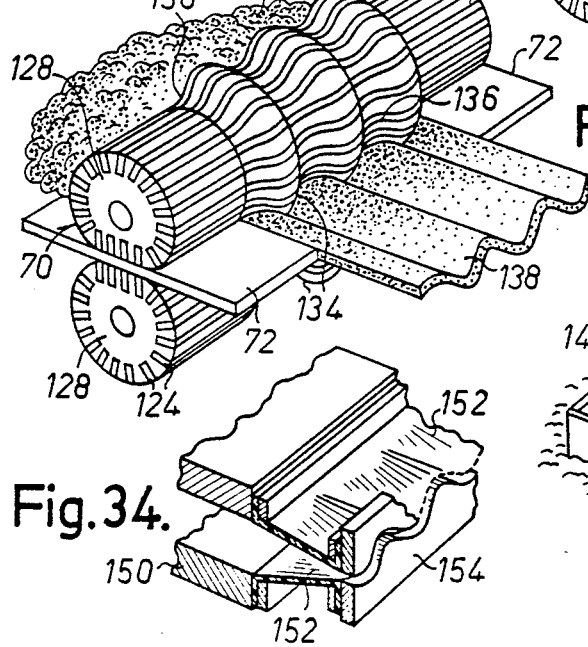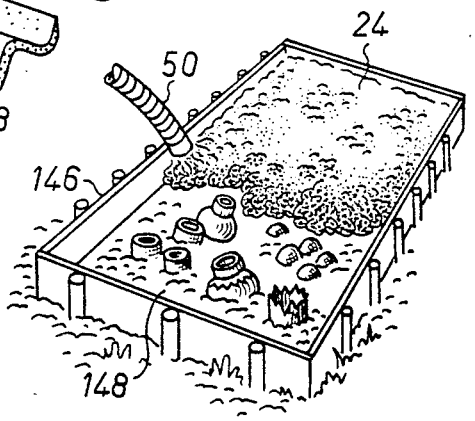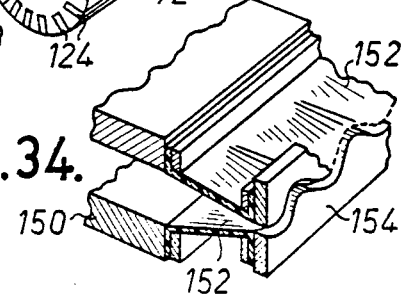

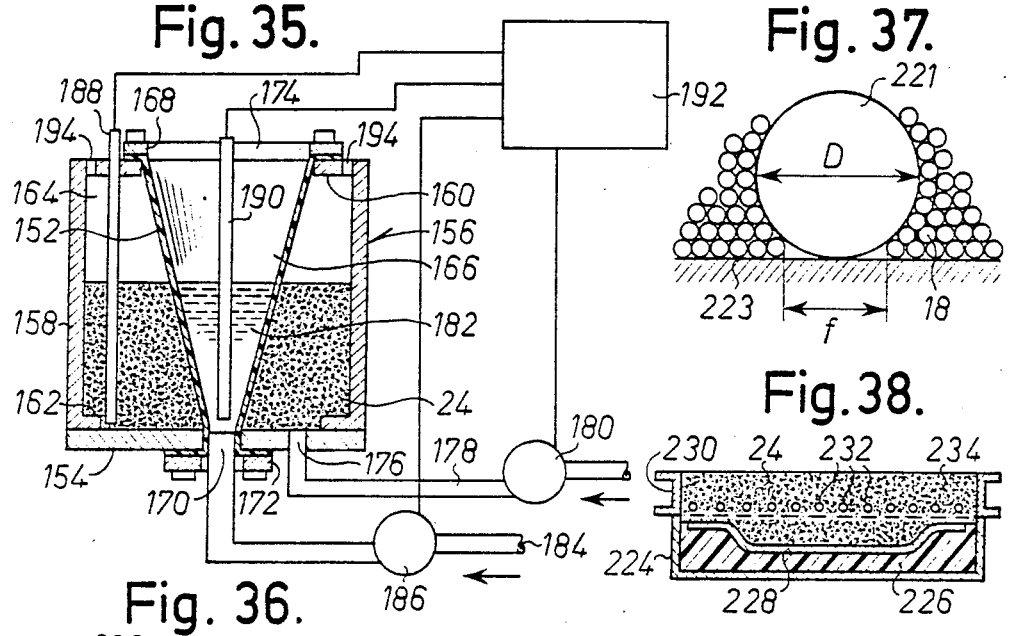
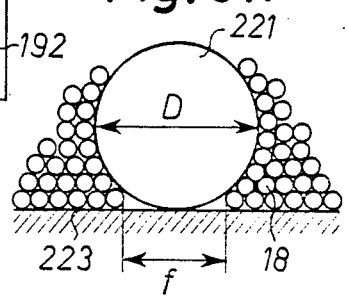
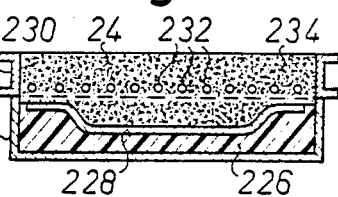
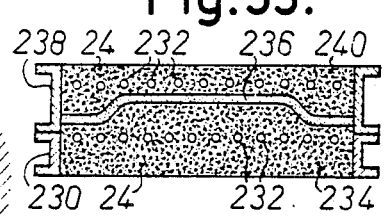
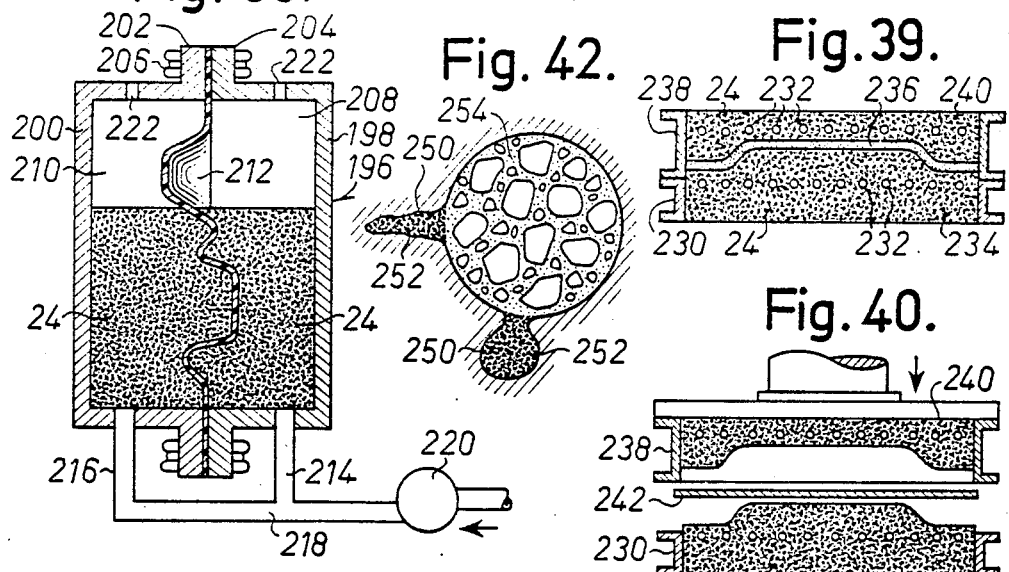
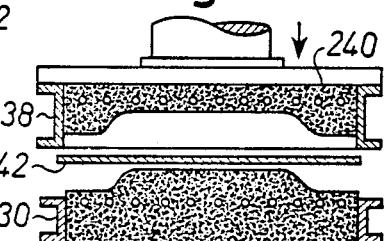
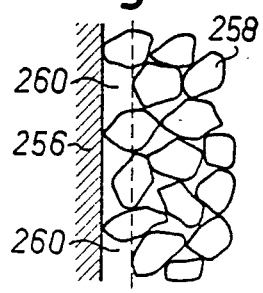
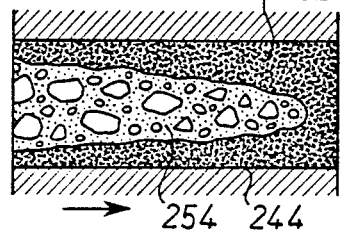
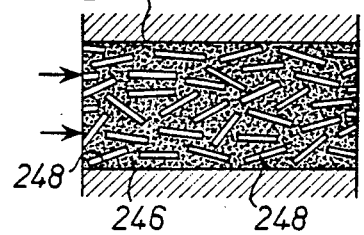

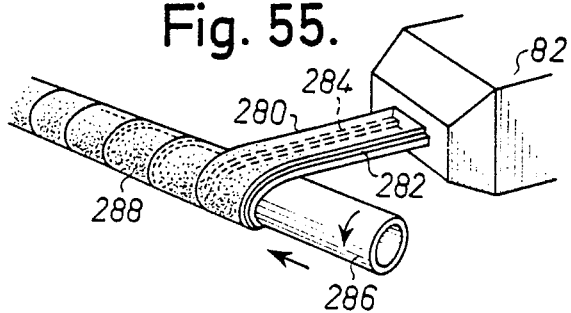
Fig. 55.
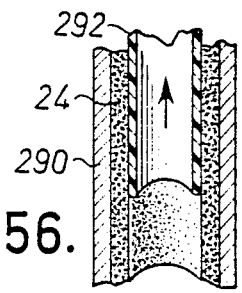
Fig. 56.
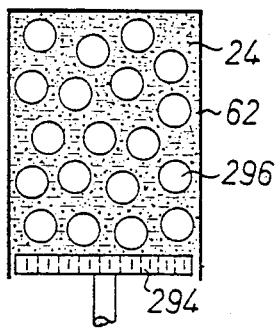
Fig. 57.
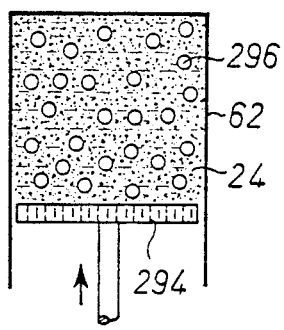
Fig. 58.
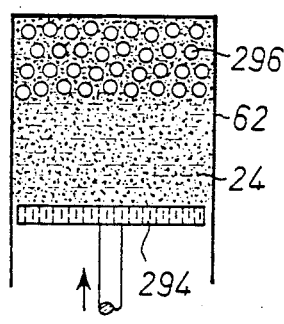
Fig. 59.
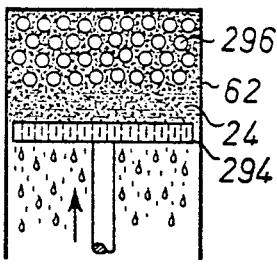
Fig. 60.
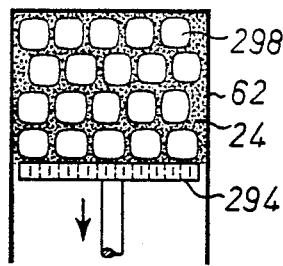
Fig. 61.
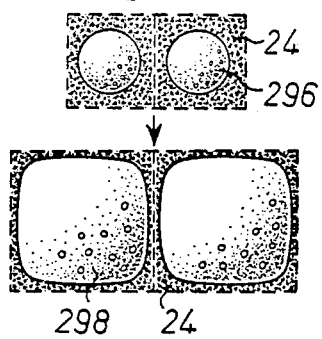
Fig. 62.
Fig. 63. Fig. 64.
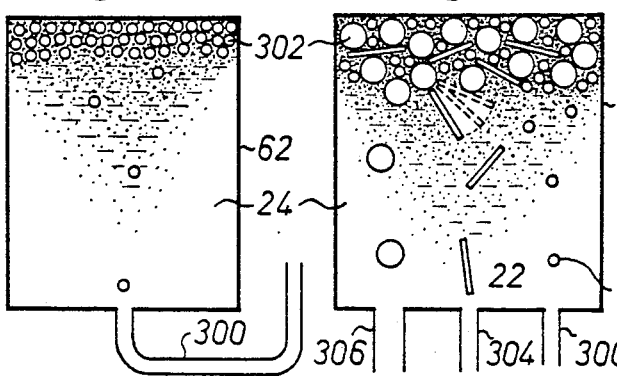
Fig. 65.
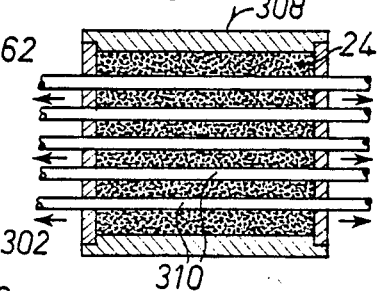

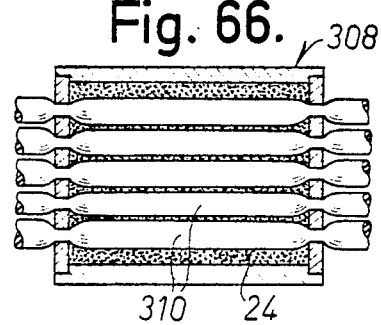
Fig. 66.
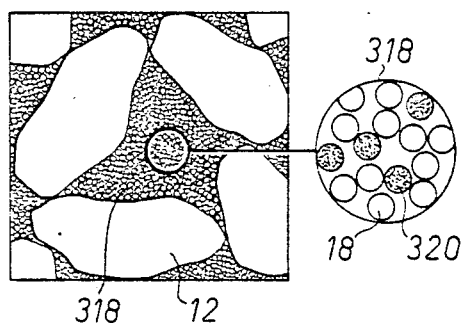
Fig. 67.
Fig. 68.
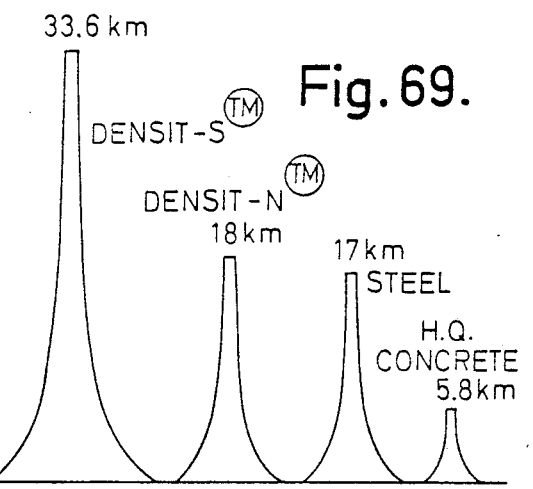
Fig. 69.
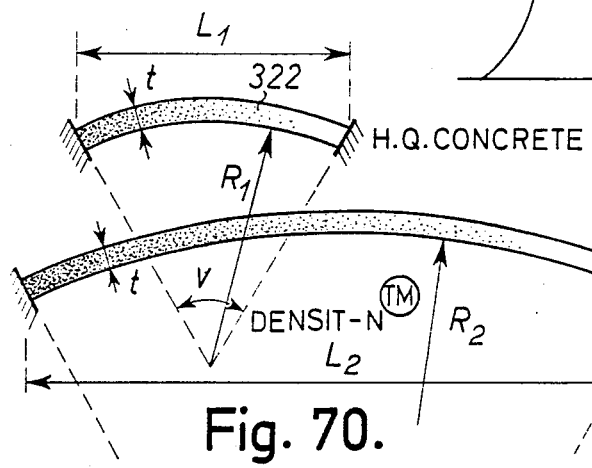
Fig. 70.
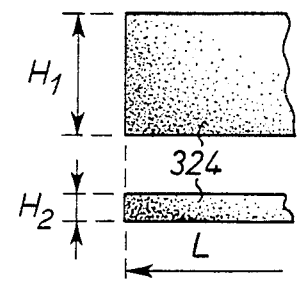
Fig. 71.
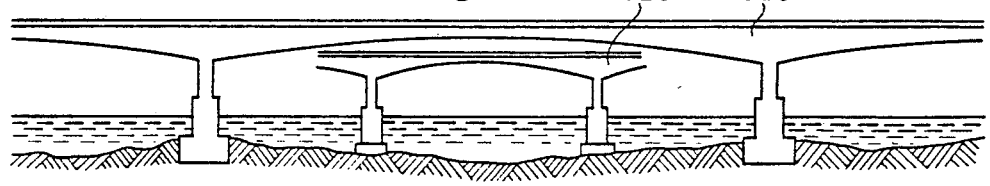
Fig. 72.

SHAPED ARTICLE AND COMPOSITE MATERIAL AND METHOD FOR PRODUCING SAME

CROSS-REFERENCE TO RELATED APPLICATIONS

This application is a national phase of International Patent Application No. PCT/DK81/0048 filed on May 1, 1981, and is a continuation in part of U.S. Appln. Ser. No. 195,422 filed on June 24, 1980 and now abandoned, which application was a national phase of International Patent Application No. PCT/DK/0047 filed on Nov. 2, 1979.

BACKGROUND OF THE INVENTION

FIELD OF THE INVENTION

The present invention relates generally to a new class of material, not limited to cement systems, wherein the fundamental principle comprises the utilization of known geometric and kinematic principles for arrangement of larger bodies or particles in desired configuration relative to each other, in particular dense packing, in systems of fine particles or bodies which are 1-2 orders of magnitude finer than the body or particle systems in which they are embedded. By means of a dispersing agent, the locking surface forces between adjacent bodies which hitherto prevented the dense arrangement of bodies or particles of micro or submicro size are overcome. The application of these principles permits the production of a variety of new materials of hitherto unknown high quality such as high performance fiber/metal matrix composites, whereby the compressive strength and abrasion resistance of the metal matrix is substantially improved by the introduction of submicro particles.

In particular, the present invention relates to densified systems, shaped articles made therefrom and processes for making the same, whereby the densified system is composed of a coherent matrix in which ultrafine inorganic solid particles of a size of from about 50 Å to about 0.5µ are homogeneously arranged in the void volume between densely packed solid particles having a size of the order of 0.5-100µ and which are at least one order of magnitude larger than the respective ultrafine particles and a surface active dispersing agent which is effective to secure the homogeneous distribution of the ultrafine particles and which is present in an amount sufficient to secure the homogeneous distribution of such particles. Additionally embedded in the matrix are compact-shaped solid particles of a material having a strength which exceeds that of ordinary sand and stone used for ordinary concrete.

SUMMARY OF THE INVENTION

GENERAL PRINCIPLES

Densified Systems containing homogeneously arranged ultrafine Particles, for brevity termed DSP in the following specification and claims, were described and defined in detail for the first time in International Patent Application No. PCT/DK79/00047. The present invention relates to important further developments of the DSP systems, including new types of DSP systems and new materials within previously described types of DSP systems, new techniques for establishing DSP systems, and new applications of DSP systems.

DSP systems give rise to hitherto unattainable mechanical qualities, including strength, density, and durability, of materials and articles based on such systems and make it possible to establish such articles and materials by advantageous novel methods which broaden the possibilities of establishing advanced microstructures of constructional materials for a great variety of applications.

In a very brief form, the basic principle of DSP systems comprises placing ultrafine bodies or particles having a size of from about 50 Å to about 0.5 µm in homogeneous arrangement in the void between substantially densely packed bodies or particles having a size of from about 0.5 µm to about 100 µm and being at least one order of magnitude (power of 10) larger than the respective ultrafine particles. Some essential characteristics of the DSP systems are contained in the following five points:

1. DSP systems utilize known geometric and kinematic principles for mutual arrangement of bodies, especially particles, in desired configuration—in particular in very dense arrangement—in systems of fine particles or bodies which are 1-2 orders of magnitude finer than the systems in which it has so far been possible to benefit from known particle geometry strategy. The DSP systems overcome the locking surface forces between adjacent bodies which hitherto have prevented bodies or particles of colloid size from being arranged in a desired dense configuration.

2. In spite of the fine bodies or particles involved in the DSP systems, DSP materials may be shaped in a substantially low stress field. This has been made possible by advanced utilization of dispersing agents (e.g., in the cement system, by use of a large amount (1-4% by weight of a concrete superplasticizer which is up to one order of magnitude more than what was used in the known art).

3. In the DSP materials, strength and durability are very much increased. In addition to this, mechanical fixation of reinforcing bodies, e.g. fine incorporated fibers, is increased even more than the strength, the increase being one or several orders of magnitude. This is due to the fact that the dimensions of roughness and wave configuration on the reinforcing bodies which are necessary for obtaining "mechanical locking" of the reinforcing bodies in the matrix, are lowered by 1-2 orders of magnitude. This makes it possible to obtain "mechanical locking" of fibers which are one to two orders of magnitude finer than the fibers which could hitherto be "mechanically locked".

4. According to an aspect of the present invention, the quality (primarily strength and rigidity) of the DSP materials may be further increased by incorporating very strong additional particles (e.g., sand and stone of refractory grade bauxite for incorporation in Portland cement-based DSP materials).

5. Typical DSP materials are materials which may be shaped from a mass with plastic to low viscous consistency by simple shear deformation without any exchange of material with the environments, which means that no liquid will be or has to be moved or squeezed out of the mass during the formation of the dense structure. This makes it possible to prepare high quality products of much more complicated shape and larger size than hitherto—and makes it possible to obtain anchoring of components, especially reinforcing bodies of any kind, which could not satisfactorily (or which could not at all) be introduced in corresponding high quality matrices prepared in the traditional manner. This aspect of the DSP materials also opens the possibility of new and more advantageous production techniques for known articles.

In the present context, the terms "bodies" and "particles" refer to domains with physical boundaries, the term "physical" referring to specific properties, e.g., mechanical, electrical, optical, or chemical properties.

STRUCTURE OF THE DSP MATRIX

Shaped articles comprising a DSP matrix may be defined in general as shaped articles comprising a coherent matrix, the matrix comprising
(A) homogeneously arranged bodies or particles of a size of from about 50 Å to about 0.5 μm, or a coherent structure formed from such homogeneously arranged bodies or particles, and
(B) densely packed bodies or particles having a size of the order of 0.5–100 μm and being at least one order of magnitude larger than the respective particles stated under (A), or a coherent structure formed from such densely packed particles,
the bodies or particles (A) or the coherent structure formed therefrom being homogeneously distributed in the void volume between the bodies or particles (B),
the dense packing being substantially a packing corresponding to the one obtainable by gentle mechanical influence on a system of geometrically equally shaped large bodies or particles in which locking surface forces do not have any significant effect,
and an inter-particle substance (I) in the space between the bodies or particles A and B or the structure formed by the bodies or particles A and B.

The bodies or particles A and B are typically solid bodies or particles, but they may also be gas phase or liquid phase bodies or particles. Likewise, the inter-particle substance I may be solid, or it may be a gas phase or liquid phase substance, provided that when the inter-particle substance in a shaped DSP article is not solid, the necessary "gluing" to retain the shape of the article is provided by particle-to-particle bonding.

Thus, the substantially coherent structure of the matrix of the above-defined DSP articles may be due to the homogeneously arranged or densely packed bodies or particles A being combined with each other to form a coherent structure, or due to solid particles B as stated above being combined with each other to form a substantially coherent structure, or both the ultra fine particles A and the particles B in the shaped articles may each be combined with each other to form coherent structures, and/or particles A being combined with particles B to form the coherent structure. The combination between the particles A or between the particles B or between particles A and/or particles B may be of any character which results in a coherent structure. In systems comprising cement particles as particles B and silica dust particles (as defined below) as particles A the coherent structure is formed due to partial dissolution of the solid particles in the aqueous suspension from which the articles are made, chemical reaction in the solution, and precipitation of the reaction product, the silica dust being less reactive in this regard than the cement. In this connection it is noted that depending on the identity of the particles A and B, also other mechanisms imparting coherence may have been responsible for the coherence of the matrix, such as melting or sintering, etc. The chemical reaction mentioned above may be one which takes place between the particles A or their dissolved constituents, or between the particles B or their dissolved constituents, or between particles A and B or between constituents of particles A and particles B.

A substantially coherent structure may also be established by solidification of other inter-particle substance, e.g., by solidification of a melt or liquid, such as physical solidification, including solidification of a metal or glass melt, and chemical solidification, including polymerisation, e.g. to form a plastics substance.

Shaped articles comprising a matrix having a substantially coherent structure comprising homogeneously arranged or densely packed particles A together with densely packed particles of Portland cement were obtainable in the known art only by compaction in a high stress field, typically by high pressure powder compaction. Hence, one very interesting class of shaped DSP articles comprises shaped articles produced by shaping in a low stress field of less than 5 kg/cm$^2$, preferably less than 100 g/cm$^2$, and having a matrix of a substantially coherent structure comprising homogeneously arranged or densely packed particles A or a coherent structure formed from such homogeneously arranged or densely packed particles A, and densely packed particles B, at least 20% by weight of the densely packed particles B being Portland cement particles, or a coherent structure formed from such densely packed particles B. Another way of defining the class of shaped DSP articles having homogeneous arrangement of particles A between densely packed particles B of which at least 20% by weight are Portland cement particles is by referring to the dimensions of the article. Such articles having a correspondingly dense packing between the particles B and having at least one dimension of at least 1 m and a minimum cross section of at least 0.1 m$^2$ are not believed to have been made in practice, prior to the invention of the DSP systems, by high pressure powder compaction technique. Another way of expressing this kind of DSP article is by defining that the articles have a complex shape that does not permit its establishment through powder compaction. Finally, when the particles B have a molecular structure different from the particles A, such as will most often be the case in practice, such structures in which at least 20% by weight of particles B are Portland cement and which otherwise comply with the definition stated above, could not have been made using traditional techniques irrespective of the size or shape of the structures. While it may have been possible in powder compaction techniques to obtain a combination of the two systems comprising homogeneously arranged or densely packed particles A and densely packed particles B, this would have involved crushing of the larger particles during the compaction process to result in the smaller particles and hence, would have meant that the larger particles and the smaller particles would have identical molecular structure.

One very interesting feature of the DSP materials is that it is possible to establish structures of the types discussed above with inherently weak particles and inherently weak additional bodies which would have lost their geometric identity (would have been crushed or drastically deformed) by the known art treatment in a high stress field. This makes it possible to establish dense structures with materials not previously available therefor.

BRIEF DESCRIPTION OF THE DRAWINGS

FIGS. 1, 2, 3, 4 and 5 are enlarged sectional views illustrating various DSP systems comprising densely packed bodies;

FIG. 3 is an enlarged partially sectional view illustrating a DSP system comprising densely packed compressible bodies;

FIGS. 6 and 7 are enlarged sectional views illustrating the behaviour of cement particles in normal concrete;

FIG. 8 is a further enlarged sectional view illustrating cement particles in DSP;

FIG. 9 is an enlarged sectional view illustrating anchoring of a reinforcing fiber in a DSP matrix;

FIG. 10 is a sectional view illustrating the internal coherence of a DSP paste and its resistance to being entrained with flowing water;

FIG. 11 is a sectional view illustrating the use of DSP in practice for an otherwise difficult repair of a concrete structure under streaming water;

FIG. 12 is a sectional view illustrating the utilization of DSP in practice for repair of a concrete wall where there was only unilateral admission for introduction of the repair material;

FIG. 13 is a sectional view illustrating the utilization of the easy flowing properties of DSP for establishing an internal DSP coating in a curved tube;

FIG. 14 is a stress-strain diagram for ordinary high strength concrete and DSP containing refractory grade bauxite, respectively;

FIGS. 15 through 17 are sectional views illustrating drained compression;

FIG. 18 is a perspective view illustrating the production of a panel-shaped body which may optionally be subjected to further shaping;

FIGS. 19 and 20 are perspective views illustrating the shaping of a tube section from a panel-shaped body;

FIG. 21 is a perspective view illustrating the utilization of extrusion in the production of DSP-encapsulated electrical components;

FIG. 25 is a perspective view illustrating the production of a sandwich element from two sheets rolled fiber reinforced material where the fiber orientation of one layer in the sandwich is perpendicular to the fiber orientation in the other layer;

FIG. 28 is a perspective view illustrating the mass production of tiles or bricks or the like from a sheet of DSP;

FIG. 29 is a perspective view illustrating a roller for rolling DSP;

FIG. 30 is a perspective view illustrating the production of corrugated roof panels from DSP using a specially shaped roller;

FIG. 31 is a perspective view illustrating the production of a wall or roof panel from a DSP material, also using a specially shaped roller;

FIG. 32 is a sectional view illustrating underwater reproduction casting of DSP under streaming water;

FIG. 33 is a perspective view illustrating reproduction casting of, e.g., a complete area comprising archeological objects;

FIG. 34 is a perspective view illustrating the molding of an extruder die;

FIGS. 35 and 36 are sectional views illustrating the molding system for preparing bodies of fluid DSP;

FIG. 37 is a sectional view illustrating a material comprising small particles packed against larger bodies;

FIGS. 38–40 are sectional views illustrating a tool for shaping of steel panels, e.g. for automobile body parts, both the matrix part and the patrix part of the tool being made from high compressive strength DSP material;

FIG. 41 is a sectional view illustrating the injection of a DSP paste containing fibers orientated substantially in the direction of movement;

FIG. 42 is a cross-sectional view of a channel with connected fisures and cavities into which a fine DSP material has been pre-injected and has penetrated into and filled the fissures and cavities, whereafter the fine DSP grout has been replaced with coarse DSP which has replaced the fine DSP and now fills the bulk of the cavity;

FIG. 43 is a sectional view illustrating the wall effect, the packing density of the particles in the narrow zone near the wall being smaller than in the bulk, in the interface between a wall and normal concrete;

FIG. 44 is a sectional view illustrating an injection into a channel of first fine DSP grout, and thereafter a coarse DSP grout;

FIG. 55 is a perspective view illustrating surface coating of an article by applying a layer of fiber-supported extruded DSP on the article;

FIG. 56 is a sectional view illustrating the application of a DSP coating on the interior surface of a tube;

FIGS. 57 through 61 are sectional views illustrating the principle of preparing high quality foam;

FIG. 62 is an enlarged section illustrating the principle of the high quality foam preparation shown in FIGS. 57 through 61;

FIGS. 63 and 64 are sectional views illustrating the prepartion of a high quality foam material;

FIGS. 65 and 66 are sectional views illustrating the preparation of a material having longitudinal cavities by casting in a cavity wherein elastic bands are suspended at high tension and are thereafter released to establish densely packed parallel pores;

FIG. 67 is a sectional view illustrating the winding of an elastic material under tension and submerged in a slurry of ultrafine particles to establish a structure which may be additionally densified by releasing the tension, the structure establishing densely packed parallel pores when the elastic material is removed after setting of the slurry;

FIG. 68 is a sectional view illustrating the utilization of special ultrafine particles to increase the quality of the system constituted by the bodies A;

FIG. 69 is a diagram which illustrates the possible maximum size of ideally shaped tall buildings made from high quality concrete, structural steel, normal DSP, and high quality DSP, respectively;

FIG. 70 illustrates the span of an arc-curved bending member possible with high quality concrete and with normal DSP, respectively;

FIG. 71 illustrate the relation between the necessary thicknesses of a bending member of high quality concrete and a bending member of the same length made in high quality DSP, respectively, the bending members being loaded with their own weight;

FIG. 72 is a sectional view illustrating a bridge construction with dimensions made possible by the use of high quality DSP, compared to the dimensions possible with ordinary high quality concrete;

DESCRIPTION OF THE PREFERRED EMBODIMENTS

Figure 22:
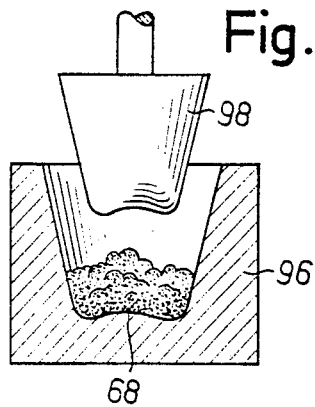
FIGS. 22 and 23 are sectional views illustrating the use of DSP for compression moulding like a plastics material.

In most cases, the most valuable strength properties are obtainable when both particles A and particles B are densely packed. This situation is illustrated in FIG. 1 in International Patent Application No. PCT/DK79/00047 which shows the principles of the geometrical arrangement involving dense packing in fresh DSP paste consisting of Portland cement particles and ultra fine particles between the Portland cement particles. With reference to tests made with mortar, fiber-reinforced paste and concrete based on this novel matrix, the Portland cement particles (average dimension 10 μm) were arranged in a dense packing corresponding to a volume fraction of cement (volume of Portland cement divided by total volume) of 0.43–0.52. If ordinary cement paste—not containing ultra fine particles—had been arranged in the same dense packing, it would correspond to a water/cement weight ratio of 0.42 to 0.30. This would normally be claimed to be densely packed. In the DSP material, it has been found possible to incorporate further up to 50% by volume of ultra fine solid particles in voids between the cement particles. The solid incorporated was fairly densely packed extremely fine spherical silica particles with an average diameter of 0.1 μm and a specific surface of about 250,000 cm$^2$/g. The total volume fraction of solid in the matrix of cement plus silica dust amounted to 0.64–0.70. The water/solid ratio (by weight) was 0.188 to 0.133.

The amount of silica dust to secure a dense packing of the silica dust particles depends on the grain size distribution of the silica dust and, to a large extent, on the void available between the densely packed particles B. Thus, a well-graded Portland cement containing additionally 30% of fine spherically shaped fly ash particles will leave a much smaller available void for the silica dust when densely packed than correspondingly densily packed cement in which the grains are of equal size. In systems in which the particles B are mainly Portland cement, dense packing of silica dust would most likely correspond to silica dust volumes from 15 to 50% by volume of particles A+particles B. Similar considerations apply to systems comprising other types of particles or bodies A and B.

The principles of dense packing are dealt with in detail in the following section "PRINCIPLES OF DENSE PACKING".

In the present specification and claims, the terms "ultra fine silica particles" and "silica dust" are intended to designate SiO$_2$-rich particles having a specific surface of about 50,000–2,000,000 cm$^2$/g, especially about 250,000 cm$^2$/g. Such a product is produced as a by-product in the production of silicium metal or ferrosilicium in electrical furnaces and comprises particles in a particle-size range from about 50 Å to about 0.5 μm, typically in the range from about 200 Å to about 0.5 μm.

Dense packing of extremely fine powders according to the DSP principles has, for example, been realized in concrete (Example 1), mortar (Examples 3 and 9 in International Patent Application No. PCT/DK79/00047), and thin extruded panels with a reinforcement of plastic fibers (Example 2 in International Patent Application No. PCT/DK79/00047). In these cases, the binder matrix was prepared from Portland cement (specific surface about 2400–4400 cm$^2$/g) and ultra fine spherical silica dust (specific surface 250,000 cm$^2$/g) arranged in an extremely dense packing (water/powder weight ratio 0.18 and 0.13, respectively) by using, as dispersing agent, a concrete superplasticizer in an extremely high amount (1–4% by weight, in particular 2–3% by weight, of superplasticizer dry matter, calculated on the cement plus the silica dust).

The concrete was prepared from an easily flowable mass and had a high strength (the compressive strength of water-cured, wet cylindrical test specimens with diameter 10 cm and height 20 cm was 124.6 MPa after 28 days and 146.2 MPa after 169 days). The strength is 20% higher than the highest corresponding strength values reported for concrete made and cast in the normal way, including the use of superplasticizing additives (vide Example 1 in International Patent Application No. PCT/DK79/00047). The compressive strength of mortar prepared from an easily flowable mass and cured in water for 4 days at about 60° C. was as high as 179 MPa, as assessed by tests on wet specimens having a diameter of 10 cm and a height of 20 cm (vide Example 9 an International Patent Application No. PCT/DK79/00047).

BODIES OR PARTICLES A AND B OF THE DSP MATERIALS

In International Patent Application No. PCT/DK79/00047, the particles A and B of the DSP materials are, in general terms, characterized as solid particles having particles sizes typically between, 50 Å and 0.5 μm and 0.5 μm and 100 μm, respectively.

The said international patent application mainly discloses compact-shaped particles, typically relatively hard materials such as Portland cement, lime, fly ash, and colloid silica. However, also weak materials easily deformable under stress of below 5 kg/cm² are mentioned as particles B.

According to the present invention, the particles A and B may be of any shape, a typical useful shape being elongated rod-like shapes where the minimum dimensons are typically between 50 Å and 0.5 μm for the particles A and 0.5–100 μm for the particles B. The length of the particles may be of arbitrary size larger than the transverse dimensions, such particles typically being chopped fibers or whiskers having a length/diameter ratio from 1000:1 to 5:1, or continuous fibers such as wires.

In the present specification, the term "bodies" designates bodies of any of the above-mentioned possible shapes, including particle shape, elongated shape, plate shape, or fiber or continuous fiber or wire shape, and the term "particles" generally designate compact-shaped particles, but may also encompass angular particles and somewhat flattened out or elongated shapes within the normal understanding of the definition scope of the term "particles". Furthermore, in connection with the general description of DSP systems in the present specification, the term "particles" may be used as a common designation instead of "bodies" where the meaning is evident.

The dense packing as discussed in the section "PRINCIPLES OF DENSE PACKING" is related to the geometry of the particles and the type of packing or shaping process. Thus, with simple mixing or casting technique, a volume concentration of 10% of elongated bodies B may often be considered high and will constitute dense packing when the mixing or casting technique according to which the DSP materials containing such bodies have been established is a simple mixing or casting technique, whereas the corresponding volume concentration with parallel arrangement of fibers B in filament winding may be as high as 40–70%.

As indicated above, the bodies may also be plate-shaped, typically having thicknesses of 50 Å to 0.5 μm for the particles A and 0.5 μm to 100 μm for the particles B.

According to the present invention, the bodies or particles A and B may be of any chemical composition.

The particles B may consist of solid material such as described in International Patent Application No. PCT/DK79/00047, but as stated above, they may also, according to a novel feature of the present invention, be liquid or gaseous.

Gas phase particles B are typically present in very fine porous foam structures with walls constituted by solidifed particle A-based material.

Liquid phase particles B are also typically of interest in a kind of fine foam with liquid-filled interior, also with walls constituted by solidified particle A-based material.

One type of especially interesting bodies or particles B are elongated particles or fibers and whiskers of ultra high strength, e.g. metal fibers or whiskers, carbon fibers, boron fibers, glass fibers, $Al_2O_3$ whiskers, silicon carbide whiskers, graphite whiskers, Kevlar fibers, high strength polypropylene fibers, wollastonite, and asbestos.

The bodies or particles A of the DSP materials may serve a wide variety of purposes:

1. They may function as building stones which are "glued" together to confer strength and rigidity to the material.

For this purpose, the material of which the particles consist should have chemical affinity to the "glue" formed. (This is obtained by selecting particles A having a suitable chemical structure and/or by suitable surface treatment of the particles).

2. The bodies A may also function to confer toughness to the DSP material to avoid ultramicro cracks.

For this purpose, the bodies A are suitably fibers, e.g., of a diameter between 0.5 μm and 50 Å and a length between 100 μm and 500 Å, preferably a length between 10 μm and 500 Å, preferably together with compact particles A, perfectly in combination with compact particles A in a high concentration. Examples of suitable elongated bodies or fibers A for this purpose are ultrafine fibers, whiskers and needle-shaped crystals.

3. The bodies A may also function to actively contribute to the formation of the "glue", e.g., where the particles A are particles which establish a solid structure by partial dissolution in inter-particle water and chemical reaction in the water phase with precipitation of a reaction product, or where particles or fibers A are of a metal which is subjected to melting-solidification or sintering in a separate subsequent step after the initial formation of the DSP matrix.

4. The bodies A may act as an accelerator or a catalyst for desired chemical processes proceeding in the DSP system. Thus, e.g., particles A may consist of ultrafine cement to accelerate the hardening of cement based DSP systems, typically cement/silica dust/concrete superplasticizer DSP systems.

5. The particles A may be active as scavengers:
    (i) against corrosion,
    (ii) against alkali reactions, e.g., when the particles A consist of $SiO_2$)
    (iii) to protect plastics fibers, the particles A may be opaque to ultraviolet radiation (and may preferably function as oxygen scavengers),
    (iv) as toxins or poisons active against biological deterioration, in particular microbial deterioration,
    (v) as active ingredients for reducing soluble chromate content of cement (such as thiosulphate or ferrosulphate)
    (vi) as scavengers which function by ion exchange to scavenge ions from liquids leaching through the structure such as scavengers absorbing radioactive ions from radioactive matter contained in a DSP matrix material,
    (vii) as hydrogen rich and/or heavy elements to protect against radioactive irradiation and X-rays (e.g. heavy components such as lead particles).

5. The particles A may function to confer optical properties, including reflection properties and transmission properties and fluorescence properties.

For this purpose, the particles A may be pigments which are adapted in size according to desired optical properties, in which connection sizes below 0.5 μm are very effective.
6. The bodies A may be used for conferring desired electrical properties (e.g. to confer ion conductivity).
7. The bodies A may be utilized as electrically conductive elements.
8. The bodies A may be incorporated as components with specific dielectrical properties.
9. The bodies A may be magnetic particles.
10. The bodies A may be used to confer particular chemical and thermal properties:
    (i) where chemical or thermal resistance is desired, or
    (ii) where chemical or thermal resistance should be as low as possible (e.g., to obtain a microfine structure by subjecting a DSP matrix containing chemically or thermally easily removable bodies A to corrosive influence or combustion to remove the bodies A, resulting, for example, in a dense strong DSP matrix with ultrafine pores or holes throughout the structure).
11. The bodies A may be of hard materials to obtain abrasion resistance of the DSP material.

PRINCIPLES OF DENSE PACKING

Dense packing of bodies and particles is essential in connection with DSP systems. As an example, the essential feature of Portland cement-based DSP materials is dense packing of cement particles, combined with the incorporation of ultrafine particles in the voids between the cement particles.

In connection with the creation of volumetrically stable DSP concrete and mortar, it is also desirable to pack sand and stone as tightly as possible, with the spaces between the aggregates filled as tightly as possible with dense DSP paste.

This packing is not uniquely defined, but depends on the shape of the bodies or particles in question, on the size distribution, and on the method of compaction.

Effect of Particle Shape

The packing density depends on the particle shape, so that the more angular, oblong, and rougher the particles, the lower will be the density.

In connection with Portland cement DSP paste, the large particles (cement) will typically have a cubicle-angular shape, with moderate packing capacity. (The shape of cement particles depends on the production method (grinding). From the point of view of packing, spherical cement would be ideal. Such cement could be produced by nucleation and growth in liquid phase.) The ultrafine powder, on the other hand, consists of sphericals formed by condensation from gaseous or liquid phase. The spherical shape results in ideal packing properties.

Densely packed elongated bodies, such as fibers, will typically be arranged in a much more open structure than compact-shaped particles (vide FIG. 4) unless special precautions are taken (vide FIG. 5).

Effect of Particle Size Distribution

The effect of the particle size distribution can be illustrated by discussing binary mixes (large particles and small particles) as opposed to multi-component mixes.

Dense packing of particles dominated by the geometry of the particles (without influence from surface forces) has been treated worldwide in the literature dealing with particulate technology in various fields, for example in "Particulate Technology, Clyde Orr, Jr. 1966, The MacMillan Company, New York, and "Principles of Particulate Mechanics", Brown and Richards, 1970, Pergamon Press. It is characteristic that packing of particle systems in which surface forces are insignificant is independent of the absolute particle size and depends only on the shape of the particles, the relative size distribution, and the mechanical way in which the particles are placed. This means that regular packing of equal spheres results in the same volume fraction of solids content (for example, 0.52 for cubic packing and 0.74 for hexagonal packing) irrespective of the absolute size of the spheres. The density of the packing is strongly influenced by the relative particle size distribution, that is, the ratio between the various particle sizes. Thus, Brown and Richards (loc.cit.) report classical experiments with binary packings of spherical particles with various size ratios where the volume fraction of solids content increases from about 0.63 for packing of each of the individual particle size fractions to 0.70 for a mixture of large and small particles with a size ratio of 3.4:1 and to 0.84 for a mixture of large and small particles in a size ratio of 16:1. The density of the packing is also strongly influenced by the mechanical compaction method. Simple pressure compaction will normally not lead to very dense packing of particle systems in which the particles retain their geometric identity (that is, are not crushed or heavily deformed). Normally, denser packing is obtained by shear deformation, repeated shear deformation, or balanced vibration, all with application of a small normal pressure to secure that the repeated deformation finally results in a more dense structure. For this reason, it is not possible to state dense packing in terms of one unique quantity. The "dense packing" referred to in the present specification is to be understood as substantially such a dense packing which would be obtained in systems without locking surfaces by influences of the above types such as shear deformation and balanced vibration.

The densest packing is obtained with a high ratio between large and small particles, typically in excess of 20.

For small diameter ratios, the maximum packing density is reduced because of the wall and barrier effect (vide FIGS. 37 and 43) which gains increasing importance with increasing ratio of fine particles to coarse particles.

Without the wall and barrier effect, 100% dense packing could be achieved in multi-component mixed by continuously filling the spaces between the particles with fiber particles.

In practice, where the ratio between largest and smallest particles is limited, for example to about $10^4$–$10^5$ for concrete or cement-based DSP with up to 10 mm aggregate and fine cement fraction of 1 μm, and for the DSP, also ultrafine silica particles having a mean particle size of about 0.1 μm, a marked wall effect and barrier effect would occur if the number of discrete particle fractions were more than 3 or 4, which would result in a far from ideal packing.

There seems to be no theory that enables the drawing-board design of the grading curve that will give optimum packing. Hence, the solution seems to be a compromise between a few-component packing with little wall effect and barrier effect, on the one hand, and multi-component packings, on the other hand. In each particular case, the optimum packing may be assessed by preliminary physical compaction tests.

However, some general principles may usually be utilized:

1. A densely packed particle fraction—for example, rounded, compact-shaped fine particles between 10 and 20 μm, should be protected against dilution by ensuring a considerable gap in particle size (for both larger and smaller sizes).
2. For ultra-strong cement-based materials, the dense packing of the strength-delivering cement particles should be protected by gap in the particle size (for both larger and smaller sizes), e.g., by using on the one hand a relatively coarse sand and on the other hand ultrafine particles that are considerably finer than the finest fractions of the cement.
3. Where other particles or fibers of cement fineness, e.g., 10–20 μm diameter glass fibers—are used in cement-based DSP, it is possible to compensate for the relatively high dilution of the cement fraction which takes place at the surface of these particles or fibers by adding a correspondingly higher proportion of ultrafine particles A The dense packing of bodies or particles where surface forces are eliminated is strongly dependent on the kinematics of the arrangement of the bodies. For example, fibers may be arranged in what is considered dense packing in the context of the present application by (1) a simple mixing and casting process (vide FIG. 4), (2) sedimentation (vide FIG. 48), and (3) filament winding as illustrated in FIG. 5. The density or fiber concentration is strongly increasing from (1) via (2) to (3). Typical fiber concentration values obtainable by the three methods are 5, 20, and 60 percent by volume, respectively.

Thus, it will be understood that the dense packing is the combined effect of the particle or body shape and the way the particles or bodies have been arranged, that is, the kinematics, under conditions where the particle or body concentration is insignificantly influenced by surface forces such as in the DSP systems with effective dispersing agent incorporated.

OVERCOMING SURFACE FORCES

An essential part of the establishment of a DSP system is the overcoming of surface forces between the small particles and bodies to secure the important dense packing.

For cement-based DSP, the question of obtaining dense particle packing is, thus, essentially a question of overcoming locking surface forces between the cement particles and the ultrafine particles in aqueous dispersion.

For particles of compact, rounded shape, held together by surface forces, the forces required to separate two particle in point contact or to perform mutual sliding are proportional to the particle dimension (d) and the surface tension ($\gamma$)

$$F \propto \gamma d$$

The surface tension $\gamma$ is defined as (1) the surface tension between the liquid meniscus and surrounding fluid (usually air) when cohesion is caused by the meniscus or (2) the work required to create one unit area of new surface by removing plane-parallel faces from the contact area to infinite distance.

On the assumption that separation and sliding resistance dominate over rolling resistance, the yield stress of a powder (which is proportional to the force acting on a particle, divided by the area of the particle) can be written $$p \propto \gamma d^{-1}$$

or, in dimensionless form, $$(pd)/\gamma = \text{constant}$$

where the constant is a function of the geometry of the particulate system (relative particle size, shape and arrangement).

This qualitative model has played a great role in the choice of strategy for the production of dense, strong, cement-bound materials, including DSP, where depiction of the particle packing as a function or $(pd)/\gamma$ has been used.

The quantity $(pd)/\gamma$ is a measure of the extent to which external stresses (p) are able to overcome internal cohesion ($\gamma/d$).

Ultra-fine particles subjected to surface forces are typically packed in a very open structure if the packing takes place under moderate external pressure. This is a case of compaction of a particulate system with very low, dimensionless compaction pressure $(pd)/\gamma$, resulting in a correspondingly low particle concentration.

Denser packing can be achieved by (1) heavier compaction, (2) reduction of surface forces, for example by means of surface-active agents, or (3) selection of larger particles.

For very high values of $(pd)/\gamma$, the effect of surface forces is practically overcome, cf., for example, a pile of stones. Here, the particle packing is principally a question of particle geometry, particle friction and the way in which the compaction is made, i.e. by vibration.

The production of extremely strong and dense concrete requires a binder of very fine particles arranged in dense packing. However, in normal circumstances, the combination of small particles, locking surface forces and moderate compaction load does not permit the production of such a dense structure.

According to the DSP principle, the locking effect of surface forces in cement-based materials is practically completely eliminated by means of dispersing agents, thereby enabling ideal geometrical arrangements with packing of small, spherical particles between larger particles to ensure a very dense structure despite the fact that the small particles packed between the cement particles are about 1/100th the size of normal cement particles (silica dust with an average diameter of 0,1 μm).

Thus, according to the DSP principle, efficient dispersing agents are utilized to change the ultra-fine particle-based materials into a condition where the packing density has become purely a geometrical and kinematic problem, known from the theory of packing of large-size particles.

According to a particular aspect of the present invention, it is also possible to perform compaction of the DSP articles in higher stress fields, cf. the following section "SHAPING IN A HIGH STRESS FIELD". Utilizing compaction in high stress fields, it is possible to successfully establish DSP systems based on the smallest particle size in the range stated for particles A, that is 50–200 Å, where surface forces ($\gamma$) according to the model $$(pd)/\gamma = \text{constant}$$

will have increasing importance. By increasing the compaction stress p accordingly, the high level of $$(pd)/\gamma$$

which is characteristic of the condition where surface forces have been overcome, can be retained.

For other methods of arranging fine bodies or particles, such as sedimentation, similar principles may be utilized, only the mathematical models being different. Thus, the dense arrangement by sedimentation of small fibers is dependent upon whether the force of gravity acting on the fiber is able to overcome the surface forces which tend to fix or lock the sedimenting fiber (such locking or fixation is typically a fixation in an absolutely undesired position unparallel to other fibers) so that the sedimenting fiber will obtain a desired position substantially parallel to already sedimented fibers (vide FIG. 48).

FUNCTION OF DISPERSING AGENT IN PORTLAND CEMENT/ULTRA FINE PARTICLE SYSTEMS

The dispersion of fine particles by use of surface active agents is well explained in general terms in the literature on colloidal and surface science.

The purpose of using a surface active agent is to establish such repulsive forces against adjacent particles that the repulsive forces become able to overcome the mutual attraction caused by London/van der Waals forces and possibly other attraction forces. By this measure, it is attempted to eliminate blocking between the particles, thus ensuring the sliding of the particles relative to each other which is absolutely essential for the establishment of dense packing in a low stress field.

According to classical theory, two repulsive mechanisms are normally considered: electrical repulsion caused by generation of electrical diffuse double layer in the medium surrounding the particles (cf. the D.L.V.O. theory), and steric hindrance where particles are prevented from coming together (e.g. prevented from flocculation) due to the presence of adsorbed layers of another compound on their surface.

Such adsorbed layers may be molecules from the medium, or they may be surfactant molecules. The physical interaction of the adsorbed molecules as the particles approach each other acts as a barrier to flocculation. It is believed that steric hindrance effect is the dominant factor in cement dispersed in water under the influence of typical concrete superplasticizers, but that also electrical repulsion enter into the mechanism as an extra contribution.

Experience over many years indicates that a pure electrical repulsion effect is insufficient to prevent flocculation of Portland cement in water (probably due to a high concentration of divalent, trivalent counterion ($Ca^{++}$ and $Al^{+++}$) which, according to the Hardy-Schultz rule, compresses the diffused double layer, and perhaps also due to formation of direct chemical bonds (or bridges). It seems likely that an efficient dispersion of ordinary Portland cement in water is strongly dependent on dispersing agents securing efficient steric hindrance.

Achievement of a good dispersion of ultra fine silica, e.g. having an average size of 0.1 $\mu$m, in water is basically much simpler than the achievement of a similar dispersion of the much coarser Portland cement (typically with average particle size of 10 $\mu$m).

Thus, an efficient dispersion of colloid silica in water (without salt content) is obtained by pH control (pH typically above 7 or 8) is reported in Surface and Colloid Science, editor Egon Matijeviec, Ralph K. Iler, 1973, John Wiley & Sons). Practical experimental experience with the fine silica dust used in the working examples (specific surface area about 250.000 $cm^2/g$) demonstrates the same general behaviour.

Thus, 1:1 mixture of silica dust and tap water (by weight) and a 2:1 mixture of silica and 3% sodium tripolyphosphate aqueous solution both result in slurries with moderate viscosity which are easily mixed in low shear mixers or by hand. However, attempts to combine such silica/water systems with Portland cement result in a pronounced flocculation.

Thus, the addition of a small amount of easily flowable Portland cement/water slurry (typically a water:cement ratio of 1) to a large batch of silica/water slurry of the types and concentrations mentioned above (e.g. typically 1 part of cement slurry to 10 parts of silica/water slurry) results in a drastic stiffening which renders any further mixing impossible.

This demonstrates that the solutes in the water generating from the cement destroy the dispersion of the ultra fine silica particles. The precise mechanism of bond formation between the silica particles is not known, but the explanation is likely to be along the lines of reduced double layer repulsion and formation of various types of direct bonds or bridges.

By the use of concrete superplasticizers, such as sodium salt of a highly condensed naphthalene sulphonic acid/formaldehyde condensate, of which typically more than 70% consist of molecules containing 7 or more naphthalene nuclei, it is easy to obtain an extremely good dispersion of the combined ultra fine silica/Portland cement/water system, making the dense packing of the binder possible in a low stress field.

Hence, the succes of superplasticizers in ultra fine particle/cement/water DSP systems is not due to their ability to disperse ultra fine particles in water (indeed, other surfactants are even better for this purpose), but due to the fact that they are able to provide a good dispersion of the silica in the specific Portland cement/water environment.

STRUCTURE AND PROPERTIES OF COMPOSITE MATERIAL

The present invention provides several novel methods and principles for establishing DSP materials which are discussed in separate sections in the following. The present section deals, in particular, with the establishment of ultra strong cement-based DSP materials.

The strength of ordinary concrete depends primarily on the quality of the cement binder which binds together sand and stone, and only to a smaller degree on the quality of the sand and stone as long as normal sound materials are concerned.

The reason for this is that the binder is the weak link in normal concrete and that ruptures predominantly occur through the binder, without passing the sand and stone particles.

In textbooks on concrete design, that is clearly expressed by assuming, as a first approximation, that the strength is a function solely of the composition of the binder (expressed as the cement concentration in the cement-water suspension through the reciprocal value: the "water-cement ratio") without including the amount and quality of the sand and stone in the models.

In concrete where the strength of the sand and stone is no longer high in relation to the strength of the binder, both the strength of the binder and the strength of the sand and stone will be of importance to the strength of the composite material.

This is known for traditional lightweight aggregate concrete where the stone material consists of light, porous, relatively weak material. In this case, the inherent strength of the stone has equal importance to the strength of the mortar in the mathematical expression for the strength of the concrete:

$$\sigma = \sigma_a{}^n \times \sigma_m{}^{1-n}$$

wherein $\sigma$ is the compressive strength of the concrete, $\sigma_a$ is the compressive strength of the stone, $\sigma_m$ is the compression strength of the mortar, n is the volume concentration of the stone, and $1-n$ is the volume concentration the mortar. In such materials, the rupture proceeds, to a large extent, through the weak stone particles.

With the development the new, very strong cement-based DSP binders, as disclosed in International Patent Application No. PCT/DK79/00047, concrete and mortar with a hitherto unknown strength have been obtained. Thus, International Patent Application No. PCT/DK79/00047 discloses water-cured, wet cylindrical test specimens having a diameter of 10 cm and a height of 20 cm and showing a compressive strength of 146.2 Mpa for a concrete after 169 days' storing at 20° C. and 179 MPa for a mortar cured at about 60° C. for 4 days. Both the concrete and the mortar were prepared from easily flowable masses cast with slight mechanical vibration. Traditional quartz sand and, for the concrete, granite stone, were used. These strengths were compared with the highest strength disclosed in the relevant technical literature:

120.6 MPa measured on test cylinders of the same dimensions as above and consisting of concrete with a water/cement ratio of 0.25, a cement content of 512 kg/m³, and a content of "Mighty" (a concrete superplasticizer which is further characterized below) 150 in an amount of 2.75% of a 0.42% solution, calculated on the weight amount of cement, the samples having been stored for one year prior to the testing of compressive strength. (Kenichi Hattori, "Superplasticizers in Concrete, Vol. I, Proceedings of an international Symposium held in Ottawa, Canada, May 29–31, 1978, edited by V. M. Malhhotra, E. E. Berry and T. A. Wheat, sponsored by Canada Centre for Mineral and Energy Technology, Department of Energy, Mines and Resources, Ottawa, Canada and American Concrete Institute, Detroit, U.S.A.).

The investigation of rupture surfaces in connection with the strength measurements disclosed in International Patent Application No. PCT/DK79/00047 indicated that the sand and stone materials used were not strong in comparison with the binder such as would have been the case in normal concrete, as the rupture proceeded, to a large extent, through the sand and stone particles.

This indicated the possibility of producing even stronger concrete by combining the use of the DSP binder with the use of much stronger sand and stone materials. This is a principle which does not have any significant effect in connection with normal concrete, such as explained above.

The combination of the DSP binder with very strong sand and stone materials is one of the main aspects of the present invention.

In accordance with this aspect, concrete and mortar were prepared with the DSP binder, using, as sand and stone material, e.g., refractory grade bauxite and silicon carbide, both of which are much stronger than ordinary concrete sand and stone, vide Examples 1 and 4.

The concrete and the mortar were prepared from easily flowable masses and had extremely high strength (the compressive strength of the cylindrical concrete specimens with diameter 10 cm and height 20 cm cured at 60° C. for 4 days was 217 Mpa).

This is more than 50% higher than the strength of the very strong concrete with traditional sand and stone, bound together with the new strong cement binder (146.2 MPa, cf. International Patent Application No. PCT/DK79/00047) and more than 80% higher than the highest strength which has, to the applicants' best knowledge, been obtained with concrete fabricated with traditional soft mass casting and curing technique using traditional superplasticized cement binder (120.6 Mpa, cf. Hattori, loc. cit).

The new high quality material of the invention also showed an extremely high rigidity (dynamic modulus of elasticity of 109,000 MPa) which is about 60% higher than for high quality concrete using the DSP binder and quartz sand and granite stone, cf. Example 1 of International Patent Application No. PCT/DK79/00047.

The mortar with sand of refractory grade bauxite wass even stronger and more rigid than the concrete (the compressive strength of cylindrical specimens with diameter 10 cm and height 20 cm cured at 80° C. for 4 days was 248 MPa and the dynamic modulus of elasticity was as high as 119,000 MPa, cf. Example 4). The compressive strength is 38% higher than the strength of the strongest mortar prepared with the DSP binder and quartz sand (179 MPa, vide Example 9 of International Patent Application No. PCT/DK79/00047 and more than twice as high as the strength of the above-mentioned strong concrete reported by Hattori (120 MPa). Still stronger cement-based DSP materials of the present invention have been made with the strong sand and stone materials, vide Example 5 where the strength was 268.3 MPa.

Hence, the DSP concrete material of the present invention is of a hitherto unknown quality obtained by using extremely strong sand and stone material together with the extremely strong DSP binder, whereby
  (1) the strength of the sand and stone materials compared to ordinary concrete is utilized better, and
  (2) the strength of the DSP binder is utilized much better than in concrete with usual sand and stone material.

Together with the advantages with respect to easy production which are associated with the DSP binder, the incorporation of the particularly strong sand and stone materials opens up the possibility of a wide range of new and improved products.

Another very interesting aspect of the ultra strong cement-based DSP materials is the ratio between the strength $\sigma$ and the density $\rho$, which is the key parameter in the construction of large structures such as towers, bridges, etc., where the maximum possible size is proportional to this ratio. The stress/density ratio of cement-based DSP materials and, in particular, of DSP materials comprising strong sand and stone, is far higher than that of ordinary concrete or high quality concrete and even higher than the stress/density ratio of structural steel, cf. the values stated in the following section "LARGE STRUCTURES".

The aspect of the invention comprising ultra strong cement-based DSP materials may be defined as shaped articles comprising a coherent matrix, the matrix comprising (A) homogeneously arranged inorganic solid particles of a size of from about 50 Å to about 0.5 μm, or a coherent structure formed from such homogeneously arranged particles, and (B) densely packed solid particles having a size of the order of 0.5–100 μm and being at least one order of magnitude larger than the respective particles stated under (A), or a coherent structure formed from such densely packed particles, the particles (A) or the coherent structure formed therefrom being homogeneously distributed in the void volume between the particles (B), the dense packing being substantially a packing corresponding to the one obtainable by gentle mechanical influence on a system of geometrically equally shaped large particles in which locking surface forces do not have any significant effect, the shaped article additionally comprising, embedded in the matrix, (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, as assessed (on particles of the material having a size ratio between the largest and smallest particle substantially not exceeding 4) by the method described herein, (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), as assessed by the method described herein, (3) a Moh's hardness (referring to the mineral constituting the particles) exceeding 7 and (4) a Knoop indentor hardness (referring to the mineral constituting the particles) exceeding 800, said particles having a size of 100μ–0.1 m, and optionally (D) additional bodies which have at least one dimension which is at least one order of magnitude larger than the particles (A), with certain provisos which will be explained below.

According to the above-mentioned aspect of the present invention, sand and stone materials are used which are stronger than the sand and stone materials used in ordinary concrete. Typically, concrete sand and stone consist of ordinary rock such as granite, gneiss, sandstone, flint and limestone comprising minerals such as quartz, felspar, mica, calcium carbonate, silicic acid etc.

Various kinds of comparison tests may be used to assess that particular sand and stone materials are stronger than ordinary concrete sand and stone, e.g.

(1) measurement of hardness
(2) determination of the crushing strength of a single particle
(3) hardness of the minerals of which the sand and stone materials are composed
(4) determination of resistance to powder compression
(5) abrasion tests
(6) grinding tests
(7) measurement of strength on a composite material containing the particles.

It is difficult to specify unambiguous relations between such strength and hardness results for the sand and stone and the ability of the sand and stone to impart strength to the concrete or the mortar.

Generally, it must be anticipated that sand and stone with higher hardness, abrasion strength, strength in composite structure etc., yields a higher concrete strength provided (1) identical particle geometry (particle shape, particle size, amount and degree of packing) and
(2) the concrete systems are systems where, to a certain degree, rupture passes through the sand and stone particles. (In case the last condition is not fulfilled it is, as mentioned in the introduction of this specification, due to the fact that the sand and stone material in any case is far stronger than the matrix and that additional increase of the strength of the sand and stone has no influence on the rupture, the rupture then in any case passing through the matrix, avoiding the sand and stone particles.)

In Examples 1, 3, 4, and 5, sand and stone materials with considerably higher strength and hardness than ordinary concrete have been used:

Refractory grade bauxite containing 85% $Al_2O_3$ (corundum) and silicon carbide were used. Both materials have considerably higher hardness than the minerals in ordinary sand and stone. Thus, both corundum and silicon carbide are reported to have a hardness of 9 according to Moh's hardness scale, and the a Knoop indentor hardness is reported to be 1635–1680 for aluminum oxide (corundum) and 2130–2140 for silicon carbide, while quartz, which is one of the hardest minerals in ordinary concrete sand and stone, has a Moh's hardness of 7 and Knoop indentor hardness of 710–790 (George S. Brady and Henry R. Clauser, Materials Handbook, 11th ed., McGraw-Hill Book Company).

The high strength of these materials compared to ordinary concrete sand and stone has been demonstrated by powder compaction tests (Example 3) and by tests with mortar and concrete with silica-cement binder where the materials were used as sand and stone (Examples 1, 4, and 5).

Many other materials than the two above-mentioned materials may, of course, be used as strong sand and stone materials. Typically, materials with a Moh's hardness exceeding 7 may be used, e.g. topaz, lawsonite, diamond, corundum, phenacite, spinel, beryl, chrysoberyl, tourmoline, granite, andalusite, staurolite, zircon, boron carbide, and tungsten carbide.

The hardness criterion could, of course, also be stated as Knoop indentor hardness where minerals having values above the value of quartz (710-790) must be considered strong materials compared with the minerals constituting ordinary concrete sand and stone. For the assessment of the strength of sand and stone, the technique described in Examples 1, 4, and 5 involving embedding the sand and stone in question in a specified cement/silica matrix produced and tested in a specified manner may be used:

Concrete (size of the large particles exceeding 4 mm):
Concrete produced from ordinary concrete sand and stone (granite stone and quartz sand) and silica/cement matrix substantially identical with the one used in Example 1 had compressive strengths about 120-160 MPa (vide International Patent Application No. PCT/DK79/00047). Therefore, it seems reasonable to characterize stone and sand increasing the compressive strength of the concrete to 170 MPa as strong compared to ordinary concrete sand and stone. With refractory grade bauxite sand and stone, however, cf. Example 1 of the present application, strengths of 217.5 MPa were obtained, for which reason values above 200 MPa can be taken as a realistic and desirable goal for a preferred material.

Mortar (particle size not exceeding 4 mm):
Analogous experience has been obtained with cement/silica mortar where materials with substantially identical cement/silica matrix yielded compressive strengths of 160-179 MPa for quartz sand mortar (vide Example 9 in International Patent Application No. PCT/DK79/00047) and 248 and 268 MPa, respectively, for mortar with sand of refractory grade bauxite (Examples 4 and 5, respectively, of the present application). It would seem reasonable to characterize sand which increases the mortar strength to above 200 MPa as strong compared to the strength of normal sand, and also, it seems reasonable to state strengths above 220 MPa as a goal which is both desirable and obtainable with the preferred materials.

For the evaluation of aggregates having a particle size exceeding 4 mm, the concrete technique from Example 1 is used. For the evaluation of sand having a particle size of less than 4 mm, the mortar technique, cf. Example 9 in International Patent Application No. PCT/DK79/00047 and Examples 4 and 5 in the present application (composite as for bauxite mortar) is used, whereby, in the particular mixes, the same volume of sand an stone is to be incorporated, not the same weight amount of sand and stone. The preparation, the curing, and the testing are performed as in the examples mentioned.

The above-mentioned testing methods, and the particular way in which certain of the tests are performed, form the basis of the definition of useful and preferred particles C referred to in the claims.

The additional bodies D having at least one dimension which is at least one order of magnitude larger than the particles A may, in principle, be bodies of a solid (such as discussed in greater detail below), a gas (such as in gas concrete), or a liquid. The bodies may be compact shaped bodies (such as sand, stone, gas bubbles, or liquid bubbles), plate-shaped (such as mica), or elongated (such as fibers or reinforcing bars or wires). Due to the possibility of shaping the articles in question in a "gentle" way in a los stress field, such bodies may, in contrast to what happens in any known art compaction processes which might achieve dense packing in ultra fine particle systems, substantially retain their geometric identity during the shaping. In this context, retainment of geometric identity indicates that the bodies in question are not subjected to any substantial crushing or drastic deformation. A typical example is a solid body in the form of a hollow particle or a fiber which in powder compaction or other high stress field treatment would be crushed or drastically deformed, but which in the much lower stress field in which the articles of the invention may be formed is capable of avoiding such deterioration.

Examples of additional bodies D which are advantageously incorporated in shaped articles comprising the DSP matrix, in particular the cement-based DSP matrix, are sand, stone, polystyrene bodies, including polystyrene spheres, expanded clay, hollow glass bodies, including hollow glass spheres, expanded shale, perlite, natural lightweight aggregate, gas bubbles, metal bars, including steel bars, fibers, including metal fibers such as steel fibers, plastic fibers, glass fibers, Kevlar fibers, asbestos fibers, cellulose fibers, mineral fibers, high temperature fibers and whiskers, including inorganic nonmetallic whiskers such as graphite whiskers and $Al_2O_3$ whiskers and metallic whiskers such as iron whiskers, heavy weight components such as particles of baryte or lead or lead-containing mineral, and hydrogen-rich components such as hollow water-filled particles. When the shaped articles comprise additional bodies D, it may be attractive for optimum strength and rigidity or for other purposes to obtain dense packing of the additional bodies. The easily deformable (easily flowable) DSP matrix permits a considerably denser arrangement of additional bodies than was obtainable in the known art.

Especially the incorporation of fibers is of great interest due to the unique capability of the DSP matrix with respect to anchoring fibers. In this context, it should be mentioned that the much denser structure in the shaped articles comprising the DSP matrix will result in a virtual insulation of fibers otherwise subjected to chemical attack from the constituents of the matrix or from the surroundings. The fibers used in the shaped articles may be of any configuration such as chopped single fibers, or continuous fibers or yarns or ropes, or roving or staple fibers, or fiber nets or webs. The particular type and configuration of fiber will depend upon the particular field of use, the general principle being that the larger the dimensions of the shaped article, the longer and coarser are the fibers preferred.

The improvement of the fixation of fine fibers makes it possible to fabricate strongly improved fiber composite materials based on mixing, into the material, a larger amount of chopped fibers than in corresponding materials based on common matrices. To secure a good fiber performance in the known art matrices, it is necessary that the chopped fibers have a certain (high) length to diameter ratio, the so-called aspect ratio. In normal matrices it is, however, difficult to intermix and arrange fibers with large aspect ratios—in other words, the smaller the aspect ratio is, the easier it is to incorporate the fibers and arrange them in a suitable way in the cast matrix, and the higher volume of fibers can be incorporated. For example, chopped polypropylene fibers with cross dimensions of approximately $30\mu$, usually have a length of 12-25 mm (aspect ratio more than 500) when employed as reinforcement in ordinary cement matrices. A far better utilization of the same type of fibers is obtained in the DSP matrix, such as described in Example 2 of International Patent Application No. PCT/DK79/00047. In Example 2 of International Patent Application No. PCT/DK79/00047, very favourable fixation and resulting strength properties were obtained even though the fiber length was only 6 mm. With the DSP matrix, it seems possible to reduce the length of chopped fibers and, hence, the aspect ratio, with a factor of 10 or more (compared to chopped fibers of ideal or reasonable aspect ratios for use in normal matrices) and, accordingly, to utilize this reduced aspect ratio to incorporate a larger amount of fibers in the composite material and/or secure a better fiber arrangement in the cast matrix.

The above-mentioned polypropylene fibers used in Example 2 of International Patent Application No. PCT/DK79/00047 can be characterized as polypropylene fibers having a tensile strength of at least 4000 kp/cm$^2$, a modulus of elasticity of at least $7 \times 10^4$ kg/cm$^2$, and an elongation at rupture of at the most 8%. Such fibers may be prepared by stretching a polypropylene film in a ratio of at least 1:15 to obtain a film thickness of 10–60μ and fibrillating the stretched material by means of a rotating needle or cutter roller to obtain fiber filaments of from about 2 to about 35 dtex. This technique is disclosed in German Patent Application No. P 28 19 794.6, and U.S. Pat. No. 4,261,754.

Among the most important shaped articles comprising the DSP matrix are the ones in which the particles B comprise at least 50% by weight of Portland cement particles, especially the ones in which the particles B essentially consist of Portland cement particles. These shaped articles will typically contain silica dust particles in a volume which is about 5–50% by volume, in particular 10–30% by volume, of the total volume of the particles A and B and will typically contain sand and stone as additional bodies to form mortar or concrete of extremely high qualities with respect to mechanical strength, frost resistance, etc., and/or fibers, especially metal fibers, including steel fibers, mineral fibers, glass fibers, asbestos fibers, high temperature fibers, carbon fibers, and organic fibers, including plastic fibers, to provide fiber-reinforced products showing a unique anchoring of the fibers such as discussed further above. With particular reference to fibers which are subject to chemical deterioration, for example glass fibers which are subject to deterioration under highly alkaline conditions, it is an important advantage of the DSP matrix that such fibers, both during the curing of the material and in the final cured material, become much better protected against influence from the environment, due to partial dissolution of the silica dust with resulting partial neutralization of the alkaline environment, and due to the micro-dense "jacketing" around the fibers conferred by the ultra fine particles and the coherent structure formed therefrom which very substantially contributes to static conditions in the glass fiber environment, substantially avoiding any migration of alkaline material against the fiber in the final cured matrix.

When the shaped articles comprising the cement-based DSP matrix are of large sizes, they are preferably reinforced with reinforcing steel such as bars or rods or steel wires or fibers. Reinforcements in pre-stressed constructions involving the DSP matrix are especially valuable. Due to the very gentle conditions under which the articles can be shaped, the reinforcement bodies can retain their geometric identity during the shaping process. A combination showing the matrix structure discussed above and reinforcing steel that had retained its geometric identity during the shaping process was hardly obtainable in the known art system.

With the considerably increased strength of the DSP matrix and the strongly improved fixation of fibers and bars in the matrix, possibilities for producing new classes of reinforced and fiber-reinforced cement based articles and materials are provided:

(1) Brittle materials with very high tensile strengths obtained by incorporating high quality fine fibers or whiskers (fibers or whiskers of high tensile strength and high modulus of elasticity, for example glass fibers, carbon fibers, asbestos, Al$_2$O$_3$ whiskers) in a medium to high volume concentration into the binder matrix.

(2) Semi-brittle materials with high tensile strengths and comparatively large strain capacity obtained by incorporating high quality relatively fine fibers with high tensile strength and relatively low modulus of elasticity in a medium to high volume concentration into the binder matrix (for example, high strength polypropylene fibers and Kevlar fibers).

(3) High performance pre-stressed reinforced articles, the quality being primarily obtained by incorporating a much higher volume of high quality steel bars or wires than ordinarily used (the volume of reinforcement that can be utilized being directly proportional to the compressive strength of the matrix) in a matrix of the new type according to the invention. In ordinary pre-stressed concrete, the volume of pre-stressing steel is as low as 1–2% of the concrete.

The volume of the steel is limited by the compressive strength of the concrete. An increase of the compressive strength with a factor of 4 could, for example, be fully utilized in prestressing members to secure a 4 times higher bending capacity or to decrease the height of the member to one half. Such members would demand a not unrealistic high volume of pre-stressing steel (4–8%). It would also be possible to apply the improved matrix material in pre-stressed articles of much smaller cross section than in traditional pre-stressed concretes, with a corresponding use of finer pre-stressing reinforcement (thin wires). In spite of the larger specific surface, the wires are well-protected in the dense DSP matrix material which effectively shields the wires from any influence from the surroundings.

(4) Articles of reinforced, not pre-stressed concrete where the improved quality of the matrix material is primarily utilized by incorporating steel bars or wires of a much higher tensile strength than in the ordinary steel reinforced concrete. The use of an increased amount of an ordinary reinforcement to benefit from the increased quality of the matrix would in many cases demand an unrealistically high amount of reinforcement. High quality reinforcement bars used in ordinary concrete has a surface which is shaped so as to secure their anchorage in the concrete (deformed bars; cam steel; tentor steel; etc.). Such bars have a strength not exceeding 900 MPa and, hence, do not have the same high strength as the best cold drawn smooth bars and wires used for example in pre-stressed concrete which typically have strength of 1800–2200 MPa. On the other hand, smooth wires and bars do not secure sufficient fixation in ordinary concrete. The strongly improved fixation obtained in the DSP matrix opens up the possibility of a beneficial utilization of the very high strength smooth steel wires and bars as non-prestressed reinforcement. Due to large strain when fully utilizing the high steel quality and the corresponding cracks which will occur in the concrete (as in usual reinforced concrete) it is advisable especially to use the above-mentioned technique in thin members in combination with fine reinforcement in order to secure a crack pattern with several finer distributed thin cracks.

The reinforcing possibilities mentioned may, of course, be combined in many ways, for example by making a thin cover of semi-brittle reinforced material on a large load bearing member, or by use of high quality steel wires as secondary reinforcement (mainly placed perpendicular to the main reinforcement) in large pre-stressed members.

When strong sand and stone (bodies C) are embedded in the matrix in accordance with the above-described aspect of the present invention, the resulting high quality DSP materials may be characterized in that they have a compressive strength of more than 150 MPa, preferably more than 180 MPa, measured on a test specimen having a diameter of 10 cm and a height of 20 cm, when the largest of the compact-shaped bodies is larger than 4 mm, and more than 180 MPa, measured on a test specimen having a diameter of 3 cm and a height of 6 cm, when the largest of the compact-shaped bodies is at most 4 mm.

with the proviso that the shaped article has at least one dimension which is at least one meter and a cross section of at least 0.1 $m^2$, and/or has a complex shape which does not permit its establishment by powder compaction.

PROPERTIES OF FLUID STRUCTURE; WATER RETENTION

By introducing ultra fine particles in the voids between densely packed particles, for example silica particles having a specific surface area of 250,000 $cm^2/g$ in the voids between cement particles having a diameter about 5 $\mu m$, a structure is obtained which shows an increased resistance against internal mass transport in the form of fluid transport (gas or liquid) between the particles and against mass diffusion in the pore liquid.

The squeezing of liquid from saturated particle systems depends on the compression of the particle skeleton—typically depending on whether sliding between the particles is possible—and on the flow of liquid through the channels between the particles.

In connection with shaping of cement-silica-water suspensions, internal liquid transport in the fresh material is of decisive importance. The resistance against viscous flow of fluid between particles in systems of particles of geometrical similarity varies inversely as the square of the particle diameter.

This means that the time for a given liquid transport under a given pressure gradient in two geometrically similar particle-liquid systems with a particle size of 1:50 is 2500 times higher in the fine grained system than in a system with particles are 50 times as large.

A similar effect is obtained by filling the pore volume between large particles with ultra fine particles, as it is the cross-section dimensions of the resulting channels between the particles which are mainly responsible for the resistance to the flow.

The effect of particle size on water retention is further illustrated in FIGS. 6, 7, and 8. These facts are well-known, and it is also known art to reduce the internal liquid transport in cement/water systems by introducing so-called "thickeners" in the water in the form of ultra fine particles or polymers such as Methocell.

Because of the dominating effect of locking surface forces, it will, however, normally not be possible to combine the uses of (1) very dense cement packing and (2) ultra fine particles in an easily flowable aqueous suspension.

However, with an extremely high dosage of a dispersing agent, such as a superplasticizer, this is possible. Thus, easily flowable cement paste, mortar and concrete with densely packed cement particles and containing 10–30 percent by volume of silica dust, calculated on cement + silica dust, with water/cement + silica-ratio of 0.15–0.20 by weight can be made.

This results in several advantages compared to the known methods:

1. Production of superfluidized cement product without bleeding.

In the known art production of high quality concrete and mortar using relatively high dosages of superplasticizer, an easily flowable mass having a low water/cement-ratio (for example 0.25) is obtained. The mass is poured into moulds where it is compacted under the influence of gravity and optionally also mechanical vibration. However, during this process, the heavier cement, sand, and stone particles will tend to arrange themselves in an even more dense packing, while water migrates upwardly, the so-called bleeding, vide FIG. 7.

Accordingly, for such known systems with very efficient cement dispersion obtained in the use of relatively high dosages of superplasticizer, a marked bleeding is normally observed in spite of the low water/cement-ratio—especially if the process is accompanied by vibration. This phenomenon may for example be critical in the casting of concrete roads with superplasticized concrete as bleeding results in a surface sludge of high water content, and hence results in a road surface which has a lower quality than the intended abrasion layer. Internal liquid separation is also critical in casting of reinforced concrete with superplasticizer. The liquid separation may result in a bleeding at the underside of the reinforcement, which reduces the fixation of the reinforcement and reduces the protection against chemical attacks.

By introducing, in accordance with the principles of the present invention, ultra fine particles, for example 5–15% of silica dust having the above-mentioned particle size, between the densely packed cement particles, and using a high dosage of superplasticizer, a drastic delay of the bleeding process is obtained, theoretically corresponding to 100–1000 times slower water movement (vide FIG. 8). In practice, this means that bleeding has been obviated, considering that the chemical structuring process normally starts and develops much faster.

In other words, utilizing the above-mentioned principle of the invention of combining high dosage of superplasticizer with silica dust, it becomes possible in practice to produce superfluidized high quality concrete, mortar and cement paste without bleeding. This is of special interest in connection with pre-stressed constructions, where the above-mentioned principles can be utilized for producing high quality non-bleeding, easily flowing injection mortar (grouting mortar) which gives extremely good protection of the tendons and secures an extremely good mechanical fixation, vide the more detailed discussion of this aspect below.

2. Production of high quality cement products in a low stress field and without liquid transport to the surroundings.

In the production of certain cement products, for example asbestos cement panels, the known art technique presently used is either a slip-casting technique (in which surplus liquid is pressed out from a aqueous slurry through filters, cf. the Magnani process in which the pressing is established via a vacuum system) or a high pressure extrusion of a moist powder (where a traditional thickener (Methocell) has been added to obviate the otherwise hardly avoidable internal liquid transport at the outlet and the consequent blocking of the system by particle interlocking).

According to one aspect of the invention, it becomes possible to produce such materials in a low stress field by simple rolling processes or extrusion without liquid exchange with the surrounding when a high amount of superplasticizer is incorporated in the mass together with ultra fine particles.

While it might seem possible to employ similar rolling or extrusion processes with cement materials with high amount of superplasticizer incorporated, but without the concomitant use of ultra fine particles which is characteristic to this aspect of the present invention, such materials—although they could be made easily flowable with a low water/powder-ratio (but not quite as low as with ultra fine, well dispersed particles)—would, due to the large size of the cement particles, show a marked tendency to local water expulsion in the stressed zones, such as at the rollers or at the outlet in extrusion, with resulting blocking of the particles. This has been observed in practice in experiments with a laboratory extruder with superplasticized, fine grained cement and with superplasticized ordinary cement plus an additive of a fine filler which was finer than the cement, but considerably coarser than the above-mentioned ultra fine silica dust. In both cases, the material had a sandy performance and could not be extruded due to blocking.

With an ultra fine silica powder incorporated in the superplasticized cement system in accordance with the principles of the present invention, such expulsion of water is delayed with a factor of the order of 100–1000 (as calculated from theoretical considerations).

The appearance of the cement silica material containing a high amount of superplasticizer is toughly-viscous and cohesive during rolling, while corresponding superplasticized products without the ultra fine silica powder typically appear as friction materials with a tendency to local water expulsion with resulting particle blocking during rolling or extrusion.

3. Production of easily flowable materials with a high internal coherence.

Easily flowable superplasticized cement materials containing ultra fine silica particles are one aspect of the DSP principle and show a much better internal coherence than corresponding superplasticized easily flowable cement materials without ultra fine silica particles. This is believed to be due to the fact that local liquid transport which contributes to separation, is drastically reduced in the materials with the ultra fine silica particles.

(This is illustrated in FIG. 10, which illustrates a demonstration of internal coherence of a fluid to plastic mortar. The influence of streaming water (4 liters per minute) for typically 5 to 30 minutes will not result in any visible washing away of material from the mortar.)

Many advantages are obtained in this manner. For example, the existing possibilities of producing underwater concrete by simple pouring the fresh concrete into the water are considerably improved.

Such a technique is known per se and especially developed with superplasticizing additives (without ulta fine powder). However, with ultra fine, well-dispersed silica powder in accordance with the principles of this invention, the process is now much more attractive and shows correspondingly extended potential fields of utility.

The resistance against internal liquid transport increases with the density of the packing of the ultra fine particles in the voids between the coarse particles. Thus, it is expected that fluidized powder materials consisting of well-dispersed Portland cement ($s=4000$ $cm^2/g$) and silica dust ($s=250,000$ $cm^2/g$) will show considerably better internal coherence, higher resistance to internal liquid flow and bleeding, and better processability in rolling and extrusion with 20–40 volume percent of silica dust than at 5–10 percent. However, the experience so far obtained indicates that even very small amounts of ultra fine silica dust (typically 1–5%) incorporated between densely packed particles b), in particular in densely packed Portland cement structures may have a marked improving effect compared to similar materials without silica dust.

Other important aspects of the invention are duct and fissure fillings of cured grout.

Grout normally consists of cement and water, usually with admixtures to improve performance. The two main objectives in grouting ducts in post tensioned concrete members are to prevent corrosion of the tendons and to provide bond between the pre-tensioned steel and the concrete. The most important properties of the grout to be pumped in the ducts are fluidity and water retention (low bleeding).

Fluidity is essentially a function of the water/cement ratio. Reducing the water content produces a stiffer less fluid mix, the effect being more marked at lower water/cement ratios. In general, the water/cement ratio of good grout lies between 0.35 and 0.50. There are a number of additives such as dispersing agents which improve the fluidity for a given water/cement ratio, or alternatively, reduce the water/cement ratio required to obtain a given fluidity, but their effect on other properties of the grout, especially the bleeding, often limits their use.

Before grout sets, water can segregate from the mix due to the solid particles being heavier than the water—often termed "bleeding". This may inter alia result in highly undesirable water pockets at the underside of the pre-stressed steel. Bleeding is increased with increased water/cement ratio and with increased amount of dispersing agent (for example, a fluid cement paste having a water/cement ratio as low as 0.25, obtained with a high dosage of concrete superplasticizer, shows, in spite of the very low water/cement ratio, marked bleeding). Anti-bleed-additives are available which produce a thixotropic mix exhibiting virtually no bleeding. None of them, however, have hitherto been compatible with a combination of high fluidity and very low water/cement ratio. Furthermore, most of these additives are based on a cellulose ether which reduces the strength and retards the setting time. With grout according to the present invention, (for example a cement-silica-Mighty-grout having a water/cement plus silica dust ratio of 0.15–0.18), the following is obtained:

(1) A much denser and stronger grout than hitherto having strongly improved fixation of the pre-stressing steel (probably corresponding to a factor of 4–10, cf. Example 10 of International Patent Application No. PCT/DK79/00047) and protection of the steel against corrosion.

(2) the said grout being, in spite of the extremely low water/powder ratio, easily flowable and suitable for being pumped into and fill out the ducts with virtually no bleeding, the additives (ultra fine inorganic particles such as silica dust and a concrete superplasticizer) having no adverse effect on the setting of the grout, on the contrary, (3) resulting in a very high early strength.

Normally, grout for injection in ducts in connection with poststressed concrete does not contain coarser particles (sand), as this would impede the flow of the mass. Grout according to the invention may, like conventional grout, be without any content of sand or any other additional bodies. However, the strongly improved coherence of the fluid mass of the invention with virtually no bleeding makes it possible to introduce sand into the grout thereby obtaining an even more rigid hardened structure, at the same time retaining an easily flowable grout. This has been demonstrated in an experiment (Example 11 in International Patent Application No. PCT/DK79/00047) where fluid coherent cement-silica mortar containing sand up to 4 mm was easily poured into an about 2.5 m long very narrow duct (18 mm diameter), mainly due to the action of gravity, thereby forming a very dense structure.

Along the very same line, the invention also makes it possible to produce strongly improved prepacked concrete (where voids between the pre-placed stones are filled with a fluid mortar). The improvement obtained through the non-bleeding highly fluid mortar obtained according to the present invention may be utilized both in dry-casting and in sub-water-casting.

A special way of injecting grout, securing both good filling of narrow spaces (typically with paste) and filling of large bulk cavities with coarser particles (typically with concrete) by a two-step method is dealt with in the section "MULTI-STAGE INJECTION".

MANUFACTURING METHODS

Articles comprising the DSP matrix may be shaped in a low stress field from a composite material comprising
  (A) bodies of a size of from about 50 Å to about 0.5$\mu$,
  (B) bodies having a size of the order of 0.5–100$\mu$, and being at least one order of magnitude larger than the respective particles stated under (A),
optionally
  (C) compact-shaped solid particles of a material having a strength exceeding that of ordinary sand and stone used for ordinary concrete, typically a strength corresponding to at least one of the following criteria:
    (1) a die pressure of above 30 MPa at a degree of packing of 0.70, above 50 MPa at a degree of packing of 0.75, and above 90 MPa at a degree of packing of 0.80, as assessed (on particles of the material having a size ratio between the largest and smallest particle substantially not exceeding 4) by the method described herein,
    (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), as assessed by the method described herein,
    (3) a Moh's hardness (referring to the mineral constituting the particles) exceeding 7 and
    (4) a Knoop indentor hardness (referring to the mineral constituting the particles) exceeding 800,
  said particles having a size of 100$\mu$–0.1 m,
  a liquid,
  and a surface-active dispersing agent,
the amount of bodies B substantially corresponding to dense packing thereof in the composite material with homogeneously packed bodies A in the voids between bodies B, the amount of liquid substantially corresponding to the amount necessary to fill out the voids between particles A and B, and the amount of dispersing agent being sufficient to impart to the composite material a fluid to plastic consistency in a low stress field of less than 5 kg/cm$^2$, preferably less than 100 g/m$^2$,
and optionally
  (D) additional bodies which have at least one dimension which is at least one order of magnitude larger than the particles (A).

It is to be noted that although the amount of surface active dispersing agent is defined in claim 30 by stating the conditions which must be fulfilled in order that the amount be sufficient to disperse the particles in a low stress field (which, expressed in another way, indicates the use of an extremely high amount of the surface activity dispersing agent), this does not mean that the composite material is necessarily used in a low stress field; it may also be used in a higher stress field. Articles with densely packed superfine particles are obtained from a composite material of the above type where the particles A are present in a volume substantially corresponding to dense packing to fill the voids between particles B when densely packed.

The surface-active dispersing agent is present in an amount sufficient to allow dense packing of the particles (A) in a low stress field of less than 5 kg/cm$^2$, preferably less than 100 g/cm$^2$, and the ideal amount of the dispersing agent is one which substantially corresponds to the amount which will fully occupy the surface of the particles A. FIG. 2 in International Patent Application No. PCT/DK79/00047 shows ultra fine silica particles covered with a layer of a dispersing agent, a so-called superplasticizer "Mighty", the composition of which is described below. Under the assumption that the superplasticizer is absorbed in a uniform layer at the surface of the silica spheres, the calculated thickness, with reference to applicant's own experiments, was 25–41 Å, corresponding to a volume of 14–23% of the volume of the spheres. It is to be noted that a surplus of the dispersing agent over the amount which will fully occupy the surface of the ultra fine particles, will not be advantageous and will only tend to take up too much space in the composite material.

Any type of dispersing agent, in particular concrete superplasticizer, which in sufficient amount will disperse the system in a low stress field is useful for the purpose of the invention. The concrete superplasticiser type which has been used in the experiments described in the Examples to obtain the extremely valuable results in Portland cement-based systems is of the type comprising alkali and alkaline earth metal salts, in particular a sodium or calcium salt, of a highly condensed naphthalene sulphonic acid/formaldehyde condensate, of which typically more than 70% by weight consist of molecules containing 7 or more naphthalene nuclei. A commercial product of this type is called "Mighty" and is manufactured by Kao Soap Company, Ltd., Tokyo, Japan. In the Portland cement-based silica dust-containing composite materials according to the invention, this type of concrete superplasticiser is used in the high amount of 1–4% by weight, in particular 2–4% by weight, calculated on the total weight of the Portland cement and the silica dust.

Other types of concrete superplasticizers useful for the purpose of the present invention appear from Example 2 of the present application.

Portland cement-based composite materials of the type defined above will often contain additional fine particles of suitable size and size distribution together with the Portland cement particles, such as fine sand, fly ash, and fine chalk, to obtain even more dense binary structures formed from the particles B in accordance with the principles discussed above.

Both with respect to its unique shaping and workability properties as discussed above and illustrated in greater detail in the examples below, and with respect to its capability of gently fixing and, in the final shaped state, extremely effectively micro-locking or micro-jacketing any incorporated additional bodies, the composite material shows uniquely advantageous properties which have not previously been reported or indicated for any material, and hence, such novel and extremely useful composite materials constitute important aspects of the present invention.

Interesting novel composite materials of the invention are Portland cement-based or not Portland cement-based materials containing, as additional bodies, bodies selected from the group consisting of polystyrene bodies, including polystyrene spheres, expanded clay, hollow glass bodies, including hollow glass spheres, expanded shale, perlite, natural lightweight aggregate, gas bubbles, fibers, including metal fibers such as steel fibers, plastic fibers, glass fibers, Kevlar fibers, asbestos fibers, cellulose fibers, mineral fibers, high temperature fibers and whiskers, including inorganic nonmetallic whiskers such as graphite whiskers and $Al_2O_3$ whiskers and metallic whiskers such as iron whiskers, heavy weight components such as baryte or lead or lead-containing mineral, and hydrogen-rich components such as hollow water-filled particles. When the composite material is Portland cement-based, that is, contains at least 20% by weight of Portland cement particles as particles B, sand and/or stone as sole additional bodies will result in important novel mortar and concrete composite materials.

Important composite materials of the present invention are the materials in which the particles A are silica dust particles having a specific surface area of about 50,000–2,000,000 $cm^2/g$, in particular about 250,000 $cm^2/g$, and the particles B comprise at least 50% by weight of Portland cement. In these composite materials, the dispersing agent is preferably a concrete superplasticiser in a high amount resulting in the above-defined dispersing effect.

In accordance with the principles discussed above, the composite material for making the articles of the invention has a very low ratio between water and cement and any other particles B+silica dust, this ratio being 0.12 to 0.30 by weight, preferably 0.12 to 0.20 by weight, and the silica dust may be present in a volume which is about 0.1–50% by volume, preferably 5–50% by volume, in particular 10–30% by volume, of the total volume of the particles A+B.

In accordance with a special aspect of the invention, the composite material is packed and shipped as a dry powder, the addition of the liquid, typically water, being done on the job. In this case, the dispersing agent is present in dry state in the composite material. This type of composite material of the invention offers the advantage that it can be accurately weighed out and mixed by the producer, the end user just adding the prescribed amount of liquid and performing the remaining mixing in accordance with the prescription, e.g., in the manner described in Example 11 in International Patent Application No. PCT/DK79/00047.

The invention also relates to a process for producing a shaped article, said process comprising combining (A) bodies of a size of from about 50 Å to about 0.5$\mu$, and (B) bodies having a size of the order of 0.5–100$\mu$ and being at least one order of magnitude larger than the respective particles stated under (A), a liquid, and a surface-active dispersing agent, the amount of bodies B substantially corresponding to dense packing thereof in the composite material with homogeneously packed bodies A in the voids between particles B, the amount of liquid substantially corresponding to the amount necessary to fill the voids between particles A and B, and the amount of dispersing agent being sufficient to impart to the composite material a fluid to plastic consistency in a low stress field of less than 5 $kg/cm^2$, preferably less than 100 $g/cm^2$, optionally (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, as assessed (on particles of the material having a size ratio between the largest and smallest particle substantially not exceeding 4) by the method described herein, (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), as assessed by the method described herein, (3) a Moh's hardness (referring to the mineral constituting the particles) exceeding 7 and (4) a Knoop indentor hardness (referring to the mineral constituting the particles) exceeding 800, said particles having a size of 100$\mu$–0.1 m, and optionally (D) additional bodies which have at least one dimension which is at least one order of magnitude larger than the particles A, by mechanically mixing the particles A, the liquid, and the surface active dispersing agent, optionally together with particles B, particles C and/or additional bodies D, until a viscous to plastic mass has been obtained.

and thereafter, if necessary or if desired, respectively, combining the resulting mass with particles and/or bodies of the type mentioned above (B, C, D) by mechanical means to obtain the desired distribution of the components, and finally casting the resulting mass in the desired shape in a stress field, optionally with incorporation of particles C and/or additional bodies D during the casting.

It should be noted that the low stress field stated defines the amount of dispersing agent to be used and does not necessaarily means that the process is in fact carried out in a low stress field. However, the fact that it can be performed in a low stress field constitutes one of the main advantages of the process, and preferred low stress fields (which are preferably below 5 kg/cm$^2$ and more preferably below 100 g/cm$^2$) used for shaping the mass are: gravity forces acting on the mass, such as self-levelling out of a cast soft mass, or forces of inertia acting on the mass, such as in centrifugal casting, or contact forces, such as pressure compaction, rolling or extrusion, or the simultaneous acting of two or more of the above forces, such as in combined vibration and pressure compaction. Also, oscillating forces with a frequency between 0.1 and $10^6$ Hz may be used to shape the mass, the oscillating forces being of the type described above, such as forces from mechanical or hydraulic vibrator, or such oscillating forces may be combined with non-oscillating forces such as in combined vibration and pressure compaction.

For most practical purposes, the liquid used in the process is water, and the dispersing agent is often added together with the water so that an aqueous solution of the dispersing agent is added, but it is also within the scope of the present invention to incorporate the water separately from a solution of the dispersing agent, the dispersing agent being combined with the water in the mixing process. It is characteristic that a mixture conforming with the above-stated definition will have a very "dry" appearance during the mixing stage until it converts into a viscous plastic mass, this "dryness" being due to the low fluid content.

The fabrication technique for producing the shaped articles according to the invention must naturally be specially adapted to the specific type of composite material in question and the specific type of shaped article in question. There are, however, some general trends:

(1) The powders of the matrix (particles A and B) should preferably be available as well dispersed as possible before intermixing. If the dispersion in dry condition is insufficient, e.g. if particles A are aggregated, some sort of dispersing action, such as grinding, may be applied.

(2) The mixing must secure homogeneous mutual distribution of the solid particles A and B. This may be obtained by dry mixing or by wet mixing where a premix of liquid and either particles A or particles B is mixed with the respective remaining particle type. This mixing step may be performed with or without additional bodies.

(3) Incorporation of the liquid either to the dry-mixed powder (particles A+B) or to either particles A or particles B in case of pre-mixing of a wet slurry as mentioned under 2) may be performed either by adding the powder to the liquid (preferably under strong mechanical stirring) or by adding liquid to the powder mass (preferably under strong mechanical kneading). Which of these methods to be used will largely be a question of experience. However, it is presently believed that in preparing a relatively easily flowing mass from well-dispersed powder, the most easy method is to perform the mixing by adding the well-dispersed powder to the stirred liquid, to avoid the liquid meniscus between particles which would occur in the reverse process in which small amounts of liquid were added to the powder. On the other hand, when poorly dispersed ultra fine powder is added to the stirred liquid, the powder may not be sufficiently dispersed by stresses introduced during stirring, even with addition of dispersing agent. In this case, incorporation of the liquid in the powder under high shear kneading is preferable as the kneading in combination with dispersing agents may achieve a considerable dispersing effect. In the Examples (which are mainly based on Portland cement+silica dust), the method of adding liquid to the powder under kneading/mixing (with a rather modest shear stress of approximately 100–1000 g/cm$^2$) was applied. For the most fluid materials (mortar and concrete with water/(cement+silica) ratio of 0.18 to 0.20 by weight) it is believed that the reverse technique might have been used equally well. For the more stiff mixes (pastes for extrusion containing fibers and with a water/(cement+silica) ratio of 0.13 to 0.15 by weight) it is, however, believed that the reverse technique would not work at all; in these cases valuable part of the mixing occurred in the extruder where a relatively high kneading took place (in the range of 1 kg/cm$^2$).

4. The dispersing agent is not necessarily introduced as a solution in the liquid (it might be added as a powder to be dry mixed together with the particles A and B). For some systems, it is preferable to wet the surface of the particles with part of the liquid before adding the solution containing the dispersing agent, such as it is recommended in the known art with superplasticized Portland cement suspensions. This was also done in the cementsilica experiments described in the Examples of International Patent Application No. PCT/DK79/00047, except in Example 11 thereof. It is worthwhile to note that the mixing time of the very dense wet mix may be drastically prolonged compared with traditional mixing. This was in particular the case for the relatively stiff mixes (extruded paste with water/(cement+silica dust) ratio of 0.13 to 0.15, cf. Example 2 of International Patent Application No. PCT/DK79/00047) and for the medium stiff mixes (water/(cement+silica dust) ratio of 0.15 to 0.16, cf. Examples 3 and 9 of International Patent Application No. PCT/DK79/00047 where a mixing time of approximately 15 and 5 minutes, respectively, was necessary for changing the consistency from an almost dry appearance to that of a dough and a fluid a viscous mass, respectively. For the concrete with a water/(cement+silica dust) ratio of 0.18, there was also a prolonged mixing time, but not as marked as for the very low water/powder ratio systems. It is believed that the local transport of the molecules of the dispersing agent to and between the surfaces of the densely packed solid particles is the time-consuming factor of the process (this transport being more difficult, the smaller the ratio water/powder is). The consistency of the material is very sensitive to the amount of liquid. Thus, very small amounts of additional liquid may change the consistency from stiff dough-like to easily flowable. In a superplasticized cement-silica mixture, this change can be achieved by changing the water/(cement+silica dust) ratio from 0.14 to 0.18.

Introduction of the dispersing agent as a dry powder to the dry mix before adding water seems to be an equally valuable way of producing the casting mass of the invention. This was demonstrated in Example 11 of International Patent Application No. PCT/DK79/00047 where this procedure was used, resulting in a mortar with substantially the same flowability and appearance as one made from almost the same components, but mixed as described above with addition of the dispersing agent as a solution to the pre-wetted mix (vide Example 9, Mix No. 1, of International Patent Application No. PCT/DK79/00047).

For any specific system, there is a level at which the system is saturated with superplasticizer and over which there is no beneficial effect in adding further superplasticizer. This saturation point increases with decreasing water/(cement+silica dust) ratio. Above this level, the material is not sensitive to the amount of dispersing agent.

5. The incorporation of the bodies and optionally D may be performed at any operational stage such as during the dry mixing or after wet mixing etc. The preferred technique to be used in the specific cases depends on the character of the bodies C and D and is a question of experience. In the case of concrete and mortar it is important to secure a relatively dense packing of the added sand and stone in order to secure a relatively small void to be filled with the dense binder matrix of the invention. When incorporating fine fibers, usual techniques such as shaking/mixing, paddle mixing, and kneading mixing may be applied. With incorporation of continuous fibers or filaments or pre-arranged fibers such as fiber nets or webs, according to known technique, a valuable fiber orientation or fiber arrangement is obtainable. Quite generally, the same techniques may be used for incorporating additional bodies in the matrix of the invention as for known matrices, but due to the substantial absence of locking surface forces between the particles, it will generally be easier to obtain efficient incorporation.

6. The casting, including compaction, may be obtained in the low-stress fields mentioned above. The new type of material will be well-suited for transportation by pumping due to the substantial absence of bleeding, and the viscous character of the mass. As the casting mass, however, consists of a particulate matter with virtually no locking surface forces between the individual particles, vibration and especially high frequency vibration may strongly assist the casting, as the mutual oscillating displacement of adjacent particles will considerably facilitate the flowing.

7. The solidification of the material of the invention differs from solidification of the corresponding articles based on less densely packed matrices in two respects:

Firstly, as the structure is more densely packed, the solidification will be faster (early strength). Secondly, the solidification may be influenced by the rather large amount of dispersing agent which is necessary in order to obtain the specific structure. In the Portland cement-silica-Mighty systems, high early strength was obtained, but a modest retardation of the curing was noted (4-8 hours). In the actual Portland cement-silica-Mighty systems, it was shown, such as could be predicted from the expected calcium silicate hydrate structure to be formed, that extremely good quality could be obtained by curing at as well approximately 20° C., 80° C. and 200° C. (autoclave), which means that the novel matrix is useful for traditional low temperature curing, heat curing, and autoclave treatment. Heat curing (which in normal concrete leads to slightly smaller strength than curing at low temperature) probably seems to be the most promising curing technique for the material of the present invention.

In accordance with what has been stated above, the volume of liquid incorporated in the process is preferably so that substantially no liquid escapes from the mass during the shaping process, which results in several advantages in comparison with known processes where liquid, typically water, is removed from the sludge during the shaping process, typically by some kind of filter pressing operation.

While the process of the invention can be said to constitute completely new technology, it can also be considered as a valuable modification of existing technology. For example in the preparation of fiber cement products according to the Magnani process, shaping (from a dilute cement/fiber/water slurry) through rolling is performed, with concomitant removal of water by suction. When incorporating ultra fine particles and the extremely high amounts of dispersing agents in the mass to be processed in accordance with the principles of the present invention, these known technologies can be modified to produce, by extrusion or rolling at a shaping pressure of up to 100 kg/cm$^2$, an (even more dense) material from a viscous/plastic mass which already shows the final low water content so that no water or substantially no water is removed from the mass during the shaping process, and hence, no suction arrangement is requred.

As indicated above, additional bodies D may (like the bodies C and, to a certain extent, the bodies B) be incorporated at various stages during the process, and these additional bodies D are of the various types discussed in great detail in the preceding text, the only limitation being, of course, that some type of additional bodies such as reinforcing bars or tendons in prestressed concrete can only be incorporated during the casting stage and not in any previous stage.

Unique improved possibilities of submersed, in particular underwater construction comprise pouring a cement paste, mortar or concrete of the type of the present invention in the form of a coherent mass into a liquid, typically into water in the sea, a harbour or a lake, and allowing the mass to displace part of the liquid and arrange itself as a coherent mass.

Other possibilities of utilizing the extraordinary shapeability properties of the viscous to plastic mass are to shape articles by spraying, painting, or brushing to shape layers on other articles or to shape an article layer by layer, injection or simple hand application of a layer of the mass on a surface and conforming the mass to the shape of the surface. Centrifugal casting technique is another attractive shaping method useful in connection with the process of the invention.

In the same manner as disclosed in International Patent Application No. PCT/DK79/00047, the articles of the present invention may be further subjected to impregnation to further increase their strength and improve their properties. The preferred materials and methods for performing the impregnation are the same as disclosed in International Patent Application No. PCT/DK79/00047. A special feature of the present invention is the preparation of ultra strong DSP matrices by exchange of inter-particle liquid in pre-arranged systems, such as is described in greater detail in the following section "HIGH RESISTANCE, ULTRA STRONG DSP MATERIALS".

When the particles A are to be densely packed in the materials of the present invention, they are preferably of a size of from 200 Å to about 0.5μ.

While particles A used in the Examples were $SiO_2$ particles formed from vapour phase (in connection with the production of silicium metal in an electric furnace), also other ultrafine $SiO_2$-containing particles may be used, in particular the particles mentioned in International Patent Application No. PCT/DK79/00047. However, also in connection with the present invention, the particles formed by growth from a vapour phase are preferred.

Casting Adjacent to or Between Surfaces

A novel application of concrete, mortar and similar materials has been made possible with the extremely strong, room temperature-moldable materials of the present invention and of International Patent Application No. PCT/DK79/00047, namely the molding of articles with an external shell and an internal part which is totally or partly filled with the strong materials of the present invention and of International Patent Application No. PCT/DK79/00047 (concrete, mortar, paste etc., reinforced or non-reinforced).

This makes it possible to combine desired specific surface properties of the articles (chemical, optical, thermic, mechanic, magnetic etc.) with good bulk properties (especially high mechanical strength and rigidity) and simple preparation technique (separate preparation of shell with subsequent introduction of flowable concrete, mortar or paste). This constitutes a particular aspect of the present invention.

There is a number of advantages and potential advantages associated with separate preparation of hollow shells which are completely or partially filled with the materials of the present invention and of International Patent Application No. PCT/DK79/00047:

1. The preparation of the surfaces (shells) of the articles may take place independently of the preparation of the interior load-bearing reinforced core, that is, in environments (with respect to temperature, pressure, exterior facilities, etc.) which are not limited by requirements imposed by the interior core (extrusion of plastic, preparation of glass or ceramics shell, etc.)
2. Very large thin-walled members with monolithic reinforced load-bearing core may be prepared. For example, it is possible to produce long stretches of tubes with monolithic strong reinforced core in the tube walls (for example, in connection with lines on the sea floor where tubes having hollow walls of plastic or the like are correctly positioned, the interspace being filled with stone and reinforcement, whereafter the tubes are filled with paste or mortar according to the disclosure of International Patent Application No. PCT/DK79/00047 or according to the present invention by injection).

Other members which may be prepared in this manner are ship hulls, large building sections, tunnel linings and the like.

3. The mold work is simpler than in constructions where the load-bearing reinforced concrete or mortar is first produced in a special mold and is thereafter provided with the surface materials. In accordance with the principles of this aspect of the present invention, the surface coating functions as shuttering.

STRUCTURE FORMATION

Curing Contraction of Portland Cement-based DSP Matrices

On solidification of the cement-based DSP material, a volume contraction takes place as is the case with ordinary cement paste. The volume contraction is considerably higher for the new binder material, 2% against 0.5–1% for ordinary cement paste. This contraction may result in undesirable crack formations and change of shape.

The volume contraction is due to the fact that water is being consumed during the chemical structure formation and that the reaction products formed have a smaller volume than the components from which they are formed. This results in internal cavitations and thus internal liquid menisci, causing tensile stresses in the liquid phase which compress the powder mass. The finer the powder material the higher the meniscus-determined tensile stresses and thus the contractions forces. Therefore, when using powder which is 50–100 times finer than cement, considerably stronger contraction force prevail than in ordinary cement paste.

This is, e.g., known from draining out of soil, where fine clay shows a distintive volume contraction, while coarse sand does not substantially change its volume. The volume contraction is also strongly dependent on the hydration products formed, e.g., calcium silicate hydrate, during the hardening, especially their ability to create internal contraction stress when less strongly bound water is moved for being consumed elsewhere in the hydration process.

Various precautions may be used or contemplated to reduce or eliminate the volume contraction of the binder, reduce the volume contraction of the composite material and/or reduce or eliminate possibly damaging effects of the volume contraction of the binder—especially crack formation.

(1) changing the interface tension between liquid and gas and/or between liquid and solid in order to reduce the gas-liquid-surface tension and/or increase the contact angle in order to decrease the contraction forces. This could be obtaine by adding surface active substance or by changing (increasing) the temperature.

(2) Adding liquid as compensation for liquid consumed for chemical reaction. The liquid is added from outside to the surface of the article or from inside through channels from an external source or from internal sources, where the liquid may be present in the liquid state (e.g. in porous sand or stone grains or fibers) or in the solid state (e.g. as ice which melts later) or chemically bound (so that the liquid is e.g. released or chemical or thermic influence).

(3) Changing (increasing) the volume of the pore liquid and thus compensating for chemical loss of liquid, e.g. by heating. (Normally, the thermic volume changes of liquids are considerably greater than those of solids).

(4) Reducing the volume contraction of the composite material by using a dense packing of rigid coarse particles—typically sand and stone. Thus, the volume contraction in mortar and concrete will typically be reduced to 1/10 compared with the pure paste.

(5) Impeding formation of internal cracks caused by contraction tendency by
  (a) increasing the energy required for opening a crack, e.g. by using sharp-edged sand and stone materials and/or fibers and other reinforcement (the inventor has successfully used fine wollastonite fibers, various glass fibers, steel fibers and plastic fibers),
  (b) increasing the rigidity of the composite material e.g. by using dense packing of sand and stone.
  (The background of both of these measures is to be found in fracture mechanics, as, according to linear elastic fracture mechanics, the rupture tension is proportional to the square root of the cracking energy multiplied by the modulus of elasticity).
  (c) the incorporation of bodies, which, due to their size, shape, or surface configuration could function as internal crack initiators and could act as guides for already formed cracks, such as would be the case with, e.g., large bodies with sharp protruding corners and smooth surfaces.

(6) Avoiding that the member, during curing, is exposed to damaging tensile stresses. This may e.g. be obtained by curing in a compression stress field and/or by securing a uniform contraction of the article e.g. through appropriate mold design (including use of flexible molds of rubber and similar materials).

(7) Creating a more volume-stable chemical structure of the hydration product, e.g., by incorporating more calcium-rich ultrafine particles such as calcium carbonate particles, in accordance with what is described in the following section "Use of Ultrafine Particles to Improve the Chemical Structure of DSP Materials".

(8) By heat-curing (low pressure steam curing or autoclaving).

(9) By use of components which consume less water during the hydration process, e.g. by utilizing cements with less than normal $C_3A$ content.

(10) By using expanding agents, such as aluminum powder, which will compensate for the contraction by an expansion proceeding simultaneously with the contraction. Also, other typical cement-expanding agents may be used.

Use of Ultrafine Particles to Improve the Chemical Structure of DSP Materials

A particularly useful form of DSP materials comprises particles B and A, where the structure formation takes place by partial dissolution in a liquid and precipitation, the particles B being the more reactive. Typically, particles B are Portland cement (d~5 $\mu$m) and particles A are silica dust (d~0.1 $\mu$m).

The dense DSP-structure is shown in FIGS. 1 and 68.

On structure formation, a new structure is formed which glues together the remaining parts of the original particles (probably the major part), which results in a coherent structure.

It is desired to control this structure formation, both on colloidal level (i.e. how the gluing material is distributed in the particle A space, whether uniformly or concentrated in the neighbourhood of particle B) and on atomic level (i.e. how the chemical structure is constructed).

As an example it might be interesting to consider a system of Portland cement and silica dust (typically with mean particle sizes of 5 $\mu$m and 0.1 $\mu$m, respectively) arranged according to the principles for DSP-materials (vide FIGS. 1 and 68).

The solid structure is based on a combined cement-water-reaction and cement-water-silica-reaction wherein
  (1) material from the silica dust to a larger or smaller extent (by dissolution and reaction) forms part of the formed solid calcium silicate hydrate structure.
  (2) The distribution of the calcium silicate hydrate throughout the space between the remaining solid particles is not believed to be uniform, typically, there is a higher concentration near the surface of the cement particles (the cement being typically the main producer of "structural material"). Thus, it is likely that volumes in the interior between the cement particles (vide the circle in FIG. 68) may suffer from shortness of calcium silicate hydrate and therefore may be impeded from gluing the remaining silica particles in a very dense structure.
  (3) It is also likely that the distribution of elements in the chemical structure formed is uneven, typically with a higher concentration of calcium in the neighbourhood of the cement particle surface and a surplus of silicium in the calcium silicate hydrate formed in the space occupied by silica dust.

It it desired to control the structure and the structure formation in detail, which means increasing the amount of structure formed in the silica particles' interspace structure, also in a greater distance from the cement surface and introduce a high degree of calcium control with respect to the calcium silicate hydrate formed. According to the invention, the missing elements (or other desired elements) are added to the fine particles, typically in the form of other fine particles.

Thus, a natural measure to solve the problem would be to add ultra fine Portland cement to the fine silica, i.e., to replace 20-80% of the silica with ultra fine cement which is typically 2-10 times finer than the Portland cement or even more.

This measure considerably decreases the size of the micro volumes filled with silica dust, typically a reduction by a factor of 2 to 10 or even more.

However, this procedure has two drawbacks
  (1) the very fine reactive cement may cause production trouble by too fast chemical reaction (stiffening effect). (This effect is, however, not always undesired, as it may be used in a controlled fast setting, which is highly desirable.)
  (2) The very fine reactive particles may dissolve completely with the result that they do not participate in forming the desired ideal particle based structure.

According to an embodiment of the present invention, ultra fine particles A are used as a calcium source which is a far less reactive form than cement, e.g. by using colloidal calcium carbonate (particle size typically below 0.5 $\mu$m) in the Portland cement silica system. Calcium carbonate would normally be considered very sparingly soluble in water and is slowly soluble when used in larger grain form, but due to the large specific surface (typically 10–1000 m$^2$/g), the solubility and the rate of the solution are increased, which makes it possible to combine the desire to preserve the particles during the first few hours after mixing with water (partly adjusted by surface-active agents) and the desire of reasonable reactivity with water and neighbouring particles of SiO$_2$ during the hardening.

The system behaviour may be improved/optimized by several means:

(1) geometrical balance, i.e., arranging ultra small Ca(CO$_3$)$_2$ particles (d~0.01 μm) in the space between the silica particles.

(2) Using extremely small Ca(CO$_3$)$_2$-particles, hereby increasing the solubility of the Ca(CO$_3$)$_2$ (according to thermodynamics of small particles). The benefit of this effect requires particles which are typically below 100 Å (diameter), preferably below 20 Å, e.g. smaller than the particles A.

(3) Using means to change the solubility (increased or decreased temperature) or change in chemical composition of the liquid, i.e., a solution of CO$_2$ in water strongly increases the solubility of Ca(CO$_3$)$_2$.

Hence, an embodiment of the invention comprises incorporating calcium carbonate particles having a size of from about 20 Å to about 0.5 μm among the particles A. The ratio between the calcium carbonate particles and the silica dust may vary within wide limits, such as between 1:99 and 99:1.

APPLICATIONS

Due to its extreme tightness and mechanical strength, the material made possible by this invention is useful in a wide range of articles, examples of which are a sheet or panel of thin-walled plane or corrugated shape, such as sheets or panels of the same shapes as the known art asbestos cement products; a pipe; a tube; a refractory lining (e.g., applied as a complete lining) or a refractory lining component (such as a building stone for a refractory lining); a protecting cover (e.g. to protect other materials against chemical influences) such as a cheap protecting cover applied on steel, e.g. steel tubes or pipes, or on ordinary concrete products so as to supply concrete products with a noble surface which is strong, abrasion resistant, and acts as a sealant against influence from the surrounding environment, protecting covers on masonry, pavements and roads, utilizing the same beneficial characteristics of the novel material, and protecting covers on roofing panels or tiles, or on containers; a roofing material such as a roofing panel or tile; an electrically-insulating member; a nuclear shielding for protection against radioactive action (for radioactive-based reactor constructions, etc.) a seafloor structure for deep water applications; a machine part; a sculpture; a container; an in situ cast oil well wall; or a load-bearing member in structural engineering utilizing the extreme strength qualities of the material and its resistance to climatic influence, such as a beam, a shell, or a column, typically as reinforced concrete, especially as pre-stressed concrete.

Seafloor structures for deep water applications, e.g. spherical containers to withstand large hydrostatic pressures require concretes of a high strength, high durability and low permeability.

"Polymers in concrete", ACI Publication SP-40-1973, P 119-148, report model tests on small 16 inches diamether spherical hulls made of high quality polymer-impregnated concrete for deep water applications. Full impregnation was obtained by a complicated drying-vacuum outgassing-pressure procedure which is, in practice, limited to small size members. With the materials and processes according to the present invention, it is now possible to produce such structures in large scale (several meters in diameter) with a similar high quality material by a simple fabrication technique.

Some examples of applications of the DSP materials have already been given. Other examples are the following structures which may be produced by casting adjacent to or between surfaces:

Large electric insulators are today made from glass or ceramic materials, especially because of the excellent insulating properties of these materials. It is of special importance to prevent currents along and in the surface layers. Besides, large insulators demand high mechanical strength and a good ability to absorb mechanical energy. This is difficult to obtain with brittle materials such as glass and ceramics to which it is difficult to impart "toughness" by reinforcement (due to the fact that they are shaped from fluid masses at high temperatures and solidify under relatively great volume changes). However, in accordance with this aspect of the present invention, high material strength and good ability to absorb mechanical energy may be obtained in such large electrical insulators by producing large hollow jackets or shells of glass or ceramics which are fortified with reinforced high quality DSP concrete, mortar or paste prepared by casting of soft mass (injection, etc.); the reinforcement may be placed in advance in the interior of the jacket or shell (large steel bars, etc.), or the reinforcement may be part of the casting mass (e.g. chopped fibers).

It is contemplated that this will make it possible to realize a cheaper production of large insulators in the sizes in which they are produced nowadays, and to produce far larger insulators than those known today.

Furniture, shelves, doors etc., which, due to requirements concerning appearance, tactile sensation, cleanability, chemical durability, etc., require special surface properties combined with good mechanical bulk properties (strength, toughness) may be prepared from hollow members of plastic, metal and the like (e.g. prepared by extrusion) which are filled with a reinforced DSP binder by pouring, injecting etc.

Strongboxes and other strong containers which may be produced by filling the cavities in doors and walls with the DSP material by casting of soft mass (injection etc.); all or parts of the internal reinforcement and hard components (e.g. bauxite stone) may be placed in advance.

Containers for radioactive waste in which the radioactive waste is cast into the above-mentioned strong materials, by injecting a paste or mortar of the DSP materials into the container room in which all or part of the reinforcement, the radioactive waste in solid form and various rigidity-imparting elements (e.g. bauxite stones) have been placed in advance.

Very large sculptures of desired surface materials, which in an inexpensive way may be given the required mechanical strength by filling a thin shell with reinforced mortar or concrete prepared according to the principles mentioned in the previous examples.

Load-bearing constructions with special requirements for surface materials (pillars, walls, floors, roof elements etc.)

Ship hulls with an exterior and an interior of materials with special properties (e.g. smooth exterior and heat insulating interior) where the necessary part is filled with reinforced DSP concrete, mortar or paste by injection etc.

Tubes with an exterior and an interior comprising materials with special properties (e.g. acid resistant interior and heat insulating exterior) where the interspace between the tube walls is filled with reinforced DSP concrete, mortar or paste by injection etc.

As mentioned above, there is a number of advantages and potential advantages associated with separate preparation of hollow shells which are completely or partially filled with the DSP materials. In this connection, it should be emphasized, e.g., that very large thinwalled members with monolithic reinforced load-bearing core may be prepared. For example, it is possible to produce long stretches of tubes with monolithic strong reinforced core in the tube walls (for example, in connection with lines on the sea floor where tubes having hollow walls of plastic or the like are correctly positioned, the interspace being filled with stone and reinforcement, whereafter the tubes are filled with DSP paste or mortar by injection).

Other members which may be prepared in this manner are ship hulls, large building sections, tunnel linings and the like.

The possibility of producing, with a simple casting technique and at room temperature, reinforced concrete, mortar and paste with very high strength and acceptable toughness makes it possible to produce members which are traditionally produced of metal. Such members are in particular large load-bearing members traditionally produced as metal castings (covers, lids, large valves, load-bearing machine parts, etc.) and structural members (masts, beams, and the like).

The high hardness of the DSP materials, combined with the fact that they can easily be made tough through fiber reinforcement, makes it possible to use the materials as milling or grinding bodies and abrasion aggregates, typically produced by ordinary casting of soft mass, extrusion, or compression.

In connection with the claiming of this aspect, the "substantially uniform thickness" is not to be taken as a limitation to particular surface layers with very exactly regulated thickness. Rather, the "substantially uniform thickness" is merely to be understood as a distinction from structures which can no longer reasonably be designated as surfaces or surface layers, such as a rock structure in which a cavity has been filled with the DSP mass.

The statement to the effect that the surface layer or layers should have a structure which is different from the structure of the cured mass cast adjacent to or between the surfaces is intended to reflect the fact that the exterior material is different from the interior material used in the particular case. It is absolutely not precluded that the type of material used for the exterior surface would be the same type of material as is used for the interior material, in other words, would contain a matrix of the same type.

Also in connection with the articles prepared according to this aspect of the invention, an impregnation of the interior material (and of the exterior surface material, if it is of the same general type) may be a preferred treatment to further increase the the strength and durability, and any further impregnation treatment is performed in an analogous manner to the impregnation of the materials which are not molded between surfaces.

TOOLS AND MOLDS FOR SHAPING ARTICLES

The typical DSP materials of the present invention have good strength, hardness, heat resistance and chemical resistance. These properties, combined with the fact that articles of DSP materials may be shaped by very simple processes—casting, vibration, vibroprocessing, rolling, etc.—and that the DSP articles reproduce, down to the last detail, the surfaces against which they are cast, render them extremely well suited as tools and molds for shaping articles by deformation processes.

For many applications, special DSP materials may be used, where specific properties such as ultra-high heat resistance and high heat conductivity is required.

A wide variety of materials may be shaped using tools and molds which are completely or partially made of DSP materials. As examples of materials which may be shaped may be mentioned steel, aluminum, ceramic materials such as $Al_2O_3$, gypsum, cement products, including DSP materials, organic materials such as plastics, wood, etc.

The materials which are shaped using DSP molds or tools may be in various forms such as solid, liquid or gas form or combinations hereof, with correspondingly varying mechanical properties ranging from, e.g. low viscosity at casting with liquid metal to high yield or flow stress at powder compaction or at bending or drawing of steel panels.

The shaping temperature may vary over a very large range from 0 to several thousand centigrades, and the pressure may be varied over a wide range from 0 to more than 1000 MPa.

In many cases, the DSP mold or tool material is advantageously made with a binder of Portland cement and ultrafine particles which are from one to two orders of magnitude smaller than Portland cement, typically silica dust.

When extreme thermal, chemical or mechanical influences are encountered during operation, of the DSP molds or tools, other components of the DSP binder will be taken into consideration, such as refractory cement based on DSP binder or plastic-based DSP binder—the latter typically to increase acid resistance, or the DSP tool may be constructed from materials with a binder of Portland cement reinforced or protected at particularly exposed places by means of other materials, such as materials comprising strong bodies C, or by means of incorporated large bodies of special properties, such as steel hard metal, polytetrafluoroethylene, etc.

The tools or molds may be of wide varying design, ranging from containers in which a casting mass is fed to the orifice of an extruder, to a compression piston or patrix. In all the cases it is characteristic that the surfaces of the tool or mold will, to a greater or lesser extent, be reflected in the articles produced.

One type of shaping process performed in molds of DSP material is liquid casting where the material which is to be shaped is placed, in liquid form, within the mold limitations. Liquid casting may be aided by other means such as pressure (pressure casting), vacuum (vacuum casting), forces of inertia (such as in centrifugal or rotational casting), vibration, and heat.

A special form of liquid casting is slip casting where the material to be shaped consists of solid particles and liquid, usually water, where the casting in molds of a complicated geometry necessitates the use of a surplus of liquid to render the mass fluid. During the casting, the excess liquid is removed by being expelled through the surface of the mold, possibly aided by pressure, vacuum or forces of inertia. One advantage of selecting DSP materials for the slip casting molds is that it is easy to introduce, during the preparation of the mold by casting, channels or ducts securing the desired expulsion of liquid (draining system), and any assisting means necessary (e.g. vacuum ducts).

In liquid casting, the DSP mold material will, in principle, function like a casting mold or part of a casting mold. The DSP materials will normally be completely ideal for this purpose because they are easily shaped in the desired configuration by casting around a prototype or a model of the article to be produced. When the DSP material is a Portland cement-based material, this casting may be performed at room temperature.

In heat casting, where the starting material is to solidify during the casting, it may be essential to be able to control the temperature at the surface of the mold, for example through securing a fast heat transport from the casting mass to obtain a fast solidification, either to ensure a high production capacity, or to influence the structure of the cast material (quenching) or alternatively to secure a slow heat transport in order to obtain particular structures in the cast material (e.g. to avoid thermal stresses). With the DSP materials, it is possible to select suitable, individual material components adapted to their particular heat transport function in the tools or molds or parts thereof (e.g. by including heat insulating or heat conductive particles C to obtain controlled variations of the heat transport).

Also, as mentioned above, it is easy to establish, in DSP molds, cooling or heating or sensing components, e.g. thermocouples, thermosensors, zener diodes, heating resistors, etc., in the molds, or to incorporate ducts, tubes or channels for electrical heating threads and thermosensors. Furthermore, it is possible to introduce, in the DSP molds, means, such as channels, reservoirs, etc., for controlled introduction of lubricating substances during the casting or shaping operation.

Compression or compaction of masses of a plastic character such as steel panels so that the masses will completely or partially fill a defined space is another shaping technique. For this purpose, the DSP materials are suitable both as the patrix and matrix part of the tool. An example of such a tool is a press-tool of Portland cement-based DSP with particles C of refractory grade bauxite for shaping this steel, such as automobile body parts as illustrated in FIGS. 38–40.

Also the compression shaping process may be aided by vibration, vacuum, heat, etc.

In extrusion shaping, a blank having a constant cross section is pressed out, in plastic condition, through a die orifice.

The plastic deformation takes place in the extruder chamber and the die orifice. Both of these components may advantageously be made from DSP materials. Aslo in this case, the possibility of introducing, during the casting of the DSP material, various components in the extruder chamber and shape-defining means, components for regulating heat, lubrication, etc., is of great advantage.

If it is desired to introduce special components, e.g. steel fibers or other materials, at special positions in the extruded article, such components may easily be introduced through ducts in the extrusion mold.

Often, the design of an extrusion chamber is particularly complex, however, the easy shapeability of the DSP materials greatly enhance the possibility of producing extruder chambers in an easy way. One particularly advantageous way is to cast a DSP material against a membrane maintained in the desired configuration by hydrostatic pressure balancing, such as illustrated in FIGS. 34–36, which are to fulfil extreme requirements with respect to performance may be made or coated with, high-quality DSP materials made by designed arrangement of fibers and particles in a low stress field and exchange of interparticle material by infiltration such as described in the section "HIGH RESISTANCE ULTRA STRONG DSP MATERIALS". Tools made of DSP materials may be tools which are driven by motor forces of any kind, but they may also be hand tools such as hammers, files, abrasion tools, etc., where the special properties and design possibilities offered by the DSP materials are utilized.

MOLDS FOR POLYMERS

Molds for polymers are conventionally made by machining in steel. This is normally expensive and time-consuming. Therefore, low cost molds for polymers have also been developed in the known art. Such low cost molds are made, e.g., by machining of easily machinable metals such as aluminum and magnesium, by casting polymer composits based on epoxy, polyester or polyurethane containing fillers of metal powder, often aluminum, by casting of alloys usually based on aluminum and zinc, or by means of metal-sprayed shells.

With the DSP materials, e.g. Portland Cement-based DSP materials, it is possible to produce molds which in many respects have the quality and performance of machined steel molds, but which in at least one respect are far better, namely with respect to their capability of reproducing a prototype of the article to be cast. Due to the capability of the DSP materials to reproduce even the smallest details of a surface against which the DSP material is cast, such as even finger prints on a plastic surface, the shaping surfaces of molds of DSP materials may be provided simply by casting the DSP material against a prototype of the article which is to be mass-produced in the DSP mold. In this manner, a mold for polymers can be produced at very low cost compared to the expensive machined steel molds, and with surface properties corresponding to any desired surface quality of the mass-produced article. (For example, when the article to be mass-produced from polymer is to have a polished surface, the prototype against which the DSP mold is made is provided with a correspondingly polished surface before the DSP mold is manufactured by casting of DSP material against the original).

Another advantage of DSP as material for making molds for polymers is that the cost of the material is lower than the cost of mold quality steel and that the manufacturing of the molds is much easier.

The surface of DSP materials may be designed so that it is readily workable, which can be utilized in cases where it is desired to establish special patterns or configurations, protrusions, cavities, etc. in the DSP mold surface. This is typically done by incorporation of a high concentration of very fine fibers, i.e. by the technique described in the section "HIGH RESISTANCE ULTRA STRONG DSP MATERIALS".

Molds of DSP materials comprising a binder of Portland cement and silica dust and preferably comprising strong bodies C may be made with compressive strengths of 130–260 MPa (the latter value being higher than the yield strength of soft steel which is typically 210 MPa) and tensile strengths of 10–20 MPa (which may be considerably increased by reinforcement with bars or fibers). These DSP materials are very rigid with an elasticity of 50,000–90,000 MPa, which is between $\frac{1}{4}$ and $\frac{1}{2}$ of the elasticity of steel.

The DSP materials operate with retention of the above-mentioned properties in the entire temperature range required in polymer shaping.

The thermal conductivity of the DSP molds may easily be adjusted by the use of insulating sand and stone if low thermal conductivity is desired, and by the use of thermally conductive particles (metals) if high thermal conductivity is desired.

Due to the ease with which DSP materials are cast it is very easy to establish ducts or channels for cooling or heating, etc., and to introduce, e.g. thermosensors in the DSP mold bodies during the casting thereof.

Compared with conventional low cost molds for polymers (Reference 44) the molds made from strong DSP materials offer the following advantages:

(1) Compared with machining in metals: The DSP molds are produced in an easily workable material. Molds made from DSP based on Portland cement and silica dust can retain absolutely satisfactory mechanical quality over the entire temperature range which may be encountered in the molding of polymers. They may be shaped in far more complicated shapes than the conventional low cost molds, and they may precisely duplicate even the smallest detail in the articles to be shaped. The molds may be made in very large dimensions, which makes it possible to produce very large bodies by molding of polymers, such as shiphulls, buildings, automobile bodies, large pontoons, etc.

(2) Compared with molds cast from polymer composites: Molds made with strong Portland cement DSP materials containing strong bodies C show better mechanical properties than the polymer composite molds, especially for high temperature polymer shaping. Also, the DSP molds are made without the health hazards associated with the casting of polymers such as epoxy.

(3) Compared with molds made in metal casting: The DSP molds also have better mechanical properties at high temperatures than molds made of zinc or aluminum. As the DSP materials show smaller hardening contraction than cast metal, it is possible to make DSP molds which can be used in precision shaping (which is not possible with metal cast molds).

(4) Compared with sprayed shells of metal: The DSP molds may be cast at room temperature, thus without danger of damaging the model, and they have higher mechanical resistance than the sprayed shells of metal. On the other hand, if desired, DSP materials could easily be applied as backings on sprayed shells of metal.

CASTING

On several occasions within industry, archeology, construction, natural history, etc. it is desired to copy a sample in such a manner that its shape and surface structure is preserved and maintained in a rigid, durable structure, the surface of which reproduces (often to the smallest detail) the surface and shape of the sample.

In a number of fields, DSP materials are excellent for such purposes, and in certain applications, they even permit the preservation of shapes and surfaces where this has previously not been possible by any casting technique.

Casting is typically performed by shaping the casting mass in fluid or plastic or other deformable condition over the surface of the sample—or the part of the sample—the shape and surface of which it is intended to reproduce, and thereafter solidifying the casting mass to a mechanical solidity which permits removal of the sample with retention of the copied shape.

1. DSP casting mass may be completely easily flowing with typical liquid behaviour (filling even the smallest surface irregularities and self-levelling), or tough and plastic and suitable for shaping by compression against the sample, or in loose form which, by impact against the sample, is assembled into a coherent mass, such as by injection moulding.

2. DSP casting masses are able to reproduce extremely fine details in the micron range, e.g., fingerprints on a plastic surface.

3. DSP casting masses show good volume stability on hardening. The volume stability may be increased by stabilization by means of a high volume content of additional bodies, such as sand, stone, fibers, reinforcement, etc., in the DSP paste (which consists of liquid, particles A, and particles B).

4. DSP casting masses may be shaped over a broad temperature range. Portland cement-water based DSP material may be used without complications of any kind at temperatures from 0° C. to almost 100° C. (referring to processing at atmospheric pressure). By use of autoclave technique, the range may be expanded to far beyond 200° C.

5. DSP casting masses may be shaped over a broad pressure range, thus permitting casting under ordinary atmospheric conditions, under vacuum conditions, e.g., lunar castings, and under high pressure conditions (e.g., deep sea castings).

6. DSP casting masses may be shaped to articles having very high mechanical strength, the compressive strength is typically 100–160 MPa and strong sand and stone such as the strong materials mentioned 180–280 MPa. The tensile strength and ductility may be strongly improved by fiber reinforcement.

This permits preparation of very large casts (several meters) where the known art technique permits only partial castings with the consequent difficulties in rearranging the single parts into correct position.

7. DSP casting masses are especially well suited for shaping under water, where the material, as a coherent mass, displaces water (due to the higher density) and effectively fills any cavity to be filled. The casting of DSP materials under water to effectively fill any cavities constitutes a completely new technology with very broad-spectered utility.

8. The DSP casting mass will normally not incur any chemical damage on the surface to be reproduced. If, on the other hand, there would be a potential risk for such damaging, the surface could be protected through a surface treatment.

9. In many cases, the DSP casting mass will not adhere to the surface. However, where there is a potential risk or such adhesion, the surface may be modified to counteract it, e.g. by means of surface active agents, or by film coating of the surface, or the DSP casting mass may in itself be designed so that it shows suitable release properties.

10. Due to its very good flowability, the DSP casting mass may be brought to exert only very gentle influence on the samples to be reproduced, corresponding to the case where the only influence is the hydrostatic pressure of the fluid DSP mass. In cases where it is desired to reproduce a very easily deformable surface, the effect of unilateral hydrostatic pressure (deformation or crushing) may be balanced be establishing identical hydrostatic pressure at the opposite side of the surface according to the principle of communicating vessels. This technique is especially well suited for casting where the shape of membranes is to be preserved.

Performing the Casting

The casting may be performed in many ways:
1. Filling of cavity with DSP materials of liquid fluidity simply by pouring the DSP material into the cavity, preferably from below or through a tube which extends down to the bottom of the cavity.
2. Filling of cavity with DSP material of liquid fluidity under water (or under another liquid) by pouring, again preferably from below or through a tube extending down to the bottom of the cavity.
3. Filling as under 1 and 2, but aided by pressure, vibration, or centrifugation.
4. Filling as under 1, 2, or 3, aided by vacuum to remove air in any cavity (1) or in the casting mass (1, 2, 3).
5. Prearrangement of additional bodies C (fibres, reinforcement, sand, stone), relevant in any of the methods 1, 2, 3, and 4.
6. Filling of cavity with deformable surface, typically membranes, with retention of the shape of the surface by establishment of identical pressure on the opposite side (by means of DSP material or other liquid having a suitable density.
7. In a manner corresponding to 6, but using injection casting technique.
8. Casting of a surface with plastic DSP casting mass (optionally fiber-supported) which is pressed against the surface, optionally aided by vibration. In this technique, the material may be allowed to harden while in contact with the surface, or the plastic material may be removed from the surface immediately after the pressing. In this case, release agents may be used to assist in the removal of the material.

Applications of the casting technique

The casting technique described above is useful in a great number of applications, typical examples of which are:
1. Archeology, where especially very large casting and, in particular underwater castings may be made which where not hitherto possible, one special example being casting under extremely deep water.
2. The reproduction of the shape of automobile body parts and other parts of shaped metal.
3. The reproduction of the shape of construction members.
4. Through casting against deformable surfaces (through hydrostatic balancing), it becomes possible to cast very large, extremely elegant structures.

SURFACE COATINGS

The present invention also relates to the utilization of DSP materials as surface coatings.

The DSP materials show unique properties as surface coating materials due to their combination of dense and ultra fine structures which results in a strong, dense and diffusion-tight coating on substrates. With respect to application properties, the easy flowability and deformability of the DSP materials secure an easy application of the DSP materials and conformation of the DSP materials to the substrate on which they are applied. This permits the use of traditional techniques for painting and coating in connection with DSP materials, including brushing, spraying, rolling, high pressure spraying, "airless" spraying and, pouring, doctoring, stopping, and filling.

The above principles can be generalized into principles where the material flows onto the substrate by gravity and surface forces (the ideal is that the film of the DSP paint or coating applied should be capable of effectively wetting the substrate), and another principle is combination of the coating and the substrate aided by mechanical means (this includes brushing, stopping and filling, also including vibration utilizing the beneficial effect of the vibration on the particle orientation).

The structure of the DSP material is unique due to the particular structure of the material consisting of densely packed particles B with homogeneously arranged or densely packed particles A. In many cases, it is desired to impart tensile resistance to coatings. In this respect, it is useful to employ fibers. The size, shape, and amount and type of fibers are strongly related to the requirement which the coating is to fulfil and to the dimension thickness of the coating. With specially thin paint film, typically below 1 mm or better below 0.3 mm, it is desirable, in accordance with fracture mechanics, to use ultra thin fibers, preferably in the range from 10 micron to 0.1 micron. In the DSP materials, it is now possible to obtain effective anchoring of such ultra fine fibers. Such anchoring of ultra fine fibers has not been possible in previous surface coating or paint materials.

Due to the dense packing of the particles B and optionally the particles A, the DSP materials will, other conditions being equal, have higher abrasion resistance than conventional comparable materials. Special improvements of the abrasion properties of the DSP materials can be obtained by including the types of bodies C mentioned in Danish Patent Application No. 1945/80, that is, particles C consisting of the materials characterized in claim 17 in Danish Patent Application No. 1945/80, in particular topaz, lawsonite, diamond, corundum, phenacite, spinel, beryl, chrysoberyl, tourmaline, granite, andalusite, staurolite, zircon, boron carbide, tungsten carbide. One preferred type of particles C are particles C consisting of refractory grade bauxite. The particles C may be present in the DSP material used as paint or surface coating material in a volume which is in the range stated in Danish Patent Application No. 1945/80, that is, a volume which is about 10–90% by volume, preferably 30–80% by volume, and in particular 50–70% by volume, of the the total volume of the particles A, B and C.

The size of the bodies C or D may be adapted to the particular requirements concerning surface texture, and film thickness. Thus, the additional bodies C or D may be of sizes from 1 to 40 micron as a typical range for ultra fine coatings (coatings having a thickness in the range of typically 5 to 200 micron), and the additional bodies C or D may have sizes going up to the order of centimeters, typical for coatings of large constructions, such as off-shore constructions, oil tanks, etc.

When the DSP materials are used as paints or surface coatings, they will often be used to obtain anti-corrosion effects such as rust prevention, and for this purpose, it is of importance that cement, such as Portland cement, in itself shown anti-corrosion properties, in particular rust prevention properties when applied on steel surfaces. Therefore, the DSP materials used as paints or coating materials will often comprise Portland cement particles as a major proportion of the particles B. In addition to the chemical rust prevention effects and other anti-corrosive effects exerted by the Portland cement particles, another interesting feature is that DSP materials comprising Portland cement show a considerably reduced electrical conductivity as compared with normal cement materials, which results in improved electrical insulation of the articles coated and thereby reduced galvanic corrosion, etc.

Hence, preferred DSP materials for use as paint or surface coating materials are materials in which the particles B comprise at least 50% by weight of Portland cement particles. Preferred particles A are of the same types as disclosed in the above-mentioned Danish Patent Application No. 1945/80. However, it will be understood that DSP materials useful as paint or surface coating materials are not limited to such constituents, and that the general principles for establishing a dense matrix such as disclosed in the above-mentioned patent applications may also be utilized in connection with the construction of paint or coating DSP materials comprising particles A and B of a different chemical nature, the nature of the particles A and B for any given DSP paint composition being dependent on the particular end use of the paint or coating composition in accordance with general principles within the paint and coating composition art. Obvious embodiments within this aspect are embodiments where the particles B comprise or consist of pigments of the types which have been found useful within general paint technology.

A factor which is of special importance in connection with the utility of a particular material as paint or surface coating composition is the resistance of the composition against peeling from the surface of substrate on which it is applied. In the following, factors influencing the resistance of DSP materials against peeling, partly in the cured stage, and partly in the uncured state, will be discussed:

The resistance of a cured paint or surface coating against peeling is basically a question of obtaining as large a work of separation as possible of the surface from the substrate. The work of separation depends on several factors, such as the binding force between the surfaces and the range of action of the force, or the direction in which the force exerts itself. Taking as an example a tape glued on a non-flexible surface, the ease with which the tape is peeled off depends on the work which is necessary to separate the tape from the surface. In this connection, a very important factor is the deformation of the surface being peeled off.

The work involved in peeling off is the integrated product of peeling force and displacement. For this reason, the following factors increase the peeling resistance:

(a) A good chemical bond between the coating and the substrate (increases the force).

(b) As long a displacement as possible (a long range over which the adhesive forces are active, that is, e.g., a bond constituted by molecules of sufficient lengths to exert plastic or elastic properties in the separation zone).

For this reason, it is preferable to include in DSP materials to be used as peeling resistant surface coatings, substances which, when the coating has set, may exert their forces in a peeling situation, e.g., substances comprising molecules which are capable of attaching on the one hand to the substrate and on the other hand to be anchored in the coating, and molecules which are capable of considerable deformation before the attachment is broken, in particular "long" or "tangled" molecules of high molecular weight, including ionic polymers, silica in polymeric form, including silicones, silanes and siloxanes, polycarboxylates and change of dentin collagen, etc.

Another factor which improves the peeling resistance of a coating is improvement of the molecular behaviour of the molecules of the surface coating. Factors contributing to a good bond in this regard are a beneficial texture of the surface where the DSP materials can benefit from the fact that they show degrees of roughness which are smaller than any previously known level for similar particle-based materials. (E.g. a matrix having an internal "roughness" of about 10 micron cannot anchor a 10 micron particle system, whereas the DSP materials having typically particle A-sizes of 0.1 micron are capable of conforming to or filling roughness cavities in a 10 micron particles size system.) The texture of the surface to be coated may be controlled or influenced by mechanical ways by brushing or grinding, polishing, sand blasting, etc.

It is also possible to incorporate, between the surface to be coated or protected and the DSP material, an intermediate layer which is capable of adhering well to both the substrate and the coating. Such a layer may in itself include properties resulting in a high work of separation, (cf. the above discussion). The material may also be a material which adheres well to the substrate and has a surface, e.g. a surface with exposed fibers, which results in an optimum anchoring of the DSP material. In case of very thin DSP coatings in the range below 1 mm, anchoring elements of fibers in such an intermediary layer should preferably be in the dimension of 0.1–10 micron diameter in order to yield an optimum anchoring with a DSP material. Obviously, it is also possible to use long "anchors" or "large" anchors, including fibers or fiber-like bodies which may be arranged either parallel to the substrate or non-parallel to the substrate, perpendicularly etc.

The resistance of a DSP material against peeling during curing or hardening is also dependent upon the work of separation. In this respect it may be favourable that the coating when applied in uncured condition comprises a layer which has a somewhat lower concentration of the particles A adjacent to the surface to be coated.

With a lower concentration of the particles A immediately at the surface of the substrate, the strain capacity of the system when applied will be increased, because crack openings in liquid-bound saturated particle systems are roughly in the order of magnitude of the particle size as the particles are bound together with liquid minisci which can be 1/5-⅓ of the particle diameter before breaking. (This is in accordance with the well-known technique where, in order to connect old concrete with new concrete, thin water-rich cement paste is brushed over the surface (broomed finishing). To the applicant's best knowledge, the precise description of the beneficial effect of broomed finishing according to fracture mechanics has not been published). The measures mentioned above for improving the adhesion of the hardened or cured surface layers to the surface can also be applied in connection with improvement of the wet peeling properties. Much of the peeling occurs due to differential movement of the film, during hardening, drying, etc. The peeling off forces arise, to a high extent, due to differential movement of the upper layer compared to the lower layer in direction parallel to the coating surface, which would lead to a banana-shaped cross section if there were no peeling resistance. As the peeling resistance depends to a smaller degree on the thickness, a decrease or lowering of the film thickness would be beneficial to reduce peeling in uncured state.

Due to their particular properties with respect to anchoring fine fibers and forming a dense and impermeable surface even in a very low thickness, the DSP materials provide a paint or coating materials which are optimally adaptable to avoid peeling.

One method to counteract peeling in uncured state is to secure a sufficiently flowable or movable liquid suspension of particles A which in itself is able to form minisci between the particles B and the substrate during any attempt of separation. This requires sufficiently easily flowable or movable liquid suspension of particles A which in itself is able to form minisci between the particles B and the substrate during any attempt of separation. (This requires a not too high concentration of particles A in the fluid phase and furthermore that the particles A are considerably smaller than the particles B, typically at least 1, but preferably 2 orders of magnitude smaller than the particles B).

In this connection, the DSP materials are eminently suited because of the construction thereof comprising the particles B with the particles A which are 1 to 2 orders of magnitude smaller. Another measure for counteracting peeling is to render the liquid phase capable of absorbing work to a higher extent, e.g. by incorporating elements of long or tangled structure, e.g. polymer molecules, but also fibers which are of a size range down in the 1 micron range or lower or sub-micron range would contribute to this effect.

In addition to this, measures which tend to increase the strength of the paint or coating layer will also counteract peeling effects, including the application of the DSP paints in several layers to obtain a high quality surface, etc.

The DSP materials may be applied as coatings or part of coatings by placing the material as a coherent mass, e.g. premixed, or by placing the various components separately, either in a specific order, e.g. first the liquid and then the particles, or simultaneously, by simultaneous spraying of particles and liquid, or any combination thereof may be used.

Typically, the DSP material is premixed as a coherent very fluid heavy plastic mass and placed in position on the surface to be covered by means of traditional techniques for painting and coating, including brushing, spraying, rolling, etc., and also including centrifugation. The mass may contain additional bodies of the types mentioned in the above-mentioned patent applications such as fibers, plates, or compact particles, and additives such as accelerators or retarders.

Another method is to premix part of the DSP material and place it according to the above technique in a situation where a sub-layer and/or additional additives and/or additional bodies are pre-placed (typically reinforcement in the form of nets, webs, yarns or ropes of fibers, including steel fibers, mineral fibers, glass fibers, asbestos fibers, high temperature fibers, carbon fibers, and organic fibers, including plastic fibers, which fibers or nets or webs thereof may contain additives such as accelerators) prior to the application of the DSP material. Where additives and/or additional bodies are placed later (typically compact particles, nets, fibers, etc.,) by means of the above-mentioned processes, or where additional bodies are placed simultaneously with the mass or part of the mass. A particularly suitable process is a modified so-called dry-spraying technique where coarse, dry particles (e.g. fine sand, sand and/or stone and/or fibers) are conveyed to the surface and impacted against the surface (typically by pneumatic means) with simultaneous impact of very flowable DSP paste (e.g. superplasticized cement paste with ultra fine colloid silica particles (eller silica dust) with a water/powder ratio of 0.20–0.30). This is in many respects a very interesting process because it overcomes two aspects which have hitherto rendered the use of DSP materials in spraying difficult:

(1) The technique often reported to give the best coating of sprayed concrete is based on simultaneously impacting dry material (e.g. cement, sand or stone) and water. With DSPmaterials, this technique would be problematic, because the surface-active agent (dispersing agent) would not have enough time to exert its function during the compaction process during the ultra short time of impact.

By use of a superfluidized premixed DSP paste as replacement of water in this technique, this problem is overcome.

(2) The elimination of locking surface forces in the DSP materials normally prevents formation of thicker layers of coating which are self-carrying against the action of gravity immediately subsequent to application. By use of thin DSP paste combined with relatively coarser particles (particles C or D) (particle size at least one order of magnitude larger than the maximum size of the particles B, but not too large as this would result in a too small stabilizing liquid meniscus as explained in the following), it is possible to obtain a capillary-bound particle system where the DSP paste is the capillary liquid. The requirements are:
  (a) the amount of DSP liquid should be slightly below the amount necessary to completely saturate the coarse particle system,
  (b) the fluidity and the particle size of the DSP liquid slurry should permit formation of the menisci responsible for the stability,
  (c) the gas/liquid interphase tension responsible for the above-mentioned stability should be as high as possible. (With respect to the latter, the dispersing agent "Mighty" (the chemical composition of which is stated in the above-mentioned patent applications) is excellent as it only acts as dispersing agent with almost nil effect on the water/gas interphase tension), and,
  (d) the smallest particle of the coarse particles should not be too large as the stabilizing force, as a first approximation, is inversely proportional to the size of those particles.

Another very interesting aspect is the use of sedimentation technique to obtain an extremely dense packing of particles in the coating (additional bodies C or D in an A-B-matrix or of particles B in an A-slurry). This can be obtained by sedimentation in a strongly fluidized DSP paste or ultra fine particle suspension (the fluidization being preferably enhanced by high frequency vibration, preferably in the ultrasonic range).

The particles to be sedimented should preferably be large compared to the particles B of the DSP materials (at least one order of magnitude larger). The sedimentation is strongly improved by a low concentration of particles being fed, as this means that there is a low rate of feeding of particles, permitting the individual particle freely to orient on the bottom layer constituted by previously added particles so that they are not impeded by settling neighbour particles (vide FIG. 48). This is of special importance with particles or bodies that are not of a compact shape (fibers and plates), but even for compact shaped particles, it is of significance. The sedimentation may be forced by gravity or forces of inertia, typically by a centrifugation technique.

Another important technique is to place fluid DSP materials together with nets, webs or continuous fibers by filament winding (in such case, the technique is often improved when the fiber material has been prewetted in DSP material) or other types of arrangement of the DSP materials together with the fibers or webs.

Another very interesting technique is to prepare the particle/fiber part as a dry fiber- or net-bonded mass containing the compact particles (typically particles B, e.g. cement, and particles A, e.g. ultra fine silica dust), and optionally additives as dry powder state dispersing agents (typically "Mighty" as a dry powder). When placed in position on the surface to be coated, the dry mass is infiltrated with liquid (typically water), possibly as a solution of additives, (typically dispersing agent and/or accelerating agents). The dense packing of the wetted material is preferably ensured by mechanical action simultaneously with the infiltration, that is mechanical pressing and pressing assisted by vibration or centrifugation. These techniques require extremely good wetting properties of the solid to be infiltrated. It may be necessary to pretreat the solid or part of the solid with surface active agents which improve their wetting properties.

Another interesting process is to place the coating or part of the coating as a prefabricated, non-solidified fabric, typically fiber-borne (the fibers being in the form of nets or webs, etc.) on the surface to be covered or on a preformed surface layer by winding, pressing or rolling. The fabric may be produced by extrusion, filament winding, or any technique of the type used, e.g., in paper making and asbestos cement production. The fabric may be prevented from premature solidification by any means delaying solidification, e.g. by freezing, which permits prefabrication long time before use and also permits the transportation over long distances in frozen condition. Immediately before use, the solidification process of the fabric may be activated (by thawing or by chemical or radioactive means or by other heat treatments, e.g. the exothermic polymerisation of an incoporated monomer or oligomer).

A special product of this type may be prefabricated from fiber borne DSP materials made, e.g., from cement, silica and "Mighty" etc., and a special application thereof is as a coating for gas pipes of steel and other steel surfaces to secure a high corrosion resistance.

Another interesting technique is to prefabricate the coating according to the principles mentioned before and solidify the coating before connection to the surface to be covered. The connection between the coating and the substrate can be secured in several ways:

1. By fabricating the article to be covered against the coating, i.e. typically by using the coating as a permanent mold. This may typically be done when protecting an article of concrete, gypsum, and other materials cast from wet mass at room temperature. But this method may also be applied to other materials cast at higher temperatures, e.g., plastic, metals, glasses, etc. In this case, heat stability of the coating may be required.
2. By "glueing" the coating to the surface, e.g. by the use of a "glue" based on a DSP material. The coating may fit more or less exactly to the surface (the shape of the surface of the article being almost identical to the shape of the surface of the coating facing towards the article). The coating may be flexible in bending, permitting a large capacity of adaptability in shape. This type of coating may typically be fiber borne or fiber reinforced. The fabricated coatings may typically be made in flat shapes or in rolls, or they may have a structured surface or shape prepared by extrusion, pressing or rolling to obtain a surface pattern or a shape which makes them immediately applicable on the surface to be coated. Such shape may serve several purposes, one being the desire to retain the shape in question as a surface of the final articles, another being to secure a good adhesion between the coating and the article to be coated, and a third purpose may be to secure that the coating is self-bearing during the manipulation operations. In many cases some micro-cracking may be tolerated. This permits the use of thin fiber borne particle cement paste DSP film permitting a high degree of bending (large changes in curvature). For this purpose, it is preferred to use
 (1) thin coatings,
 (2) large amount of ultra fine fibers.

With regard to this, the special DSP structure permits fabrication of very thin films (typically 400–20$\mu$) with ultra fine fibers (typically 0.1–10$\mu$) very well fixed in the material, such film having a high mechanical quality (which respect to hardness, density and corrosive resistance). By using less curvature in bending, the principle can also be used for thicker coatings (in the centimeter range) where new development as prefabricated coating on roads, roofs, floors, etc. may be mentioned. This permits prefabrication of e.g. roll-up top layers for road, roofs or floor which are rooled out in situ and "glued" to the substrate, e.g. by means of fluid DSP materials such as DSP paste.

The prefabricated coating may have various shapes, i.e. flat or corrugated, and may be provided with desired patterns or incorporated pigments. Thus, for example, if a road surface layer is made as a prefabricated DSP fiber-borne material, the necessary edge markings, pedestrian passing, etc. may be incoporated in the prefabricated DSP surface. The fixation of the coating may be obtained by glueing, i.e. by means of DSP materials, and/or by mechanical fixation (screws or nails etc.). This technique is particularly useful where it is desired to (1) obtain high quality coating which may only or best be fabricated under specific conditions (temperature, chemical environment, mechanical fabrication techniques, etc.),
 (2) place the coating in a condition where it is undesirable to use ordinary technique for DSP material coatings, i.e. underwater coating (off-shore constructions, harbour constructions, ships, etc.), with e.g. cement-silica-Mighty based DSP materials.

In general, a DSP-coated article can be produced either by finishing the uncoated article and then placing the coating material in a non-solidified form on the surface where it solidifies, or the reverse procedure where the finished coating is connected or bound to the material of the article to be coated in a non-solidified form whereafter the material is solidified, or any intermediate process combing semi-manufactures of either coatings or part of coatings or semi-manufactures of either the articles or part of the articles.

When DSP materials are prepared as fiber-borne prefabricated sheets or rolls, they may be applied as a single layer on the articles to be coated, or several sheets or layers may be superimposed, where the binding principle between the single layers may be either a binding comprising DSP materials or a binding of any other suitable type. For example, a refractory coating may be produced at high temperatures for later application as a prefabricated sheet. An optimum hardening of the DSP film and the avoidance of undesired drying out of any zones in the DSP film may be obtained by working under controlled conditions in an industrial plant preparing a prefabricated DSP coating. As indicated above, it is also possible, in an industrial plant, to arrange fibers and additional bodies in an organized manner, including incorporating webs or fibers as carrier layer or merely as incorporated reinforcement.

By incorporating suitable particles or bodies in paints or surface coatings incorporating DSP materials, the desired electrical, optical, magnetic and other properties may be imparted to the DSP materials. When the DSP materials are made as prefabricated coatings as described above, the coatings may be applied on the surfaces to be coated by suitable forces. In certain cases, it may be advantageous to utilize electrical or magnetic forces to place a prefabricated DSP coating on the desired location of a surface. Another possibility is to supply the DSP material with an adhesive back and place the DSP material in much the same manner as self-adhesive tiles, laminates, or tapes (depending on the thickness) are place. When coatings of DSP materials, either prefabricated or generated in situ, are to show extreme density, they may be impregnated, e.g. with polymers, etc., in the same manner as disclosed in the above-mentioned patent applications.

To achieve stability of a DSP material stored in containers or immediately after application, the effect of gravity on the DSP material should preferably be minimized to avoid undue removal of the DSP material from the application site by gravity, or undue particle settling in the DSP material stored in a container. To obtain this, it is desirable to impart thixotropic properties to the DSP mass. This can be done by modifying the particle system itself, typically by use of ultra fine particles A or by introducing additives to the vehicle liquid, e.g. organic fine elements (large molecules, fine fibers, typically on a cellulose base (Methocell)) or inorganic particles, typically smaller than the particles A. For example, a thixotropic effect may be obtained by introducing 1–2 percent by weight of ultra fine colloid silica (typically Aerosil 200 or Aerosil 380 with specific surface of approximately 200,000 or 380,000 m²/kg) in an easily flowable DSP paste based on Portland cement, 20 percent of silica dust (specific surface 25,000 m²/kg), Mighty and water with a water/powder ratio in the range of 0,25–0,30 by weight. For high shear fabrication techniques, a good dispersion of the ultra fine particles is strongly dependent on applying high shear stress on the liquid vehicle. By use of low viscosity liquid vehicles this may require an unrealistic or impracticable high rate of shear ($10^6$ sec.$^{-1}$). By the use of thickeners (typically components with large organic molecules, ultra fine fibers or ultra fine particles), the viscosity of the vehicle liquid may be increased considerably. With reference to the example above, an increase in viscosity of a water vehicle from 0.01 cp to 1000 cp by use of a thickener would lower the requirement to the rate of shear to create the required stress from $10^6$ sec.$^{-1}$ to 10 sec.$^{-1}$.

LARGE STRUCTURES

There has always been a desire to build large structures—domes, bridges, towers—for prestige or to serve special practical purposes such as halls for large industries, hangars, sports halls, towers for TV communication etc., and, perhaps most important, large subwater structures to support oil-drilling (off-shore) (the hitherto largest in the world contains 600,000 tons of concrete).

The maximum sizes of many of these structures are limited by the weight of the structure itself. This is due to the fact that an increase in size of a structure—on the assumption that the shape is unchanged—increases the weight of the structure proportionate to the length dimension in third power ($F_g \propto \rho g L^3$, wherein $\rho$ is the density in kg/m³, L is a characteristic length in meters, g is the acceleration due to gravity in m/s², and $F_g$ is the gravitational effect on the structure), while the internal resistance of the structure (which is proportionate to a section area) only increases with the length dimension in second power ($F_r \propto \sigma L^2$, where $F_r$ is the internal resistance of the structure, and $\sigma$ is the ultimate stress of the material in Pa). The maximum size of the structure is determined by an equilibrium between the forces in a situation where the load is equal to the ultimate load of the structure ($F_g = F_r$), which is seen to be conditioned on a force ratio equal to 1 or $(\rho g L)/\sigma = \text{constant}$ $L = \text{constant} \times (\sigma/\rho) \times (1/g)$ The main parameter responsible for the limitation of size (L) is the stress/density-ratio ($\sigma/\rho$) of the construction material (assuming optimal shape of the structure is used). The larger the stress/density-ratio of the construction material, the larger the possible size of the structure, (L) being directly proportional to $\sigma/\rho$. Most large self-supporting structure, typically with sizes of several hundred meters, are made of steel reinforced concrete or structural steel or a combination of these materials (the concrete typically forming the base structure) due to the relatively high stress/density-ratios of such materials compared to any other materials which might be accepted from practical and economical points of view, i.e. bricks, timber, etc.). Fiber-reinforced plastics, boron-fiber-metal composites and other expensive materials having higher stress-density ratio are not really candidates for such large structures.

Stress/density-ratios for concrete and structural steel are typically in the range of 12,000–24,000 (m/s)² and 40,000–50,000 (m/s)², respectively referring to compressive strength of concrete cylinders of 10 cm in diameter, 20 cm in height concrete cylinders (and yield stress of the steel).

The Portland cement DSP materials typically used as concrete or mortars, have strongly improved stress/density-ratios compared with concrete (typically 2–4 times higher than for traditional high strength concrete). The figures, stress/density ratios of these DSP materials, even exceed those of high quality structural steel.

Thus, DSP materials made with Portland cement-+silica dust and natural aggregates (compressive strength ~150 MPa, density 2600 kg/m³) have been found to have a stress/density-ratio of 57,000 (m/s)² (14% higher than the above-mentioned high quality structural steel), and ultra strong DSP materials based on Portland cement and silica dust and sand of refractory grade bauxite (compressive strength ~270 MPa and density 2850 kg/m³) have been found to have a stress/density-ratio in excess of 90,000 (m/s)² which is almost twice as high as that of structural steel.

(An exact evaluation should be based on steel-reinforced DSP materials, which would typically decrease the stress/density-ratio a few percent due to a slight increase in density.)

This opens up the possibilities of making structures of hitherto unknown large sizes, typically 2-5 times larger than the largest possible concrete structures, and 1.2-2 times larger than the largest possible steel structures.

Large structures designed basically to carry their own weight are often shaped to transfer their load in compression, i.e. towers and most arcs.

Towers

As a curiosum, an illustrative way of visualizing the stress/density-ratio is the height to which a vertical prismatic tower could be built before it collapses under its own weight. Ordinary quality concrete, high quality structural steel and DSP materials could be built to heights of 2400 meters for concrete, 5200 meters for high quality steel, and 5900 meters and 10070 meters, respectively for DSP (the last value exceeding 10 kilometers refers to a bauxite-based cement-silica (20 cm × 10 cm diameter specimen having a compressive strength of 282.7 MPa).

The designer of ultra high structures would choose a more suitable shape than the prismatic shape, typically with an upwardly decreasing sectional area (thickness).

This permits stability of towers far taller than the above-mentioned prismatic towers, even when applying a reasonable factor of safety, say 2.5.

On the idealized assumption of a tower on a rigid base in a uniform gravity field an optimal shape exists (solid of revolution with upwardly exponentially decreasing cross-section) which, from a purely mathematical point of view should be used for building an infinitely tall tower with any part of the entire volume being subjected to the same compressive stress.

Reference is made to FIG. 69 with appertaining explanation below. The distance $L_c$ is the distance upwards before the thickness of the tower has decreased to a specific fraction (for reasons explained in connection with FIG. 69, the value $1/e = 0.368$ has been chosen). This is a measure of the practical possibilities of building high towers of finite height with well-defined thickness in the upper part. The characteristic length $L_c$ is actually twice the stress/density-ratio $(\sigma/\rho)$ divided by the acceleration due to gravity (g).

Thus, for example, a four time increase in stress/density-ratio increases the critical length by a factor of 4, and thus increases the height at which the thickness is, e.g., 1/20 of the thickness at the bottom, by a factor of 4. This means again that the stress/density-ratio is a main material parameter limiting the size of the structures.

The properties and stress/density ratios of the materials relevant to the present aspect appear from the following table:

TABLE A

| | Compressive strength or yield stress MPa | Density kg/m³ | Stress/density-ratio (m/s)² |
|---|---|---|---|
| Ordinary concrete | 40 | 2400 | 16,700 |
| High quality concrete | 60 | 2500 | 24,000 |
| Ordinary DSP | 150 | 2600 | 57,700 |
| Ultra strong* DSP | 270 | 2850 | 94,740 |
| Structural Steel "Dorman 30" | 400 | 7850 | 51,000 |

*The highest values of a single 20 cm × 10 cm diameter cylinder with refractory bauxite bodies C was 282.7 MPa - 2861 kg/m³ - 98812 (m/s)² which corresponds to an ultimate height of a "prismatic tower" in excess of 10 km.

The differences in the maximum height of towers (with a top diameter of 200 meters and calculated in accordance with the above assumption) corresponding to the differences in the stress/density ratios clearly appear from FIG. 69.

Apart from the high increase in maximum height when using DSP-material instead of concrete, calculations show that, e.g. for towers of a height of 5.8 km the volume of material, calculated according to the above assumption, would be 1/15 and 1/30 of the necessary volume of ordinary concrete if ordinary DSP and ultra strong DSP, respectively, were used.

Compression arches

(Bridges, Domes etc.)

From principles of equilibrium, it can be shown that the compressive stresses in an arch (single-curved*) loaded with its own weight is approximately $$\sigma = R \cdot \rho g$$

wherein R is the radius of curvature, which means that $$R \sim \sigma/(\rho g)$$

*For double-curved shells with main curvature radii $R_a$ and $R_b$, R is to be replaced with R* defined by:

$$(1/R^*) = (1/R_a) + (1/R_b)$$

This means that the maximum radius of curvature R is equal to the ultimate value of the stress/density-ratio of the material divided by acceleration due to gravity.

Using a factor of safety of 2.5 and the same materials as in Table A, the maximum size of self-supporting compression arches (with an aperture angle V = 30°) will be as shown in the following table B.

Self-supporting compression arc. Factor of safety 2.5.

TABLE B

| | σ/ρ (m/s)² | R m | L m | Rise m |
|---|---|---|---|---|
| High quality concrete | 24,000 | 978 | 506 | 33 |
| Structural steel | 51,000 | 2079 | 1076 | 71 |
| Normal DSP | 57,700 | 2352 | 1217 | 80 |
| Ultra strong DSP | 94,740 | 3862 | 1999 | 132 |

Spatial constructions with double-curved shells facings may also advantageously be analyzed in terms of radius of curvature where the maximum resulting radius of curvature R* equals $\sigma/(\rho g)$.

Figure 75:
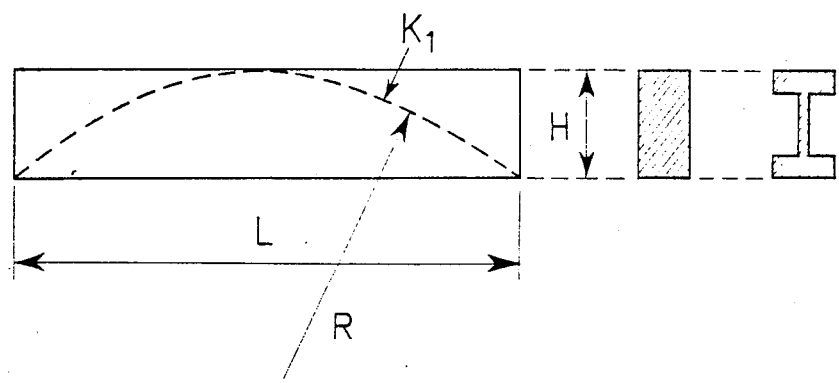
FIG. 75 illustrates prismatic bending members.

Beam constructions may often advantageously be considered in the light of arch effect, the beam being considered as a compression arch with excess weight. With reference to FIG. 75 the use of ordinary beam calculation presuming linear elastic behaviour results in balance moment between external load (gravity) and internal resistance $$1 = \frac{4}{3} \frac{\sigma H}{\rho g L^2} \text{ (Section type I)}$$

$$1 = 4 \frac{\Sigma H}{\rho g L^2} \text{ (Section type II)}$$

For small values of height/length ratio H/L, this corresponds to radius of curvature for stress lines $(R \sim L^2/8H)$ $$R = \frac{1}{6} \frac{\sigma}{\rho g} \text{ (Section type I)}$$

$$R = \frac{1}{2} \frac{\sigma}{\rho g} \text{ (Section type II)}$$

It is assumed that the concrete and DSP elements are reinforced so that tension is carried by the reinforcement and compression by the concrete or DSP.

A complete utilization of the ultra strong DSP material (compressive strength 270 MPa) in bending members requires high concentration of very strong reinforcement in the tensile zone, i.e., high strength wire with tensile strength in the range of 2000 MPa in a concentration of about 10% by volume of the tensile zone.

As previously mentioned and illustrated in FIGS. 69, 70, 72 and 73, DSP is extremely suitable for very large constructions where weight of the structure is the dominating load due to the fact that the stress/density-ratio of the material is much larger than is the case with concrete and even considerably larger than for quality steel for structural purposes. This can also be utilized to make much more slender structures, as illustrated in FIGS. 71 and 74.

TABLE C

Minimum thickness for homogeneous, self-supporting, horizontal beams (with rectangular cross section) or plates simply supported along two opposite edges in the distances L = 30, 60 and 120 meters, respectively. Safety coefficient 2.5.

| Material | Thickness of beam or plate (cm) | | |
|---|---|---|---|
| | L = 30 m | L = 60 m | L = 120 m |
| Ordinary concrete | 100 | 400 | 1600 |
| High quality concrete | 70 | 280 | 1120 |
| Structural steel | 33 | 132 | 528 |
| DSP-N | 29 | 116 | 464 |
| DSP-S | 18 | 72 | 288 |

Another very interesting use of DSP to replace concrete is in slender structures designed to resist wind load or load from water streaming relative to the structure.

According to hydrodynamics, the load acting on the structure, say a cylindrical pole, is proportional to the area of the pole met by the fluid, i.e., the moment tending to break the pole in bending is proportional to the diameter in first power: $M \propto p \cdot d \cdot L^2$.

However, the internal resistance against bending of the pole is proportional to the diameter in third power: $M_{res} \propto \sigma d^3$.

The condition of equilibrium $(M = M_{res})$ thus requires $$\{d/L\}^2 = (p/\sigma)$$

From this it will be seen that DSP makes it possible to decrease the structure diameter considerably which results in much more slim structures or elements.

Thus, a typical 4 times increase in strength by use of DSP having a compressive strength of 160 MPa instead of concrete having a strength of 40 MPa results in
reduction of the diameter to ½,
reduction of area and volume to ¼, and an unchanged amount of steel reinforcement.

This is because a decrease in the diameter to ½, the load is correspondingly decreased to ½, which is balanced by an eight-fold decrease in resistance moment and a four times increase in strength.

The amount of steel reinforcement is substantially unchanged.

This can be expressed more generally in the following way:
(1) An increase in strength from $\sigma$ to $f x \sigma$ results in
(2) a reduction in structure diameter from d to $d/\sqrt{f}$,
(3) a reduction in volume from V to V/f, and
(4) a reduction in weight from W to $(W/f\{\rho_o/\rho\}$, where the last term is the density ratio (normally being close to 1 in case of concrete and DSP), while the amount of reinforcement is unchanged.

The large bending member structures rendered possible through the DSP matrices, hence, considerably surpass known structural material with respect to obtainable size of the members. Hence, one aspect of the invention comprises a substantially horizontally arranged structural member having a rectilinear or convex upper surface and having such a shape and size that a radius of an arc of a circle extending in a vertical section of the member and touching said upper surface and intersecting with the lower surface of said structural member at positions located between two adjacent supports of the structural member is at least 100 meters.

It should be noted that a member having the above characteristics could not be prepared from high quality concrete, but may easily be prepared from normal DSP. Structural steel could, however, also be used for such a member.

According to an embodiment of this aspect, the radius is at least 2100 meters, which exceeds what could be made in structural steel, but which could still be made in normal DSP. According to preferred embodiments of this aspect, the radius is at least 3000 meters and at least 4000 meters, respectively, both of which are structures which can be made in DSP with ultra strong bodies C such as appears from table B.

When the structural member, however, is prismatic, it will be loaded with its own weight to a higher extent, cf. FIG. 75, and in such a case, the above-mentioned values should be replaced with 500, 1050, 1500, and 2000 meters, respectively. If the structural member has a rectangular cross-section, the conditions are, again, less favourable because of a higher load of the weight of the structure itself, and the above-mentioned values should be replaced with 136, 350, 500, and 667 meters, respectively. However, in all cases, the same relation between the DSP material and ordinary high quality concrete and structural steel as explained above will apply.

HIGH QUALITY FOAM

A particularly interesting application of DSP-materials is the production of high quality solid foam typically with low density, controlled pore size and pore shape, with strong thin continuous walls between the pores. The high quality foam has very special possibilities of producing foams with micro pores, typically below 100 μm and even below 1 μm.

By traditional foaming technique with incorporation of air bubbles by mechanical or chemical means it is possible to make lightweight foam, or more specifically, foams with a low concentration of solid substances.

However, the known technique suffers from certain disadvantages:

(1) It is difficult to form lightweight foam with strong walls, because the foaming technique requires an easily flowable liquid which in many cases is not compatible with demands for high strength of the solidified material (typically for materials where the fluid is a slurry, containing the particles responsible for the later structure such as cement materials and ceramic materials).

(2) It is difficult to control the geometry of the pore system, both with regard to formation of the desired pore size and stabilisation of the pore system.

(3) It is difficult and often impossible to produce pores having shapes which differ considerably from the traditional shapes characteristic of surface-force-controlled foams.

It is also known to produce foam by casting of a fluid with lightweight particles (e.g. polysterol particles). This secures the desired pore size, but this technique makes it generally difficult to obtain (1) high quality of the solid walls (vide item 1 above) and (2) a very low specific weight (low solid concentration), as the space between non-deformed discrete particles is normally large, typically above 30–40% (vide the geometry when packing of unisized spheres).

Due to the combination of easy flow and high mechanical strength, rigidity and durability, the use of DSP-materials will strongly increase the quality of foams prepared according to the two traditional methods mentioned above by strongly increasing the strength of the walls and making it possible to achieve higher content of lightweight particles by the use of gap-grading (mixture of large and small particles) or other geometrical means made operative with the easily flowable DSP-paste.

It is known to overcome the difficulties in producing lightweight foam based on lightweight particles by deforming the particles prior to casting, for example by prearranging the polystyrol spheres in a box which is compressed about 30%, and then infiltrate the remaining space with the material (fluid gypsum) by means of vacuum.

Thus, a lightweight material is obtained, but the "foam structure" has some severe drawbacks, primarily that the contact between the compressed particles prevents formation of the continuous walls which characterize a good foam.

Besides, the technique is difficult, especially in the case of finer foam structures where infiltration is difficult and where the infiltration liquid cannot contain particles or fibers having sizes above 1/10–1/20 of the size of the pore in order to obtain a reasonable infiltration.

This is fatal to the formation of ultra fine foam (with a pore size of about 10 μm–1000 μm) using particles based on wall materials with maximum particle size of about 0.5 μm to 100 μm, typically for particles B of the DSP-material.

The present invention completely overcomes these difficulties and permits fabrication of high quality foam with a high volume concentration of voids, strong walls between the voids, typically with DSP-paste, possibly fiber-reinforced, and foam with well defined wall structure, especially high quality ultra fine pore-based foam.

The foam shaping is based on introducing lightweight bodies (particles, fibers, etc.) to a fluid DSP-paste (hereby creating the lightweight structure) or other deformable bodies which are removed after hardening and which leave the material with the desired pore space, the high void content obtained mainly by deformation (for example compression) of the introduced pore-creating bodies.

According to one embodiment, the following procedures are followed: The fluid DSP-paste and compressible lightweight particles (e.g. polystyrene spheres of 1 mm) are thoroughly mixed and the material is (1) placed in a closed container. (2) Pressure is applied to the fluid. (3) The compressed lightweight particles are allowed to collect at the top or at the inner surface during centrifugal casting. (4) The piston is moved upwards, allowing surplus fluid to escape while the fluid pressure is maintained. (5) The force on the piston is slowly released and the piston is allowed to move outwards avoiding any mass transfer to or from the enclosure. (Illustrated in FIGS. 57–61).

Comments

1. It might be desirable to simply compress the particles in position (1) under draining conditions which permits surplus liquid to escape. With small particles, large thickness in direction of liquid drainage and a desire of obtaining large deformation of the particles, the fluid drainage would be blocked or at least strongly delayed. This fundamentally simple solution seems highly unrealistic in connection with high quality DSP-paste-based fine foam.

2/3. By applying pressure, the volume of the particles is decreased, permitting a denser packing. The pressure-determined flow may be assisted by mechanical vibration resulting in increased fluidity of the paste and denser particle arrangement. Centrifugal technique in order to increase the rate of particle flow may be applied.

4. The piston has to be moved upwards to the position which determines the final amount of fluid to be contained in the foam article. This movement must take place while maintaining the fluid pressure to ensure the compressed state of the deformable particles.

5. The release of the piston force avoiding any mass transfer between the enclosure and the environments creates a foam containing continuous "wall material" with completely discrete voids and a pore volume determined by the applied stress levels and the compressibility of the particles.

It is to be mentioned that the particles are in mutual compression while the fluid is under tension just after the release.

Release of the force does not mean change of the force to zero, but a reduction of the compressive force in general which results in a somehow smaller compression.

One of the major advantages of the method is that there is no internal mass transport (except from local arrangement around the particles) during the actual foaming process.

The general principle of the foam shaping process is
(1) to have the void-forming material in a compressed state (e.g. polystyrene spheres) together with all the fluid material which later is to form the solid walls in an enclosure, and
(2) to release the external forces on the outer limits of the enclosure which permits expansion of the voids without mass transfer between enclosure and surroundings.

The void forming material may be lightweight solid compressable material (e.g. polystyrene), hollow compressible material (e.g. hollow thin-walled plastic spheres), gas bubbles, typically stabilized by foaming agents (or material as aluminum powder in a water-based slurry which develops gas).

The voids may be of arbitrary shape obtained by the use of void-forming particles of arbitrary shape.

Special products may be produced with rod-shaped pores arranged parallel, i.e. a kind of honeycomb structure. The void expansion may be obtained by introducing fluid (gas or liquid) into hollow void-forming bodies, i.e. blowing gas into hollow micro-tubes of plastic or rubber and expanding a fiber of a material which expands in water. The water is introduced by capillary action which technique requires through-going pores.

The void-forming material may be removed by melting, evaporation, chemical solution or it may be mechanically drawn out, typically in a foam with parallel prismatic pores, i.e. using a rubber band as a void-forming material.

Variations

Introduction of the void-forming compressed particles to the liquid as individual single particles in order to obtain an extreme dense lightweight particle arrangement prior to the expansion.

This technique makes it possible to build-up a very sophisticated internal pore structure combining many types of pores in desired arrangements.

(This technique of forming high quality foam is believed to be novel, also without use of the pressure-pressure release technique to obtain the very high void content.)

Another method which is especially suitable in order to produce parallel aligned pores is to wind the pore shaping material, i.e. a rubber string, up in a slurry of DSP-material, thus achieving the dense packing by deforming the rubber string during the winding process, either due to cross deformations (flattened rubber band) or by released tension.

COMPRESSION SHAPING OF DSP

A specially promising production for producing articles of DSP is compression shaping from DSP materials having a plastic to stiffplastic consistency.

This is a fast process which requires considerably less mold material than ordinary casting, and which permits the preparation of products of a considerably higher quality than is obtainable by ordinary casting, considering that the water/powder ratio is considerably lower in compression shaping (typically 0.08 to 0.13 versus 0.20 in ordinary casting of cement/silica paste-based articles), and which permits incorporation of more fibers and finer fibers in the compression-shaped masses (thus, e.g., the compression shaping of plastic cement-/silica paste is performed using up to 6 percent by volume of glass fibers of diameter 5 $\mu$m and length 12 mm).

Prior to the compression shaping, the semi-finished product is formed which subsequent to the compression becomes the desired article. The semi-finished product is formed by mixing processes and various forms of pre-treatments (e.g., extrusion or rolling) to ensure a desired fiber orientation and a desired starting shape of the semi-finished product.

The semi-finished product is placed in a press, a rolling mill or the like the faces of which facing towards the product ensures that the compressed articles obtain the desired shape. Examples are shown in FIGS. 24 to 30.

By moving one or several parts of the compression tool, the material is pressed into the cavity, thus forming the desired article having the desired shape.

Upon removal from the compression faces, the shaped article may be withdrawn from the press to a lesser or greater extent supported by mechanically stable molds, the requirements to the stabilizing molds being dependent upon the mechanical stability of the compressed material, the geometry of the article (size and shape), external influences subsequent to the compression (gravity, vibrations, etc.) and the requirements concerning the dimension and shape tolerances of the article.

Semi-Finished Product

In the present context, the term "semi-finished product" designates the bodies which, on compression are converted into the compression-shaped articles.

The semi-finished articles may be formed from the above-described components (particles, fibers, other components, liquids, etc.) and may, likewise, be shaped in one of the above-described processes for shaping the finished article (extrusion, rolling, vibropressing, spraying, etc.), or by compression shaping (when the production is performed by successive compression shaping operations).

The semi-finished products may be formed from various partial components which, in the compression operation, are shaped to form a unitary product. Thus, e.g., panel-shaped articles having specific fiber arrangements may be formed by placing layers of thin extruded panels (with the fibers substantially oriented in the direction of the extrusion) in suitable and desired orientation relative to each other, such as illustrated in FIG. 25, and desired articles to be incorporated, such as electrical resistance units, tubes, cables, sockets, reinforcements etc., or various other parts (steel panels, wood bodies, etc.) may be cast into the resulting article in the compression shaping, such as illustrated in FIGS. 24-27.

Compression

As mentioned above, the compression is performed by moving one or several parts of the compression tool relative to the material to be shaped, and thus pressing the material into the desired shape.

Often, the shaping cavity is closed all over, and the material is made to fill all of this room by being pressed against non-resilient mold sides. This is a compaction process.

In other words, the compression is performed in cavities which are not completely closed on all sides. An important example of this is the compression process termed extrusion where material is pressed out of an orifice having a specified cross section, thus resulting in an article having said cross section, or by a stamping which is often a local compression shaping. A specially interesting technique is rolling with flexible rollers. The rolling with flexible rollers, invented by the present inventor, is described in greater detail in a Danish patent application filed on May 1, 1981, in the name of Aktieselskaber Aalborg Portland-Cement-Fabrik and entitled "Valse og fremgangsmåde til valsning af et deformerbart materiale ("Roller and method for rolling a deformable material").

As previously mentioned, there will normally not be any pressing out of liquid from the blank to the surroundings, which is one of the substantial advantages of the DSP casting mass.

However, using drained compression, it becomes possible to construct a new type of materials consisting of coarse components (large in comparison with the particles B) arranged in dense packing corresponding to what may be obtained with the components in question in a compression process (possibly vibropressing) glued together by means of a high quality DSP paste.

The specimen consisting of the coarse components is compressed in one of the following manners:

(1) With a surplus of liquid paste (e.g., cement-silica DSP paste having a water/powder ratio of 0.20) whichs is pressed out from the specimen, using suitable filter or draining means arranged in the press, (vide FIGS. 15, 16 and 17).
(2) with less than the final proportion of liquid paste—possibly with no liquid paste at all, the missing liquid paste being added by compression, capillary suction, vacuum suction or similar means in a later process or during the compression.
(3) with an amount of liquid paste corresponding to the proportion thereof in the final product.

In the first-mentioned case, the compression is, such as mentioned above, accompanied by liquid expulsion. The compression apparatus is adapted to be able to drain the expelled liquid without any substantial interference with the compression process.

Using processes of this kind, it becomes possible to produce articles having a good stability immediately after compaction.

Final Treatment

After the compression shaping, a specimen having a more or less stable shape has been formed. Dependent upon the stability, various degrees of support of the specimen may be utilized:

(1) Support at the bottom or other places exclusively to place the specimen in a desired position (the support may, e.g., be a floor or a shelf)
(2) Support along essential parts of the shaped surface to preserve the shape of the specimen produced,
(3) Complete support around the full surface of the specimen to preserve the shape of the specimen produced.

The specimen and the supporting means may be combined in the press, part of the shaping surface being a mold which, subsequent to the compression, accompanies the specimen as a shape support (the molds may, e.g., be thin compression-shaped metal bodies), or which is brought into contact with the specimen in a separate process after the specimen has left the press.

In many cases, the compressed specimen is surface-treated immediately after the compression, primarily to prevent drying out in the further processing.

The surface treatment may be performed by application of curing compounds to avoid evaporation, which may, e.g., be applied by brushing, smearing, spraying, etc., or by application of evaporation-impeding removable film, after the specimen has left the press or in connection with the compression process by transfer from the shaping surfaces of the press.

In many cases, the above-mentioned supports may also be utilized in the application of a surface treatment, or may render a surface treatment superfluous, or the support may constitute the surface treatment (e.g., a ceramic shell applied in the press).

Finally, the compression may be accompanied by processes securing some kind of solidification of the specimen—in addition to the solidification resulting from the pressure itself. As examples may be mentioned simultaneous application of heat (by heat transfer from the press or by electro or micro wave heating) or eliciting of polymerisation of a polymerisable component included in the liquid phase.

According to a particular aspect of the present invention, a cement/water-based DSP composite material may be retarded with respect to its chemical structure formation and/or stabilized with respect to its shape by freezing the DSP composite or the semi-finished product. In this manner, the composite material or the semi-finished product can be pre-mixed or pre-shaped, respectively, and thereafter transported to a desired site of use where the structure-forming process can be allowed to proceed further by thawing the product, possibly combined with subsequent shaping. This method may be applied more generally to any type of DSP material where the structure formation can be delayed, retarded or stopped by freezing or a similar process. The DSP material subjected to this process may be pre-shaped in any of the manners described in the present specification.

SHAPING OF DSP IN A HIGH STRESS FIELD

Shaping of DSP materials may also be performed in a high stress field, typically between 5 and 100 MPa, in special cases, between 100 and 1000 MPa, and in extreme cases between 1000 and 10000 MPa.

The high stress shaping will usually be combined with a pre-shaping of the DSP material at lower stress, typically designed to achieve
(1) an approximate shape of the article, and
(2) a desired pre-arrangement of particles, fibers, etc. prior to the final high stress shaping.

The high stress shaping may typically be performed to deform or crush the pre-arranged particles (e.g. a press sintering which is typical for metal particles, or a particle crushing to still finer particles which is typical for brittle materials).

The high stress field shaping may typically be applied during solidification, e.g. by hot or cold pressure sintering, or—typically for cement products—by structure formation during hydration.

By the high stress field shaping, denser structures are obtained. It is known to shape articles in high stress fields by powder compaction, pressure sintering, etc., but in these known methods, it is not easy and in most cases not possible to obtain a desired pre-designed micro structure. Utilizing the structure formation techniques of the present invention in a superplasticized material in a low stress field, the desired particle/fiber arrangement may be pre-designed, whereafter the high stress treatment may be performed on the thus pre-arranged structure.

The high stress fields shaping may be combined with the technique where a fluid inter-particle material is exchanged by multi-stage infiltration, such as described in the section "HIGH RESISTANCE, ULTRA STRONG DSP MATERIALS". The exchange can be performed as an intermediate process after the basic structure-forming process and before the high stress treatment or after the high stress treatment.

Articles which are typically made by means of the high stress shaping are, e.g., machine parts which are to be subjected to high stress, aircraft or spacecraft parts which are to be subjected to extreme mechanical loads, and other articles which are subject to severe conditions during their use, including highly fiber loaded articles combining extreme resistance and hardness with high tensile strength and ductility.

An especially interesting technique is to combine the high stress field shaping with various pre-arrangement methods which are described in the section "COMPRESSION SHAPING OF DSP". The various semi-manufacture production methods described in that section can suitably be combined with a post-treatment of the semi-finished article in a high stress field.

Especially, the high stress field shaping of DSP makes it possible to combine high hardness and abrasion resistance with a high degree of ductility (obtained by high fiber load), which are properties which it is normally very difficult to combine by means of known art techniques.

This aspect of the invention may be expressed as a process comprising shaping a DSP composite and/or a DSP semi-manufacture in a high stress field, typically a field of 5-100 MPa, in special cases 100-1000 MPa, and in extreme cases 1000-10,000 MPa. Another aspect related to the first-mentioned aspect is where a DSP material, e.g. a cement-based DSP material, is solidified at a high stress level, typically at 0-5 MPa, for example by solidification between platen members in a press. In special cases, the solidification may be performed at higher stress levels, such as 5-100 MPa, and in very special cases at stresses between 100 and 1000 MPa or even between 1000 and 10,000 MPa.

If desired, the solidification in a high stress field may be combined with treatment of the DSP composite material prior to shaping by high shear treatment, for example by passage, optionally repeated passage, through narrow nips of multiple rollers, in accordance with the technique described in European Patent Application No. 80301909.0 published under Publication Number 0 021 682.

MULTI-STAGE INJECTION

According to a particular embodiment of the present invention, DSP materials are used for multi-stage injection into cavities or ducts.

In this context, injection designates a process where matter is completely or partly made to fill cavities in solid bodies. In certain cases, the concept injection in the present meaning thereof will also be covered by other designations (impregnation, filling etc.).

The purpose of injection is partly or totally to fill cavities with a substance which forms a body, "a filling", with a specific structure and specific characteristics, often subsequent to a solidification process.

In accordance with the traditional technique, injection is often performed by pressing a liquid or an easily flowable liquid suspension into the cavity to be filled and then allowing the liquid or suspension to cure or solidify, leaving a filling with a structure which is characteristic of the injection mass in solid form. For example, for injection of cable ducts in post-stressed concrete, fluid cement paste is often used. Thus, the filling will be a body of cured cement paste having the characteristics of this material.

In many cases, a filling with improved properties might be desired, for example a cable filling with a material with greater volume stability than cement paste, e.g. mortar or concrete. However, it is difficult to establish a mortar or concrete filling in view of the demand for fine filling. Coarse-grained materials like mortar or concrete cannot penetrate into the not easily accessible narrow parts of the cavity in the zones between cable and duct where the cable is positioned close to the duct wall.

According to the present invention, this problem is solved by injection in two or several steps with two or several injection materials, where the first filling mass(es) cover(s) surfaces and fill(s) up even the fine, not easily accessible cavities, while the subsequent injection mass(es) do(es) not have the same ability to penetrate or enter into narrow cavities, but may displace the first injection mass from the larger, easily accessible cavities.

In this way it is contemplated to obtain a high quality filling in cable ducts having a length of, e.g., 20-40 meters and a diameter of 5-10 cm and containing a cable with a diameter of 2-3 cm, with a high volume of larger particles (e.g. having a maximum particle size of 6-10 mm), but with an encasing and filling around the cable of the same high quality as in a pure cement paste filling.

The process is a two- or three-stage injection starting with a cement paste and finishing with concrete (potentially with an inserted string of mortar), where the subsequent injection mass displaces the part of the previous masses which is present in the easily accessible areas where the coarser mass may advance, leaving the less accessible areas filled with fine material (vide FIGS. 42 and 44-46).

Such a process is especially promising with the new DSP materials based on densely packed particles of the size 0.5-100 $\mu$m with the interstices filled with homogeneously arranged and optionally densely packed ultrafine particles which are one to several orders of magnitude smaller than the first-mentioned particles, as these materials have a high quality and show excellent flow properties of the casting masses (even when the concentration of coarse sand and stones is high) and great internal coherence. However, the principles stated above apply in general and are not limited to the above materials.

The basic problem may be illustrated by the simplified structure shown in FIG. 42, wherein a cavity of in a body of solid substance is filled with two different materials by injection.

The reason for using two different materials may be the desire of providing the cavity with specific properties (material I may have specific electrical, chemical, mechanical, thermal, optical or other properties) placed at desired places (e.g. as protecting "coating" between the main filling mass II and the external solid body), or the reason for using two different materials may be process-technical considerations, for example when it is not possible (e.g. for geometrical reasons) to make material II fill area I or when material I aids in the injection of material II (e.g. by changing the conditions for interface flow (reduction of friction or changing of the interface tension) or inhibits the separation of injection mass II by blocking the transportation of mass into the wall material).

The process according to the invention comprises first filling out the total cavity (illustrated by the total cross section I+II) with the first material component (referred to as material I), and subsequently injecting of the second material (material II) displacing part of material I and leaving a filling comprising both of the materials (cf. FIG. 42).

The displacement of material I takes place through contact forces from material II (often in the form of pressure or shear), preferably also aided by other forces (e.g. gravity) such as by upward injection of a duct with a light mass (I) and subsequently injection of a mass (II) with a higher density.

The injection according to the principles of the present invention requires that part of injection mass I originally present in area II is displaced therefrom. In principle, this may be performed by (1) pushing the material forward in the injection direction (which will be the usual manner)
(2) compressing the material in area I (which is, e.g., possible if material I or a substantial part of material I is in gas phase)
(3) transporting the material into or through the solid material in which the cavity is (e.g. by injection into cavities and ducts in bodies of porous materials) or transporting the material into injection mass II (e.g. by dissolving injection material I and injection material II) or by
(4) using a combination of two or more of the above-mentioned methods.

As mentioned above, the injection may be performed in several steps, some of which primarily ensure the filling up, whereas others may primarily serve as aid in the performance.

Of the greatest immediate interest is the injection of prism-shaped or approximately prism-shaped cavities, which are characterized in that their dimension in the longitudinal direction of the prism sides are large compared with the cross dimensions, in multistep injections, wherein the first step(s) ensure(s) a desired filling up of narrow, not easily accessible areas and areas in the immedite vicinity of the walls of the cavities, whereas the last injection step ensures the formation of a composite structure in the readily accessible, often larger part of the cavity comprising a matrix with a dense arrangement of larger particles corresponding to a dense particle packing in accordance with geometrical principles of packing of particles.

Two important geometrical features must be considered when filling up a cavity with a particle material of the highest possible concentration of large particles: the blocking effect and the wall effect.

Figures 49, 50:
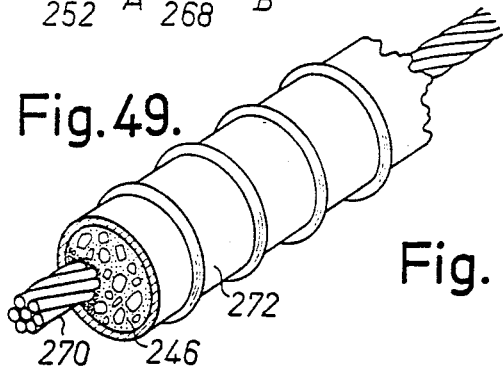
FIG. 49 is a perspective view illustrating the grouting of a duct with a cable used for post-tensioned concrete members.
FIG. 50 is a cross-sectional view of the duct shown in FIG. 49 where fine DSP secures a complete filling of the interstices around the cable.

The blocking effect occurs when areas are present which for geometrical reasons are not accessible to the larger particles, cf. FIGS. 37 and 50. According to the principles of the present invention, these areas are filled with a finer material, which may, from a particle-geometrical principle point of view, be placed in these areas.

The multi-stage aspect of the present invention which, such as mentioned above, is not limited to DSP materials but is quite generally applicable to injection materials, may be expressed as a method for filling cavities in solid bodies with a substance (U) comprising large particles and a substance (V) comprising small particles in such a manner that the substance V only occupies the spaces substantially unaccessible to the substance U, by pre-filling of all parts of the cavity with substance V succeeded by a filling with substance U, the latter substantially replacing substance V from spaces accessible to substance U.

According to a preferred aspect of this method, substance U is a Portland cement-based material. According to a further preferred embodiment, the substance V is a Portland cement-based material. According to a still further embodiment, the substance U is a DSP material, and the substance V is DSP material.

The cavities to be filled may be, e.g., a duct, a channel, or a pipe, or it may be a cavity between surfaces which is filled in accordance with the above-mentioned principle of "casting adjacent to or between surfaces".

The cavities into which the substances are injected may contain additional bodies prior to the injection, such as pre-arranged reinforcement, pre-arranged aggregate, etc. According to an important aspect of this method, the cavity into which the injection is performed contains a bar, a wire, or a cable or several bars, wires, or cables.

METHODS FOR PRODUCING DSP MATERIALS USING A LIQUID VEHICLE TO ASSIST THE SHAPING WITH SUBSEQUENT REPLACEMENT OF THE LIQUID VEHICLE.

The DSP shaping processes are extremely well suited for the shaping of advanced structures (containing particles, fibers, webs, etc.) in desired arrangement by a simple technique such as mixing, casting, extrusion, spray-up, brushing, and filament winding, typically performed at room temperature and without the necessity of using complicated health-conserving measures. This is demonstrated in the present application and in International Patent Application No. PCT/DK79/00047 for many cement/silica/water systems.

A direct transfer of the DSP technique to the shaping under high temperature, e.g., to produce metal- or glass-bound DSP materials, or under health hazard conditions, e.g. to produce plastic-based DSP materials based on monomer/polymer transition, may introduce enormous complications or may even be practically impossible.

An aspect of the present invention permits the production of such materials with full retention of the benefits of the DSP shaping processes and with elimination of almost all of the complications anticipated in the production of, e.g., metal- and glass-bound DSP materials.

This aspect comprises using a liquid vehicle in the shaping process and replacing the vehicle in a subsequent process.

This makes it possible to choose a liquid which is especially suitable for shaping the specific particle structure according to the principles of the DSP materials.

The liquid vehicle may typically be water-based, but also other liquids may be chosen, e.g., if water would exert an undesired influence on the particle system, e.g.

by dissolution or chemical reaction, or if the other liquid chosen results in better rheological behaviour than the water-based liquid.

Also in this aspect of the present application, the shaping may be performed according to any of the shaping principles described in the present specification.

The liquid vehicle may be removed by evaporation or displacement with another liquid as explained in greater detail in the following section "HIGH RESISTANCE, STRONG DSP MATERIALS". The liquid vehicle may to a higher or lesser degree be retained in the final product, e.g., in order to establish a certain rigidity of an intermediate structure prior to the infiltration with the final matrix-shaping liquid. A typical example of this is where the liquid vehicle is water which reacts with an inorganic binder, e.g., Portland cement, present as part of particles B.

The infiltration liquid may, e.g., be a monomer or mixture of monomers which is polymerizable to form a desired plastics matrix, or it may be water (in a case where water could not be used as the liquid vehicle), a liquid metal, sulfur, or glass. The infiltration liquid should preferably be capable of wetting the surfaces of the particles, which is typically obtained by means of surface-active agents. The infiltration may be aided by evacuation prior to the infiltration, pressure and mechanical vibration, including ultrasonic treatment. For articles where the internal structure is not sufficiently rigid per se to resist the forces applied during the infiltration, it is necessary to apply external stabilizing forces, e.g., by enclosure between mold parts, during the infiltration process.

The infiltration liquid liquid may be chosen in such a manner that it results in desired physical and chemical properties, such as:
1. Mechanical strength and rigidity.
2. Ductility.
3. Specific optical properties.
4. Specific thermal properties.
5. Specific electrical properties.
6. Specific chemical properties.

HIGH RESISTANCE, ULTRA STRONG DSP MATERIALS

The use of densely packed fine fibers or whiskers together with ultrafine particles one or more orders of magnitude smaller than the fiber diameter and placed in the voids between the fibers opens possibilities of making new, ultra high strength materials with strongly increased resistance.

The strongest structural material hitherto known are made by embedding a high volume concentration of ultra-strong and rigid fine fibers or whiskers in a matrix with ductile behaviour, typically a metal such as aluminium, cobalt, or silver, or an organic material (various types of plastics). The very fine fibers are whiskers, including $Al_2O_3$ whiskers, graphite whiskers, iron whiskers, boron fibers, silicon carbide whiskers, and glass fibers. The fiber volume may be as high as 50-60% by volume.

The design is based on the fact that the tensile strength of fibers increases with decreasing fiber dimension due to increase of the perfection of the fibers (reduced number of internal flaws). To secure a good load transfer, the fibers are embedded in a matrix with ductile behaviour. Such materials are typically developed to meet the requirements of high performance with high strength/density ratio and high elastic modulus/density ratio required e.g., for application in space vehicles.

The above statements apply to the superior properties of these composites under tensile influence in the direction parallel to the fibers. When the materials are under compression parallel to the fibers, the specimen breaks down by fiber buckling and matrix shear. By mechanical action perpendicular to the direction of the fibers, (tension, compression, abrasion), the specimen breaks down mainly due to matrix shear. Chemical and thermal resistance, including non-flammability, is largely determined by the bulk properties of the matrix material.

In principle, these deficiencies of the above-mentioned types of materials can be diminished, i.e., their properties can be improved, by strengthening and stiffening the matrix. For the matrix material in bulk (that is, without fibers), this can be done, e.g., by incorporation of hard, strong particles, preferably in a high volume concentration.

These principles are, however, not immediately available in connection with the ultra highly fiber-loaded composites discussed above, as introduction of particles would strongly violate the basic requirement for densely arranged ultrafine fibers or whiskers (unless the particles are at least one order of magnitude smaller than the fiber diameter).

It is known to incorporate ultrafine compact-shaped particles (size range from about 5 $\mu$m to about 50 Å) into bulk materials of the kinds used as matrix in the fiber composites.

It is, however, not known to perform this in the type of fiber composite in question, which may be due to great difficulties in the production of such combinations. The usual technique based on infiltrating the fiber arrangement with the matrix as a liquid would not permit incorporation of ultrafine particles by simple suspension of the particles in the liquid as the geometrical fiber arrangement (typically parallelly arranged, densely packed cylindrical fibers) exerts a tremendous infiltration resistance, rejecting even the small 50 Å particles.

The present invention comprises forming the previously described composite structure with extremely densely packed fine fibers or whiskers in a solid matrix (typically metal or plastic) in which—as the new aspect—the matrix material is reinforced with ultrafine solid particles, typically having a particle size of from 5 $\mu$m to 50 Å homogeneously and/or densely arranged in the matrix, without violating the basic principle of dense arrangement of the fibers, and by use of a mechanically simple production process in order to avoid damage of the fibers.

This has been made possible by use of the production technique for DSP materials described in the present application based on shaping the particle structure (here fibers and ultrafine particles) in one of the gentle shaping processes characteristic to manufacture of DSP materials, using a liquid vehicle to assist the shaping processes with subsequent exchange of the liquid vehicle with a liquid generating the matrix of the composite material.

A typical process route is as follows:
1. Shaping the fiber-particle structure assisted by a liquid vehicle, e.g. water containing dispersing agent.
2. The shaping may consist of mixing fibers, ultrafine particles, and the liquid vehicle, and casting the mass by a mechanical shear process such as rolling, pressing, or extrusion.

3. The shaping may consist of advanced fiber placement, typically by filament winding of a single thread or net or web under simultaneous incorporation of vehicle-ultrafine particleslurry, e.g., by performing the winding submerged in the slurry. An example of a structure formed in this manner is shown in FIG. 5.
4. The shaping may be made by spray-up technique where fibers and slurry with ultrafine particles are placed simultaneously.
5. Various types of additives may be used prior to or during the shaping process to protect the fibers and to ensure a good wetting and dispersion.
6. The vehicle liquid is removed from the mass, typically transported from the shaped body in gaseous state achieved by lowering the relative vapour pressure of the liquid vehicle in the surrounding environment by, e.g. heating, evacuation, or chemical or physical absorption of the vapour.
7. The vehicle liquid may also be displaced by means of another liquid, e.g., by capillary action, by dissolution, or by pressure.
8. The volume between the particles occupied by the liquid vehicle may be reduced by chemical reaction of the liquid with the particles.
9. The voids between the particles are filled with the matrix material on a liquid form by infiltration (impregnation), typically as described in the present specification and in the specification of International Patent Application No. PCT/DK79/00047.
10. The liquid is converted into solid state by solidification (typically for metals and glass) or by polymerisation (typically for polymer-forming monomers) controlled by thermal means, by chemical means, or by radioactive means.

This new type of high quality materials made possible by the present invention may, e.g., be used as high performance rotor blades, and as parts of aeroplanes and space vehicles.

This aspect of the present invention may be defined as a shaped article comprising a matrix comprising fibers having a transverse dimension of less than 100 μm and bodies or particles of a size of from about 50 Å to about 0.5 μm homogenously arranged and preferably substantially densely packed in the voids between the fibers, the fiber volume percentage of the matrix being at least 30%. In a preferred embodiment, the fiber volume percentage is at least 40%, preferably at least 50%, more preferably at least 50%, even more preferably at least 60%, and most preferably at least 70%.

According to a particular embodiment, the inter-particle substance (I) of such shaped articles is a metal or a plastics material.

Another aspect of the present invention is a method for producing a shaped article, especially a shaped article comprising a fiber-containing matrix showing any of the above characteristics, but also, quite generally, a shaped article comprising any of DSP matrix, said method comprising using a liquid vehicle in the DSP shaping process and replacing the liquid vehicle with another desired inter-particle substance in one or several stages.

FLY ASH

The preparation of particles A and B and their incorporation into the DSP material are aspects are of great practical significance for fly ash/cement-based DSP materials. The quality of DSP materials is strongly dependent on particle geometry and on the degree of the dispersion of the particles in the fresh materials.

Various methods of preparing the particles A, particles B and additional particles are available, and various methods of preparing the fluid DSP materials are also available. For DSP materials based on Portland cement or similar materials, the ultrafine particles A may typically be produced by precipitation, condensation from a gas phase, or by particle comminution. One important source of ultrafine particles A and fine particles B is fly ash from power stations. The fly ash is developed as a dry powder, typically collected in filters. This material can be combined with the cement and any other constituent of the DSP material as a dry powder or as a mixture containing all of or part of the DSP liquid (typically water plus dispersing agent) or mixed with possible additives and/or sand and/or stone and/or fibers (wet or dry).

The fly ash may be improved for incorporation in DSP materials by adjusting the particle size and the particle size distribution of the fly ash by comminution and/or separation and/or removal of undesired chemical components.

The comminution may be performed by grinding.

Separation to obtain fly ash fractions useful for incorporation in DSP materials may be performed by such methods as sieving, electrofiltering, flotation, techniques utilizing gravity and inertia in liquids (wet separation such as sedimentation or centrifugation) or air separation (such as by means of cyclones). The methods mentioned may be combined in desired sequence.

When the fly ash is to be used in DSP materials, a typical fineness thereof corresponds to a specific surface area (Blaine) of at least 5000 cm$^2$/g, in particular at least 7000 cm$^2$/g and often at least 10,000 cm$^2$/g. When a fly ash fraction of fine particle size has been obtained by a separation technique, the particles thereof are typically substantially spherical, and hence, one aspect of the invention comprises a fly ash fraction having a specific surface area as stated, the particles of the fly ash fraction being substantially spherical.

A fly ash showing these characteristics is a very useful material for preparing DSP materials with cement or cement-like materials. Such fly ash may be shipped or transported by other suitable means, e.g., transport in a pipeline, as a dry powder, as a liquid slurry, in nodulized form, as a press cake or in other forms known from powder technology.

As a general aspect of the present invention, the manufacturing and preparation of ultrafine particles A and particles B for incorporation into DSP materials may be performed by subdivision (comminution) of larger particles (aggregates) or by growth of particles from gaseous or liquid phase (or often as a combination by formation of the ultimate particles, e.g., by precipitation followed by, e.g., a milling process breaking down agglomerates of the ultimate particles formed).

Particle subdivision may be obtained by mechanical means. One way is to prepare a dispersion in a liquid medium involving one of or both of two general principles according to which (a) the solid particles in the liquid medium are broken up (crushed, sheared, or attritioned) between two external surfaces or (b) disruption occurs in the liquid as the result of the mutual attrition between the particles themselves. In either case, the presence of a surface active agent may assist by reducing the breaking stress of the individual particles and/or by preventing re-aggregation.

Another way to achieve subdivision of particles is by similar dry processes. Typical techniques are ball milling, colloid milling, plastic milling (roller mills), sand grinding, and high speed stone milling.

Quite generally, any method known from powder technology may be used for this purpose.

In case of subdivision and mechanical dispersion in a liquid, it is desirable to use a highly viscous liquid base to achieve a high shear stress at moderate rate of shear. Addition of a thickener may be very helpful.

Special types of particle comminution may be used to obtain extremely small particles. One method is particle comminution of the material to be used as source of particles, especially as source of particles of the type A, together with other material which is not to be used as source for the particles A. This other aiding material serves to prevent reaggregation of the fine particles A during the subdivision and dispersing process. The aiding material should either be removed or used in other context in connection with the shaping of the desired bodies. For example, salt milling may be mentioned, where a large amount of salt is ground together with the material to form the particles A. The salt is then typically removed by dissolution. Another new method is freeze grinding where a premix of the material to form the particles A (preferably pre-ground) and a grinding medium in liquid state is frozen and then further ground as a solid.

The particle comminution and dispersion may be achieved or contributed to during processes of mixing, transportation, and/or shaping.

Thus, the fine powder is typically prepared (dispersed) in the liquid to be used in the later shaping process, and preferably also with the dispersing agents to be used in the later processes.

The particle dispersion may take place in connection with the mixing in any combination of the ingredients, e.g., (1) ultrafine particles+liquid
(2) ultrafine particles+liquid+dispersing agent
(3) slurry as mentioned under (1) or (2) together with particles C (typically sand and stone)
(4) ultrafine particles+any other solid particles (B and/or C) with or without dispersing agent (the dispersing agent typically being incorporated as a dry powder in this case).

The dispersion may be achieved or contributed to in connection with the transportation, e.g. by high speed transportation of the fine powder combined with any of the other components in pipes, typically driven by high pressure.

The dispersion may be achieved or contributed to during the shaping process, e.g., extrusion rolling, compression, vibrocompaction, ultrasonically aided compaction, etc.

Especially, high shear processes such as extrusion and rolling are useful. But also the use of intensive vibration and ultrasonic treatment may assist the dispersion.

Other principles are to form particles by growth from gaseous or liquid state using any of the techniques described in the literature.

The production of ultrafine particles (particles A) may require several additional operations:

Particle separation may typically be used to obtain the desired particle size and shape (and in case of the other particles also the desired type of particle (desired chemical, mineralogical, magnetic, structure, etc.)

Any of the usual techniques for particle separation may be used. In many processes where particles are formed by growth in a gas phase, e.g., in the case of fly ash from a combustion process, it is desirable to perform the separation as closely connected to the formation process as possible (to avoid unnecessary agglomeration).

Air separation technique using principles of electrical, thermal or convective forces may typically be used. Thus, the collection of fly ash from, e.g., power plants by use of electrofilters or other filters serially arranged permits the obtainment of fractionated fly ash.

Liquid separation may also be achieved, e.g., using sedimentation techniques, preferably aided by centrifugal techniques (typically ultracentrifugation).

All separation processes may be strongly aided by the use of surface active agents preventing agglomeration and resulting in desired electrical surface charge.

EXAMPLE 1

The materials used in this Example were as follows:

White Portland cement: Specific surface (Blaine) 4380 cm$^2$/g Density (expected) 3.15 g/cm$^3$.

Silica dust: Fine spherical $SiO_2$-rich dust. Specific surface (determined by BET technique) about 250,000 cm$^2$/g, corresponding to an average particle diameter of 0.1$\mu$. Density 2.22 g/cm$^3$.

Bauxite: Refractory grade calcined bauxite, 85% $Al_2O_3$, density 3.32 g/cm$^3$ for sand 0–4 mm, 3.13 g/cm$^3$ for stone 4–10 mm.

Mighty: A so-called concrete superplasticizer, sodium salt of a highly condensed naphthalene sulphonic acid/formaldehyde condensate, of which typically more than 70% consist of molecules containing 7 or more naphthalene nuclei. Density about 1.6 g/cm$^3$. Available either as a solid powder or as an aqueous solution (42% by weight of Mighty, 58% by weight of water).

Water: Common tap water.

Preparation of cylindrical concrete specimens from wet concrete mixed with silica dust/cement binder and calcined bauxite sand and stone:

Concrete specimens were prepared from one 23 liters batch of the following composition:

Silica dust: 3200 g
White Portland cement: 16000 g
Bauxite 4–10 mm: 32750 g
Bauxite 0–4 mm: 10900 g
Mighty (powder): 250 g
Water: 2980 g

Mixing

Coarse aggregate, cement and Mighty powder were dry-mixed in a 50 liter paddle mixer for 5 minutes. Thereafter, the silica dust was admixed, and mixing was continued for 10 minutes. The water was added, and the mixing was continued for approx. 10 minutes.

Fresh Concrete

The concrete was soft and easily workable.

Casting 6 concrete cylinders, diameter 10 cm, height 20 cm, and 2 slabs (40×30×5 cm) were cast at 20° C. The specimens were vibrated for 10–30 seconds on a standard vibrating table (50 Hz).

Curing

Immediately subsequent to casting, the closed molds for the cylinders were submersed in water at 60° C. and cured for 5 days. The slabs were covered with plastic film and cured one day at 20° C. in air after which they were submersed in water at 60° C. and cured for 4 days. After curing, the specimens were demolded and stored in air at 20° C. and approx. 70% relative humidity until testing (testing was performed within a period of 30 days subsequent to the heat treatment).

Testing

Density, sound velocity, dynamic modulus of elasticity, compressive strength and stress/strain curve were determined for the 6 concrete cylinders (stress/strain curves were determined for two specimens only).

In the table below, the test results are shown.

TABLE I

| \multicolumn{5}{c}{Properties of hardened concrete.} | | | | |
|---|---|---|---|---|
| Density | Sound velocity | Dynamic modulus of elasticity | Compressive strength | Static modulus of elasticity |
| 2878 kg/m$^3$ | 6150 m/sec. | 109,000 MPa | 217,5 MPa (standard deviation 6.2 MPa) | 78,000 MPa |

Stress/strain relationship for one of the cylinders is shown in FIG. 1, curve a. In the figure, for comparison, the stress/strain curve (curve c) for a corresponding specimen of normal quality concrete is shown (compressive strength 50.6 MPa) and for a specimen of high quality concrete in accordance with International Patent Application No. PCT/DK79/00047, prepared with the same type of high quality binder as used in the present example, but with normal quartz sand and granite stone (curve b, compressive strength 130 MPa).

EXAMPLE 2

Experiments were made with various concrete superplasticizers in order to determine the water demand to obtain the fluid to plastic consistency of the mass to be cured.

The following types of superplasticizers were used:
Mighty—Vide Example 1.
Lomar-D—A concrete superplasticizer of the same composition as Mighty, produced by Diamond Shamrock Chemical Company, N. Jersey, USA.
Melment—An anionic melamine resin solution.
Betokem—A sulphonic acid formaldehyde condensate based on naphthalene and lignosulphonate
Sikament—A sulphonic acid formaldehyde condensate based on naphthalene In all the series, the following common components were used (with reference to one batch):
Quartz sand 1–4 mm—2763 g
Quartz sand 0,25–1 mm—1380 g
Quartz sand 0–25 mm—693 g
Portland cement—2706 g
Silica dust—645 g The SPT-amounts were determined so that the content of dry matter was at least 82 g per mixture. A somewhat greater dosage was used with Betokem and Sikament.

The following components were different:

| Series 1: | Mighty solution (42%) | 195 g |
|---|---|---|
| | Additional water | 437 g |
| Series 2: | Lomar-D solution (37%) | 221 g |
| | Additional water | 461 g |
| Series 3: | Melment solution (20%) | 410 g |
| | Additional water | 322 g |
| Series 4: | Betokem solution (38%) | 273 g |
| | Additional water | 431 g |
| Series 5: | Sikament solution (42%) | 234 g |
| | Additional water | 464 g |

Mixing

The mixing was performed in a kneading machine with planetary movement, using a mixing blade. The following procedure was followed:

(1) Dry mixing of sand, cement+filler for 5 minutes.
(2) Addition of the major proportion of the water which does not form part of the concrete superplasticizer solution. About 50 ml of the water is kept for later use as rinsing water. Continued mixing for 5 minutes.
(3) Addition of concrete superplasticizer solution with subsequent rinsing of the container with the above-mentioned 50 ml of water to secure that all of the concrete superplasticizer is incorporated in the mixture. Mixing for about 10 minutes.

The water demands, that is, the amount of water used in the various mixes in order to obtain the specified consistency, were ascertained by trial mixing. The water demands appear from Table II below.

The consistency was evaluated by measuring the spreading of a cone of the material formed by pouring the material into a 5 cm high brass cone mould with bottom diameter 10 cm and upper diameter 7.1 cm on a flow table with brass surface for use in testing hydraulic cement (ASTM C 230–368) and removing the mold. The diameter of the material was measured (a) immediately subsequent to removal of the mold, (b) after 10 strokes, and (c) after 20 strokes.

The consistency was considered to be of the desired value for diameters of about 12 cm after 10 strokes and of 14 cm after 20 strokes.

TABLE II

Water demand (including water in the superplasticizer solution) expressed in grams of water per batch and in relation to the total amount of fine powder (cement + silica dust) on a weight basis, the volume of fine powder being the same in all of the mixes (1160 cm$^3$).

| | Water demand | |
|---|---|---|
| Type of plasticizer | gram | weight ratio water/cement + silica dust |
| Mighty | 550 | 0.16 |
| Lomar-D | 550–600 | 0.16–0.18 |
| Melment | 650 | 0.19 |
| Betokem | 550–600 | 0.16–0.18 |
| Sikament | 550–600 | 0.16–0.18 |

Comments on the test results:

The experiments can be compared with the experiments in Example 7 in International Patent Application No. PCT/DK79/00047, series 1, table V. Sand, cement, and silica amounts are the same as in that example, the silica dust and the cement, however, originating from later batches. Another difference is that in Example 7 of International Patent Application No. PCT/DK79/00047, Mighty powder was used and was dissolved immediately prior to mixing, whereas in the present experiment a Mighty solution delivered from the manufacturer was used. It will be noted that the water demand in all cases with high dosage of superplasticizer was low, ranging from 500 g in Example 7 in International Patent Application No. PCT/DK79/00047 to 600–650 g for Melment in the present experiment, corresponding to water/powder ratios of 0.15–0.19 by weight. This is to be compared with 1200 g of water and water/powder ratios of 0.36 in mortar without superplasticizer. It will be noted that there are minor differences between the water demands of the various types of superplasticizer, Mighty being among the best. All of the superplasticizers, however, appear to result in the extremely good flow properties of cement+silica dust binder with very low water content, which are characteristic to the materials of the present invention and of International Patent Application No. PCT/DK79/00047.

EXAMPLE 3

Powder compaction of sand and stone.

The purpose is to evaluate the resistance of various sand and stone materials to deformation on powder compaction, and in particular, to compare natural concrete aggregates with particularly strong and hard materials.

Materials

Quartz sand 0.25–1 mm, quartz sand 1–4 mm, crushed granite 4–8 mm, refractory grade bauxite 0–4 mm, refractory grade bauxite 4–10 mm, silicon carbide 0.5–2 mm (Qual. 10/F PS-K Arendal Smeltevaerk A/S, Ejdenhavn, Norway).

Comments

The individual fractions of particles are relatively uniformly graduated, corresponding to the ratio between the largest and the smallest grain size (particle size) substantially not exceeding 4.

Powder Compaction

Samples of the individual sand and stone fractions were compressed by uniaxial die pressing. The compaction equipment consists of a cylindrical die cylinder open in both ends, and two cylindrical pistons (diameter of the die cylinder 30 mm, powder height on filling about 32 mm and after finished compression 16–23 mm depending upon the type of powder).

Dry materials were poured loosely in the die cylinder. The compaction was performed in an Instron testing machine having constant compaction rate (5 mm/min.) up to a compaction pressure of 350 MPa, whereafter the pressure was released by moving the piston in opposite direction. During the compaction and release, force/displacement curves were plotted.

Results

From the curves of force/displacement, comparisons of compaction pressure to obtain identical "density" was performed for the individual materials. The results appear from Table III below.

TABLE III

Compaction pressure, MPa, as a function of the degree of compaction. The degree of compaction is the ratio between the volume of the particles and the volume of the total powder mass (expressed in another way: 1 - porosity).

| Degree of compaction | Granite 4–8 mm | Quartz 1–4 mm | Quartz 0.25–1 mm | Bauxite 4–10 mm | Bauxite 0–2 mm | Silicon Carbide 0.5–2 mm |
|---|---|---|---|---|---|---|
| 0.70 | 16 | 10 | 24 | 36 | 61 | 48 |
| 0.75 | 29 | 23 | 42 | 61 | 110 | 82 |
| 0.80 | 59 | 43 | 76 | 95 | 194 | 145 |

It will be noted that the compaction pressure to obtain same degree of compaction is considerably higher for the hard materials (bauxite and silicon carbide) than for materials usually used as additives in concrete (granite and quartz).

Comment

The powder compaction technique is suitable for comparing the strength of particles, provided the various particle materials or particle compositions have about the same particle geometry and provided that the particle size is relatively large in comparison with the dimensions of the die cylinder. These conditions have been reasonably fulfilled in the experiments with quartz sand and fine bauxite (in these cases, the particles are compact, rounded and small). In the experiments with granite stone and coarse bauxite, the particle/die ratio was somewhat too large (about 0.2–0.3) for permitting a direct comparison between the results of the test with quartz sand and with fine bauxite. On the other hand, mutual comparison of the two is reasonable. It is difficult to compare the results of the experiments with silicon carbide with the remaining results, considering that this powder material, in contrast to all the other materials, had very sharp edges.

EXAMPLE 4

High Quality Mortar

Two different types of mortar mixes were prepared, both on the basis of low alkali sulphate resistant Portland cement, silica dust, and Mighty, but with different types of sands, namely refractory bauxite and silicon carbide (Qual. 10/F PS-K, Arendal Smeltevaerk A/S, Ejdenhavn, Norway). The purpose was to investigate mechanical properties of mortar made with very strong sand, compare Example 3, and with the very strong silica/cement binder described in International Patent Application No. PCT/DK79/00047. In all the mixes, the following common components were used (with reference to one batch):

Silica dust—645 g
Low alkali sulphate resistant Portland cement—2706 g
42% Mighty solution—195 g For the bauxite mortar, the following components are used:

Bauxite 0–4 mm—6104 g
Water (excluding water in the Mighty solution)—387 g

For mortar with silicon carbide the following components were used:

Silicon carbide—5755 g
Water (excluding water in the Mighty solution)—487 g

The amounts of sand, cement and Mighty used (after volume) are the same as the amounts used in Example 9 in International Patent Application No. PCT/DK79/00047. In the mortar with bauxite, the water amount was also the same as in Example 9 in International Patent Application No. PCT/DK79/00047, whereas the water amount in the mortar with silicon carbide was considerably higher. This was due to the fact that the silicon carbide sand had very sharp edges and therefore required a more easily flowable silica/cement paste and/or a larger amount (by volume) of paste.

For each of the two types of mortar, two batches were prepared, one having the composition as stated above, the other one of double size.

Mixing and Casting

The mixing was performed in a kneading machine with planetary movement, using a mixing blade. The following procedure was followed:

(1) Dry mixing of sand, cement+filler for 5 minutes.
(2) Addition of the major proportion of the water which does not form part of the concrete superplasticizer solution. About 50 ml of the water is kept for later use as rinsing water. Continued mixing for 5 minutes.
(3) Addition of concrete superplasticizer solution with subsequent rinsing of the container with the above-mentioned 50 ml of water to secure that all of the concrete superplasticizer is incorporated in mixture. Mixing for about 10 minutes.

The mortar mixtures behaved like highly viscous fluids and were cast in cylindrical molds (height 20 cm, diameter 10 cm) on a standard vibrating table (50 Hz). The casting time was about 1 minute. The specimens (in closed molds) were cured in water at 80° C. for 4 days.

Testing

Density, sound velocity, dynamic modulus of elasticity, compressive strength and stress/strain curve were determined. The compressive strength and the stress/strain curves were determined on a 500 tons hydraulic press using a rate of stress change of 0.5 MPa per second. The results obtained appear from Table IV:

TABLE IV

Properties of cured mortar evaluated by measurement on cylindric specimens (height 20 cm, diameter 10 cm).

| | Bauxite Mortar | Silicon Carbide Mortar |
|---|---|---|
| Density (kg/m$^3$) | 2853 (6)* | 2640 (6)* |
| Sound velocity m/sec. | 6449 (6)* | 6443 (6)* |
| Dynamic modulus of elasticity MPa | 118600 (6)* | 109600 (6)* |
| Compressive strength and its standard deviaton (MPa) | 248.0 SD 7.7 (6)* | 184.3 SD 5.9 (4)* |

\* = number of tests.

Stress/strain measurements were performed on two specimens from each series. The samples were loaded to about 60% of their rupture of load and were thereafter released, whereafter they were again loaded up to rupture without recording of stress/strain. A few of the samples were loaded and released several times.

The stress/strain curve for the bauxite mortar was practically a straight line throughout the complete measuring range (0–150 or 160 MPa) with a slope (secant) corresponding to a modulus of elasticity of 84300 MPa. On repeated loading and unloading, only insignificant hysteresis was noted.

The stress/strain curves for the mortar with silicon carbide (measuring range 0–100 MPa) bent somewhat with initial slope corresponding to a modulus of elasticity of 86,000 MPa and modulus of elasticity at the pressure of 100 MPa of 72,000 MPa. On repeated loading of 100/120/140/160 MPa, a specimen of the silicon carbide mortar showed marked hysteresis indicating internal structure deterioration.

The compressive strength for mortars with bauxite did not seem to be significantly influenced by pre-loading up to 150–160 MPa, whereas the strength of the mortar with silicon carbide was considerably lower for the samples which have been previously loaded.

The values of the compressive strength for the preloaded specimens of the silicon carbide mortar were, therefore, not included in the results in Table IV.

Comments on the results.

It will be noted that the mortar with bauxite sand is extremely strong and rigid, having compressive strengths of 248 MPa (maximum value for two of the specimens were 254.2 MPa corresponding to a load of more than 200 tons). The rupture proceeded to a large extend through the bauxite sand, indicating the possibility of producing even stronger mortar by utilization of even stronger sand materials.

The compressive strength of the mortar with silicon carbide was considerably lower (184.3 MPa) and is not much higher than for the corresponding mortar containing quartz sand (160–179 MPa, cf. International Patent Application No. PCT/DK79/00047, Example (9) which might seem strange in view of the great hardness and strength of silicon carbide per se. The reason is undoubtedly that the mortar with silicon carbide used considerably more water thn the mortar with bauxite and the mortar with quartz sand referred to in International Patent Application No. PCT/DK79/00047. This results in a considerably weaker binder. The water/powder ratio (total water in relation to cement+silica by weight) was 0.149 for the bauxite or quartz mortars and 0.179 for the silicon carbide mortar. The rupture proceeded to a large extend outside the silicon carbide particles. This, compared with the bended stress/strain curve and the large hysteresis (which is characteristic to brittle materials where the particles are considerably stronger than the matrix) indicate the possibility of obtaining considerably higher strength by improving the matrix. This can be achieved by reducing the water/powder ratio to, e.g., 0.13–0.15, which is possible by using a somewhat coarser silicon carbide sand and/or larger amount of cement and silica.

Additional 16 cylinders of the bauxite mortar have been prepared with the same composition and using the same technique as above with the exception that the bauxite was from a later batch.

The purpose was to examine various mechanical properties. At first, density, sound velocity and dynamic modulus of elasticity were determined on all 16 specimens. As a guidance, the tensile strength was determined on two of the specimens.

The results are shown below.
Density—2857 kg/m$^3$
Sound velocity—6153 m/second
Dynamic modulus of elasticity—108,200 MPa
Compressive strength—
  261.1 MPa
  268.1 MPa Comments on the test results.

The same density as above was found, while sound velocity and dynamic modulus of elasticity were somewhat lower. The reason for this is unknown, but is believed to be due to an error in the determination of the time for travelling of sound impulse (either in the test on page 65 or the test above).

The strength were slightly higher than above. The highest value of 268.1 MPa corresponds to a load of 214.6 tons and a pressure of 2732 kg/cm$^2$.

EXAMPLE 5

High quality bauxite mortar.

A bauxite mortar was prepared having the same composition and using the same technique as mentioned in Example 4 with the exceptions (1) that the bauxite was from a larger supply,
(2) that the size of each batch was twice that applied according to Example 4, and
(3) the specimens were allowed to stand from a few days up to ½ year after heat-curing (four days at 80° C.) in 20° C. at 70° C. relative humidity.

From each of the four batches 4 cylinders (height 20 cm, diameter 10 cm) were cast.

Testing

Density, sound velocity, dynamic modulus of elasticity and stress/strain curve were determined using the technique described in Example 4.

The results appear from below Table V.

TABLE V

Properties of cured bauxite mortar by measurement on cylindrical specimens (height 20 cm, diameter 10 cm).

| | | | | |
|---|---|---|---|---|
| Density kg/m$^3$ | 2857 | SD | 8 | (16) |
| Sound velocity m/sec. | 6153 | SD | 36 | (16) |
| Dynamic modulus of elasticity Mpa | 108156 | SD | 1426 | (16) |
| Compressive strength MPa | 268.3 | SD | 7.5 | (14) |

The stress/strain curve is shown in FIG. 14 together with a similar curve for ordinary concrete normally considered to be of very high quality (compressive strength 72 MPa).

It is seen that the bauxite-cement-silica mortar has a compressive strength (270 MPa) approximately four times higher than that of traditional high quality concrete and a modulus of elasticity (slope of the curve) approx. twice as high.

One of the specimens had a compressive strength of 282.7 MPa and a density of 2861 kg/m$^3$ which corresponds to a stress/density-ratio of 98812 (m/s)$^2$. The load of the cylinder corresponds to the base load of a 10076 meter high prism prepared from the material.

(By way of comparison it may be mentioned that the yield load of high quality structural steel (400 MPa) corresponds to the baseload of a 5200 meter high steel prism.)

EXAMPLE 6

Durability of edge beams.

In tests of the durability of edge beams made for the Danish Highway Department (Vejdirektoratet) it was found that edge beams of DSP materials completely survived a severe frost-thaw test which destroys traditional high quality concrete. As described in "Forsøg med Kantelementer af fiber- og silicabeton, Rapport over forundersøgelser og udførelse", December 1980, Cowiconsult, Denmark, the following test was made:

5 types of concrete were tested of which 3 were DSP concrete (DENSIT TM from Aktieselskabet Aalborg Portland-Cement-Fabrik) and 2 were traditional high quality concrete. 15 edge beams were prepared having dimensions about 1×1×4.5 meters).

Concrete type 1 was a traditional concrete which is today considered applicable for bridge edge beams. The composition of the concrete type 1 was as follows:

Cement—330 kg/m$^3$
Water—125 kg/m$^3$
Sand—760 kg/m$^3$
Stone 4/8 mm—190 kg/m$^3$
Stone 8/16 mm—950 kg/m$^3$
Addition of air (Sika-Aer)—0.4 kg/m$^3$
Plasticizer (Sikament)—3.3 kg/m$^3$
w/c (water/cement)—0.38 kg/m$^3$ Concrete type 2 was a fiber concrete with a fiber content of 1.75 percent/volume. The composition of the concrete type 2 was as follows:

| | | |
|---|---|---|
| Cement | 450 kg/m$^3$ | |
| Fly ash | 180 kg/m$^3$ | |
| Water | 260 kg/m$^3$ | |
| Sand | 745 kg/m$^3$ | |
| Stone 4/8 mm | 320 kg/m$^3$ | |
| Concrete adhesive, (Betoflex-super) | 27 kg/m$^3$ | (approx. 50% dry matter) |
| Fibers | 16 kg/m$^3$ | |
| w/c (water/cement) | approx. 0.60 kg/m$^3$ | |
| w/p (water/powder) | approx. 0.45 kg/m$^3$ | |

Concrete type 3 (1.25% fiber concrete) was a fiber-DSP-concrete with a fiber content of 1.25 percent/volume. The composition of the concrete type 3 was as follows:

| | | |
|---|---|---|
| Cement | 500 kg/m$^3$ | |
| Fly ash | 225 kg/m$^3$ | |
| Silica | 75 kg/m$^3$ | |
| Water | 180 kg/m$^3$ | |
| Sand | 750 kg/m$^3$ | |
| Stone 4/8 mm | 500 kg/m$^3$ | |
| Superplasticizer (Mighty) | 28 kg/m$^3$ | (approx. 42% dry matter) |
| Fibers | 11 kg/m$^3$ | |
| w/c (water/cement) | 0.40 kg/m$^3$ | |
| w/p (water/powder) | 0.25 kg/m$^3$ | |
| (Powder: cement + fly ash + silica) | | |

Concrete type 4 (20% silica concrete) was a DSP concrete with a silica content of 20% of the weight of the cement. The composition of the concrete type 4 was as follows:

| | | |
|---|---|---|
| Cement | 500 kg/m$^3$ | |
| Silica | 100 kg/m$^3$ | |
| Water | 95 kg/m$^3$ | |
| Sand | 670 kg/m$^3$ | |
| Stone 4/8 mm | 370 kg/m$^3$ | |
| Stone 8/18 mm | 730 kg/m$^3$ | |
| Superplasticizer (Mighty) | 32 kg/m$^3$ | (approx. 42% dry matter) |
| w/c (water/cement) | approx. 0.23 kg/m$^3$ | |
| w/p (water/powder) | approx. 0.19 kg/m$^3$ | |

Concrete type 5 was a DSP concrete with a silica content of 50% of the weight of the cement. This amount of silica in relation to the weight of the cement is extreme, and the purpose of testing this concrete type has primarily been to find possible negative effects of such a high addition of silica. The composition of the concrete type 5 was as follows:

| Cement | 220 kg/m³ | |
|---|---|---|
| Silica | 110 kg/m³ | |
| Water | 80 kg/m³ | |
| Sand | 750 kg/m³ | |
| Stone 4/8 mm | 450 kg/m³ | |
| Stone 8/18 | 890 kg/m³ | |
| Addition of air (Sika-Aer) | 0.4 kg/m³ | |
| Superplasticizer (Cem-mix) | 33 kg/m³ | (approx. 42% dry matter) |
| w/c (water/cement) | approx. 0.45 kg/m³ | |
| w/p (water/powder) | approx. 0.30 kg/m³ | |

Cement

Ordinary low alkali sulphate resistant Portland cement PC(A/L/S).

Fly Ash

The fly ash was from the "Fynsvaerket" power plant.

Silica

The silica was from Elkem Spigerverket in Norway (the silica was of the same type as used in the previous example, i.e. with a specific surface of about 250,000 cm²/g and a density of about 2200 kg/m³).

Sand

Holbaek sea gravel. The sand was examined at the State Testing Laboratory and the Danish Technological Institute.

Stone

Dalby granite in the fractions 4/8 mm and 8/18 mm. The stones were examined at the State Testing Laboratory.

Fibers

Krenit®-fibers (polypropylene fibers), length 12 mm, from Jacob Holm Varde A/S, Denmark.

The fibers were made from polypropylene film stretched in a ratio of about 1:17 and fibrillated on a needle roller in analogy with Example 4 in International Patent Application No. PCT/DK79/00047.

Castings of Beams

All the concrete for the beam castings was mixed in a 1200 liters paddle mixer. The dosage of aggregate and cement was performed "manually". The concrete was transported in a concrete bucket from the mixer to the beam mold.

The beams were cast upside down and were thus cast against a mold on all future up-turned and vertical sides. The mold was made of steel. Vibration was established partly by means of a vibration table, on which the molds were placed, and partly by means of a poker vibrator.

During the casting and the whole curing period the beams were wrapped in strong plastic foil to protect them against drying out. They were stored firstly in a casting hall and secondly outdoors during the last part of the casting period.

| Concrete data. | |
|---|---|
| Concrete type 1, ordinary concrete: | Cylinder compressive strength about 65 MN/m² (28 days water storage). |
| Concrete type 2, 2.0% fiber concrete: | Cylinder compressive strength about 25 MN/m² (28 days water storage) |
| Concrete type 3, 1.25% fiber concrete: | Cylinder compressive strength about 80 MN/m² (28 days water storage) |
| Concrete type 4, high strength silica: | Cylinder compressive strength about 130 MN/m² (28 days water storage) |
| Concrete type 5, normal strength silica: | Cylinder compressive strength about 100 MN/m² (28 days water storage) |

Besides, three sawed out prisms having the dimensions 30×30×70 mm were prepared from each concrete type.

Frost-thaw-thawsalt Test

Frost testing and thawsalt strain test were made on three sawed out prisms of 30×30×70 mm according to the following method:

On each of the four long sides of the prisms two 50 mm spaced measuring taps were glued. After water storage for one week the prisms were exposed to the following tests:

(1) 10 minutes in water at 18°–20° C.,
(2) 20 minutes in a saturated solution of NaCl at −15° C., and
(3) items (1) and (2) were repeated.

The lengths of the prisms (the distance between the measuring points) were measured about every 50 cycles.

The total length changes, millimeter per meter (mm/m), of the five concrete types appear from the below table:

TABLE

| Concrete Total length changes | Number of cycles | | |
|---|---|---|---|
| | 96 mm/m | 241 mm/m | 337 mm/m |
| 1 | Cracked after 44 cycles | | |
| 2 | 3.3 | 5.8 | 6.5 |
| 3 | — | — | 0.1 |
| 4 | — | — | 0.2 |
| 5 | — | — | 0.2 |

As appears from the table concrete type 1 (ordinary concrete) was not resistant to the testing and neither was concrete type 2 which, due to the fibers, was still coherent and practically without visible craks. However, some crumbling can be observed in the surface.

Concrete types 3, 4 and 5 were practically unaffected by the tests.

| Test results. |
|---|
| Concrete type 1, ordinary concrete: |
| The concrete showed a very poor resistance to the frost-thaw-thawsalt test as it cracked shortly after. |
| Concrete type 2, fiber concrete: |
| The resistance of the concrete to the frost-thaw-thawsalt test was insufficient but due to the fiber reinforcement the concrete showed a good coherence. |

Concrete type 3, fiber-DSP-concrete with silica, concrete type 4, fiber-DSP-concrete with high strength silica and concrete type 5, fiber-DSP-concrete with normal strength silica were not influenced by the frost-thaw-thawsalt test.

Comments On The Results

The experiments show that the DSP materials (DENSIT ™-concrete Nos. 3, 4 and 5) have a high frost resistance (no deformation at all) in a severe frost/thaw test which destroys ordinary high quality concrete.

Reference is made to the drawing, where like numerals generally designate like parts.

In FIG. 1, which illustrates a typical DSP matrix structure 10, 12 designates substantially densely packed particles B, e.g., Portland cement particles, and 14 designates homogeneously arranged and optionally densely packed particles A, e.g., particles of silica dust homogeneously dispersed in water by means of a concrete superplasticizer, or a coherent unitary structure formed from such particles and from solid inter-particle substance formed by chemical reaction between solutes generating from the cement particles. The system shown in FIG. 1 has typically been established by gentle mechanical means, e.g. by shear or vibration, or simply under the influence of gravity.

In FIG. 2, the particles B (12) comprise larger particles and smaller particles, with gap grading between the particles B. The system of FIG. 2 has typically been established using the same means as described in connection with FIG. 1.

However, in FIGS. 1 and 2, 14 may also designate ultra fine particles which have been homogeneously arranged by means of a surface active agent in accordance with the fluid DSP system establishment processes of the invention, but which are now surrounded by an inter-particle substance which is different from the fluid by means of which the particles were arranged and which has been introduced by exchange of the original fluid by infiltration.

In FIG. 3, compressible bodies 12, e.g. polystyrene spheres constitute the densely packed particles B, and homogeneously arranged or densely packed particles A, tyically rigid small particles surrounded by inter-particle substance, fill the voids between the adjacent densely packed gas bodies B. However, FIG. 3 also illustrates the case where the bodies 12 are compressible bodies of a larger size than the particle B size, and 14 is a solidified DSP paste which, in itself, comprises substantially densely packed particles B with homogeneously arranged and optionally densely packed particles A and inter-particle substance in the voids between the particles B, the DSP paste, hence, having a structure as illustrated in FIG. 1 or FIG. 2.

In FIG. 4, fibers or elongated particles 12 constitute the densely packed bodies B, and homogeneously arranged and optionally densely packed particles A in inter-particle substance fill the voids between the densely packed bodies B. In this case, the dense packing of the bodies B refers to dense packing as obtained by simple mixing and casting with the maximum fiber load limited by the mixing and shaping process only. Also in this case, the inter-particle substance may be a substance which is different from the fluid by means of which the particles were arranged, the inter-particle substance now present being a substance introduced by exchange of the original fluid by infiltration.

In FIG. 5, the densely packed fibers or elongated bodies 12 show a dense packing of bodies B referring to a most efficient manner of establishing dense packing of non-compressible fibers: parallel placing of the elongated bodies or fibers with homogeneously arranged and optionally densely packed particles A in the inter-space between the densely packed bodies B. This structure has been established, e.g., by filament winding of the fibers 12 immersed in a slurry of homogeneously dispersed and optionally densely packed particles A. The structure shown in FIG. 5 is typical of the structure desired in ultra high quality, highly fiber-loaded stress and abrasion resistant materials where the inter-particle fluid between particles A which are, e.g., densely packed microfine metal particles, has been replaced, by infiltration, with a strong inter-particle substance, e.g., a metal or a polymer.

In FIG. 5, Portland cement particles 16 form an open flocculant structure in an aqueous phase in the absence of surface active agents.

FIG. 7 illustrates how such a system will normally show a tendency to sedimentation of the cement particles when the flocculating tendency is eliminated by means of a superplasticizer.

FIG. 8 illustrates, in further enlarged scale, a DSP paste system, e.g. a cement/ultrafine silica system with superplasticizer where the voids between the cement particles 12 are filled with a suspension of ultrafine silica particles 18 which are substantially densely packed in the suspension. 20 designates the inter-particle substance, in this case, e.g. superplasticizer solution. In such a system, the tendency to sedimentation of the particles is minimized due to the extremely slow water flow around the ultrafine particles in accordance with classical hydrodynamics.

FIG. 9 illustrates a fine reinforcing fiber 22 embedded in a DSP matrix 10, e.g., a cement-based DSP matrix. By using such a cement-based DSP matrix instead of ordinary cement paste, the mechanical fixation of the reinforcement is increased even more than the strength, this increase being one or several orders of magnitude. This is because the dimensions of the "roughness" or "wave configuration" of the fiber which are necessary to obtain "mechanical locking" of the fiber in the matrix are reduced one to two orders of magnitude, which also means that in the DSP matrix, it becomes possible to obtain mechanical locking of fibers which are one to two orders of magnitude smaller than the smallest fibers which can be mechanically locked in ordinary cement paste.

FIG. 10 demonstrates the surprising internal coherence of the fresh fluid to plastic cement-based DSP mortar 24 placed on a supporting glass plate 26 under vibration (50 Hz– s) and then kept under flowing tap water (rate of outflow about 4 liters per minute). In this demonstration, the mortar is typically kept under the flowing water for periods of 2–30 minutes without any visible washing out of the components thereof. The mortar was prepared as described in Example 9 of International Patent Application No. PCT/DK79/00047.

FIG. 11 illustrates the repair of a bridge construction 28 in flowing water 30 a river by underwater injection. Between a base structure 34 of ordinary concrete 36 and a foundation 38, erosion cavities 40 had exposed wood piles 32, incurring danger of severe damage of the piles. Easily flowing cement-based DSP paste 24 was pumped through one of drilled holes 42 into the cavity 40. Due to its higher density, the DSP paste displaced water from the cavity 40 and rose into the remaining holes 42, completely filling the cavity and the holes and forming a new cover, also on top of the foundation. All casting was performed under water, and the river flow over the freshly case DSP concrete, which, however, had such a high degree of internal coherence that substantially no washing out occurred.

FIG. 12 illustrates the repair of a wall element 44 of a subwater tunnel under a bay. An easily flowable DSP material 24 was filled into the cavity to be repaired. The cavity had a complicated shape and was heavily reinforced with steel reinforcement 46. The DSP material was introduced from one side through a hose 50 and rose at the other side of and existing concrete wall 36 and filled the cavity between the concrete wall and formwork 48.

FIG. 13 illustrates casting of a lining of high abrasion resistance inside a steel pipe 52 used for transportation of powder (coal). A plastic tube 54 filled with sand 56 was placed in the interior of the pipe and was kept in position by means of bracings 58. A steel fiber-reinforced DSP material 24 based on Portland cement and refractory grade bauxite was poured into the pipe 52 under slight external vibration and completely filled the space between the steel pipe 52 and the inserted plastic tube 54. After curing of the DSP material, the sand was removed, and the plastic tube was pulled out.

FIG. 14 is a stress-strain diagram recorded during compression testing of 10 cm diameter, 20 cm high cylinders of ordinary high quality concrete and DSP mortar with sand consisting of up to 4 mm refractory grade bauxite, respectively. The DSP material was DENSIT-S TM from Aalborg Portland, Aalborg, Denmark.

The compression strengths measured were 72 and 270 MPa, respectively.

FIGS. 15, 16, and 17 illustrate compaction of DSP concrete or mortar in a vessel 62 where a surplus of fluid DSP paste 68 is squeezed out of the mass and flows past aggregates 64 and the passage between a piston 66 and the wall of the vessel 62 as the piston is moved down. Hereby (FIG. 16), the aggregate skeleton is compressed. After compression, the surplus of paste is removed (still with load on the piston). Hereafter, the piston is removed, and the aggregate skeleton expands slightly (elastic spring back), pulling the paste 68 slightly into the voids (a suction) whereby inwardly curved paste/gas interfaces are formed, which, due to surface forces, stabilize the compacted drained material.

FIG. 18 illustrates rolling of a plastic DSP material 68 by means of a pair of rollers 70 of an elastic material with a spacer member 72 inserted between the rollers to form a semi-manufactured plate or sheet of DSP material which may be further shaped.

FIGS. 19 and 20 illustrate the shaping of such a semi-manufacture plate or sheet 74 between halves 76 of a compression mold (which may in themselves be made from a DSP material) to form a tube section 80.

FIG. 21 illustrates the extrusion of a DSP material. From an extruder die 82, an extruded string 84 of DSP material passes a support 86 where electrical components 88, e.g. resistance components, are inserted into the V-shaped extruded string. The string is cut by means of a cutter 90, and the resulting sections 92 are thereafter compressed in a compression mold 76 to form DSP-encapsulated components 94.

Figure 23:
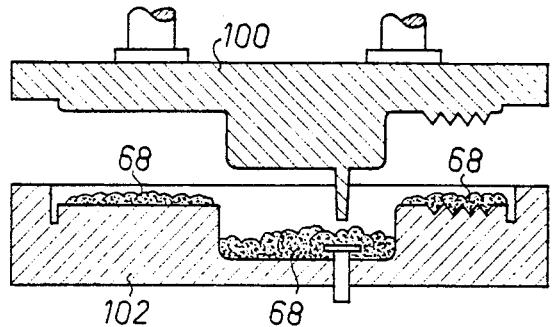

FIG. 22 illustrates compression shaping of DSP material 68 between a lower and an upper mold part 96 and 98, respectively, and FIG. 23 illustrates the compression shaping of a large kitchen table/wash basin element from DSP material 68 in a large mold 100,102.

Figure 24:
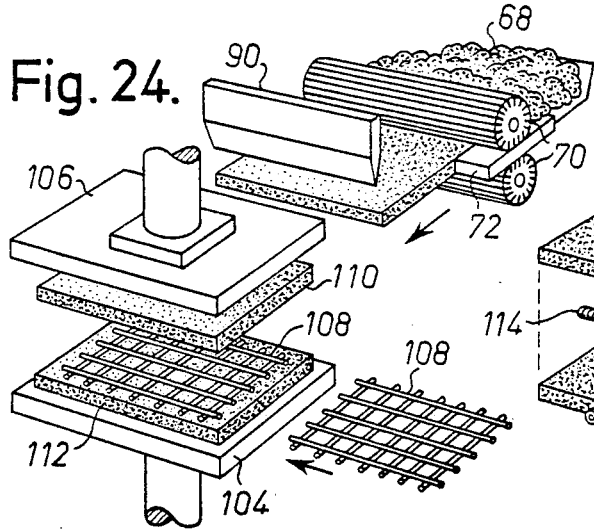
FIG. 24 is a perspective view illustrating the production of panel-shaped reinforced articles, e.g., wall or roof elements, by superimposing rolled panels of DSP.

FIG. 24 illustrates the preparation of a reinforced DSP panel member by compaction of fresh rolled plates 110 and 112 of cement-based DSP on each side of a steel reinforcing grid 108 in a press 104,106.

FIG. 25 illustrates the preparation of a sandwich element of fiber-reinforced DSP material where the fiber orientation in the upper component 110 is perpendicular to the fiber orientation in the lower component 112.

Figure 26:
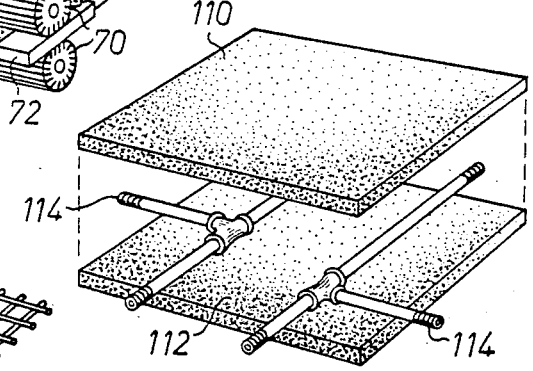
FIG. 26 is a perspective view illustrating the principle of establishing a panel-shaped element from two panels between which sanitary installations or the like are embedded.
Figure 27:
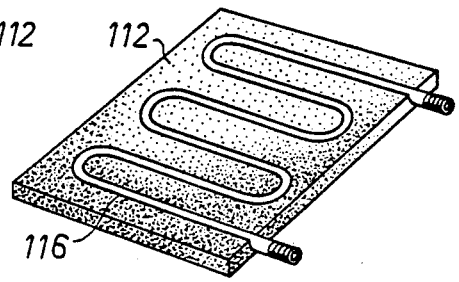
FIG. 27 is a perspective view illustrating the lower element of a similar element as in FIG. 26, but with incorporated tubing for floor heating or electrical installation.

FIGS. 26 and 27 illustrate embedding sanitary tubing 114 or heating tubing 116 in DSP construction elements.

In FIG. 28, a fresh rolled plate cement-based DSP material is cut into bricks or tiles 120 by means of a grid-like cutter.

FIGS. 29–31 illustrate a rolling method which may advantageously be used for forming the DSP-material 68 into plane or contoured board or panels 138. This is method, invented by the present inventor, is described in greater detail in a Danish patent application filed on May 1, 1981 in the name of Aktieselskabet Aalborg Portland-Cement-Fabrik, entitled "Valse og fremgangsmade til valsning af et deformerbart materiale" ("Roller and method for rolling a deformable material"). Each roller comprises a shaft 122 and a body member 128 made from a resilient material in which a number of rod-like members 124 of a stiff material are embedded so as to define a peripheral roller surface 126 which is resistant to bending forces. The outer surface parts or edge portions 130 of the stiff members 124 may be exposed at the peripheral surface 126 of the roller or covered by a thin covering layer, not shown.

A pair of spacer members 72 determining the thickness of the walls or panels 138 to be formed, are arranged between a pair of rollers which are pressed together so as to flatten their peripheral surface part 132 of the rollers defining the nip therebetween. The rollers may have circular cylindrical surfaces as shown in FIG. 29, or be provided with annular ridges 134 and annular grooves 138 for forming corrugated panels or walls as illustrated in FIGS. 30 and 31. One of the rollers in each pair of rollers may also be provided with protrusions 140 for forming spaced holes 142 in the rolled product 138. These holes may, for example, be used for insertion of nails, screws, or other fastening means.

In FIG. 32, a reproduction casting of an archeologically interesting relief 144 placed under flowing water 30 is performed by surrounding the relief 144 with a frame 146 and pouring DSP material into the frame through a hose 50. The DSP material reproduces the surface of the relief to the last detail, and due to its high internal coherence, is not diluted or entrained by the flowing water.

In FIG. 33, a complete archeologically interesting area 148 is reproduced by casting by means of DSP material, utilizing the strength of the DSP material (and optionally the possibility of incorporating reinforcing bodies) for obtaining a much larger cast than is possible with known materials for this purpose.

FIGS. 34–36 illustrate an advantageous method of molding an object from DSP material. This method, invented by the present inventor, is described in greater detail in a Danish patent application filed on May 1, 1981 in the name of Aktieselskabet Aalborg Portland-Cement-Fabrik, entitled "Fremgangsmade og form til formning af en genstand i en formhulhed" ("Method and mold for shaping an article in a mold cavity"). The inner space of a molding container 156 comprising a cylindrical wall 158 with upper and lower flanges 160 and 162 and a bottom part or front piece 154 is divided into an outer mold cavity 164 and a central back-up space 166 by means of a flexible membrane 152 fastened to the container by clamping means 168 and 172. DSP-material 24 may be introduced into the outer mold cavity through an opening 176 via a feeding line 178 by means of a pump 180. A back-up liquid 182 is simultaneously introduced into the central space 166 through an opening 170 via a feeding line 184 by means of a pump 186. The central space 166 communicates with the atmosphere through an upper opening 174. The supply of DSP-material 24 and back-up liquid to a mold cavity 164 and to the central space 166, respectively, is controlled by a control circuit 192 on the basis of signal received from level sensors 188 so as to control the shape of the membrane 152 in a predetermined manner. Air may escape from the mold cavity 164 through venting openings 194.

FIG. 34 illustrates how an extruder die may be molded by means of the molding method illustrated in FIG. 35. In this case, one end of the membrane 152 is fastened to spaced, oppositely arranged wall parts 150.

The molding container 196 shown in FIG. 36 is divided into two halves 198 and 200 having flanges 202 and 204 clamped together by means of bolts 206. A membrane 212 made from a non-elastic, deformable material divides the inner space of the molding container 196 into two mold cavities 208 and 210. DSP-material 24 is simultaneously fed into the mold cavities 208 and 210 through feed conduits 214, 216, and 218 by means a pump 220, and air may escape from the mold cavities through venting openings 222. This molding method permits simultaneous molding of a pair of objects having complementary shaped surface parts determined by the shape of the membrane.

FIG. 37 illustrates barrier effect when a large body or particle 221 close to a wall 223 impedes small particles 18 from entering into the narrow space between the large particle of diameter D and the wall. The size of the space not accessible to the particles 18 is designated f.

FIG. 41 illustrates a duct or cavity 244 which is being filled with DSP grouting 246 containing fibers 248.

FIG. 42 illustrates a section of a long cavity filled with DSP paste 252 and DSP concrete 254. The filling has been performed in two steps, starting with the paste filling the entire volume and followed by injection with DSP concrete substituting the paste in the larger volume, but leaving the narrow fissueres or cavities 250 filled with the paste.

FIG. 43 illustrates wall effect showing particles 258 adjacent to a wall 256. The particle concentration is lower in the narrow space adjacent to the wall than in the bulk. The thickness of the narrow space adjacent to the wall is approximately 1 particle diameter.

Figure 45:
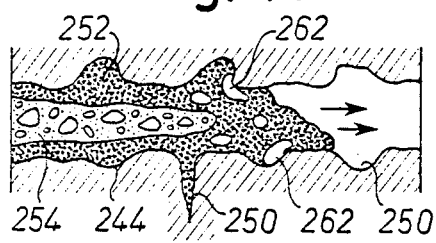
FIG. 45 is a sectional view illustrating the same injection as in FIG. 44, and showing how air in fissures and cavities associated with the channel is entrained with and replaced by the injected fine DSP.
Figure 46:
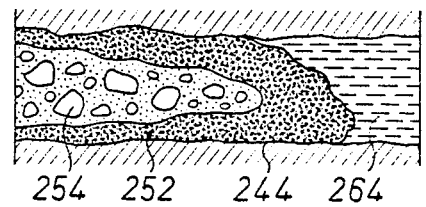
FIG. 46 is a sectional view illustrating injection of a ternary combination comprising first a liquid, then fine DSP, and then a coarse DSP grout.

FIGS. 44 and 45 illustrate the same procedure as FIG. 42. In FIG. 45, air 262 is entrained with the DSP paste and is thereby removed from the irregularities in the cavity wall, so that a perfect filling is obtained. In FIG. 46, the cavity is wetted with liquid 264 which is introduced or present prior to the injection of the DSP paste and DSP concrete.

Figure 47:
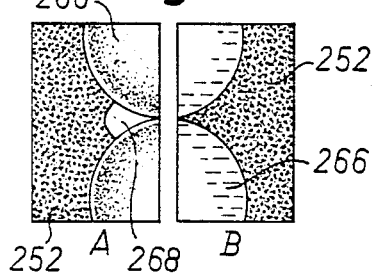
FIG. 47 is a sectional view illustrating how a wetted surface allows a closer packing of DSP in interstices.

FIG. 47 illustrates the wetting of the surface of particles 266 by a liquid 252 in FIG. 47b as a result of treatment of the solid surface, resulting in the creation of liquid spreading, thus displacing the entrapped gas bubble 268.

Figure 48:
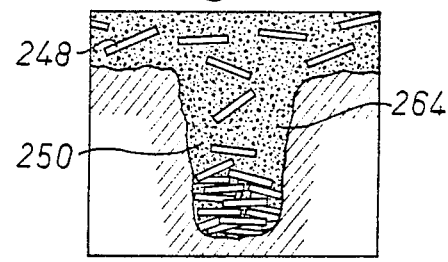
FIG. 48 is a sectional view illustrating the arrangement of particles in a cavity by sedimentation.

FIG. 48 illustrates the sedimentation of rod-shaped particles 248 in a liquid 250. Sedimentation from a liquid with a low concentration of particles or fibers in the absence of surface forces results in a rather dense packing due to the fact that the fibers are allowed to turn freely into horisontal position without interference with settling neighbouring particles.

Figures 51, 52:
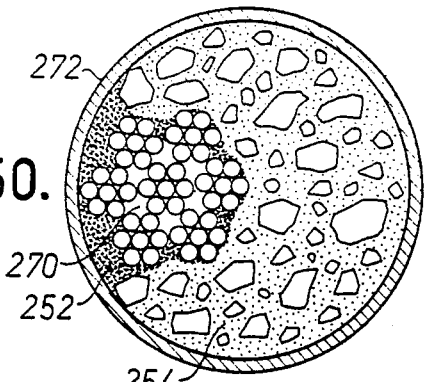
FIGS. 51 and 52 are cross-sections of suitable cable and duct constructions where infiltration is facilitated by means of fins or spacers.

FIGS. 49 and 50 illustrate the injection og DSP paste and mortar into a cable duct 272 with a post-tensioning cable 270 by the two stage injection method according to the invention. The narrow spaces around the cable 270 are filled with the DSP paste, while the bulk is filled with the DSP concrete 254. FIGS. 51 and 52 illustrate spacers 274 which may be used to keep the space arount the cable 270 more accessible to a coarser injection.

Figure 53:
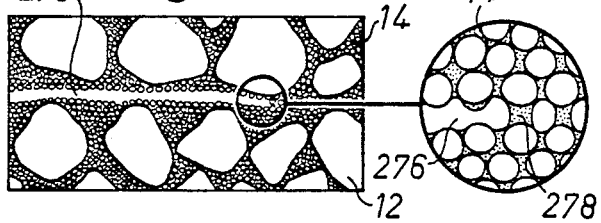
FIGS. 53 and 54 are sectional views illustrating problems associated with peeling of wet DSP paste used as a surface coating material.
Figure 54:
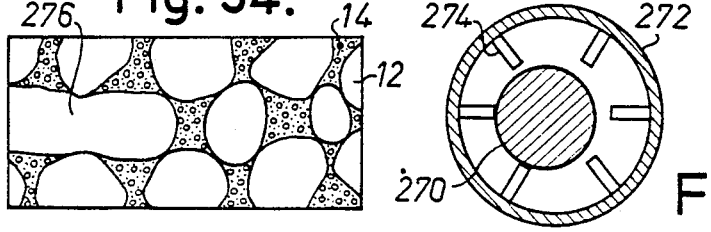

FIGS. 53 and 54 illustrate the opening of a crack in fluid-filled particle materials. An ultrafine crack 276 passes through an ultrafine particle system 14 which is situated in the voids between larger particles 12 (typically particles B). In magnification is shown, at 278, water between the mall particles. In FIG. 54, a broader crack 276 passes through a cement system (particles B (12) containing a dilute slurry with ultrafine particles 14 in the voids. Stabilizing liquid-gas interphases are formed.

FIG. 55 illustrates extrusion of a fiber-supported DSP sheet 280 having tongue- and groove-like edges 282 and 284 and the winding of the sheet on a tube 286 to form a coating 288.

FIG. 56 illustrates the application of an internal layer 24 of DSP material in a pipe 290 by means of a plastic tube 292 which shapes the surface of the DSP coating.

FIGS. 57–62 illustrate preparation of lightweight foam having strong through-going walls of DSP material based on the pressure release shaping of compressibe lightweight bodies in a liquid phase, such as discussed in detail in the section "HIGH QUALITY FOAM". In FIGS. 57–59, hollow bodies such as polystyrene spheres in a liquid, e.g. a DSP fluid, or a suspension of particles A, are compressed by moving a piston 294, thus increasing the pressure. In FIG. 60, the surplus of liquid is drained off. In FIG. 61, the pressure is released (and optionally replaced with vacuum conditions) by moving back the piston after the liquid transport has been stopped (the draining openings have been closed), and the hollow bodies expand and generate a dense regular, controlled structure with narrow "walls" of liquid phase therebetween, such as is illustrated in enlarged scale in FIG. 62.

FIGS. 63 and 64 illustrate controlled placing of lightweight particles or bodies 302 and fibers 22 introduced through tubes 300, 304, and 306, respectively, to form advanced foam type materials.

FIGS. 65 and 66 illustrate the generation of densely packed pores by tensioning elastic bodies 310 arranged in a containing 308 containing a suspension 24 of particles and thereafter releasing the tension.

FIG. 67 illustrates winding of elastic material 316 submerged in a slurry of densely packed particles by rotation around an axis 314.

FIG. 68 illustrate the incorporation of specific particles 320 in the particle A structure in a DSP material.

FIG. 69 illustrates the maximum size of large towers designed to carry their own weight only. Material properties are as indicated in Table A in the section "LARGE STRUCTURES", factor of safety 2.5. The diameter of the top of the tower is 200 m, and the slope at the bottom is 1:1.

The shape of the towers is given by $L = L_c \ln(d_c/d)$ where L is the hight, $L_c$ is a critical length, and d and $d_c$ are the diameter at the height L and at the bottom. ($d_c = 2L_c$) ($L_c = (2\sigma)/(\rho g) \cdot (1/f)$, where the factor of safety $f = 2.5$).

FIGS. 70 and 71 have been discussed in the section "LARGE STRUCTURES".

FIG. 72 illustrates large bridges of maximum size and identical shape made from DSP with refractory grade bauxite (326) and high quality concrete (328).

Figure 73:
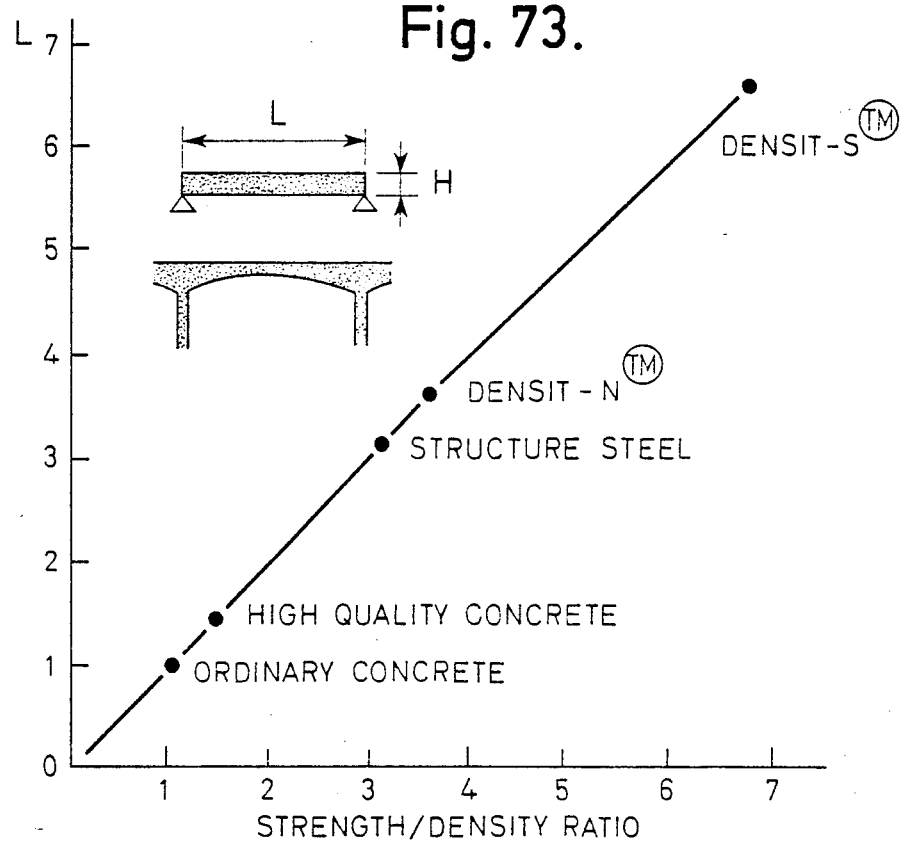
FIG. 73 is a diagram illustrating strength/density ratio of various materials.
Figure 74:
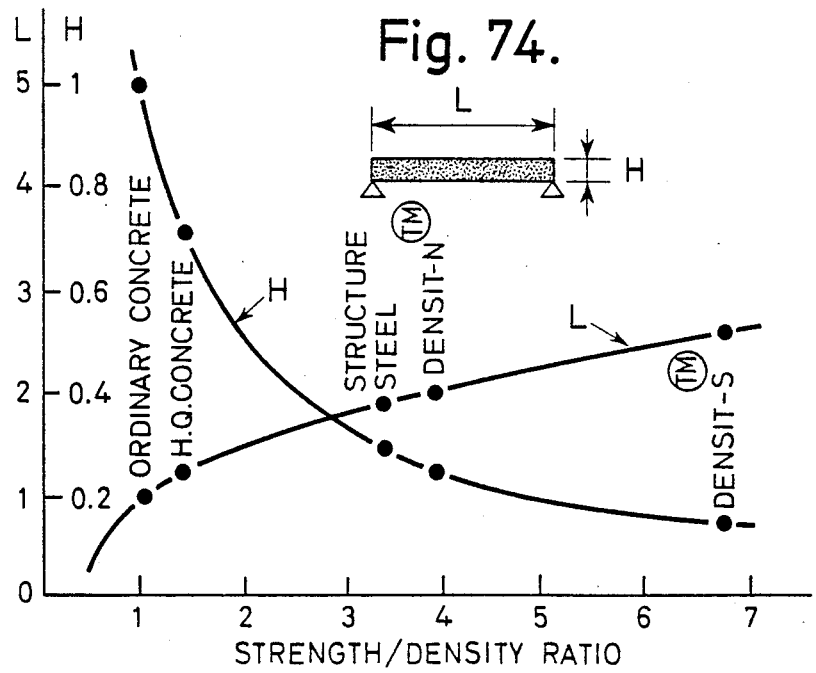
FIG. 74 is a diagram illustrating maximum span related to minimum thickness for various materials.

FIG. 73 is a diagram illustrating the strength/density ratio for large bending members designed to carry their own weight only and showing the maximum span as a function of the stress-density ratio.

FIG. 74 illustrates large bending members designed to carry their own weight only, representing situations in which increased strength-density ratio is utilized to reduce the thickness of the members, but keeping the span constant (H).

FIG. 75 shows prismatic bending members with rectangular cross section and H-shaped cross section, respectively. The arc of a circle $K_1$ defines the maximum radius of curvature R.

Figure 76:
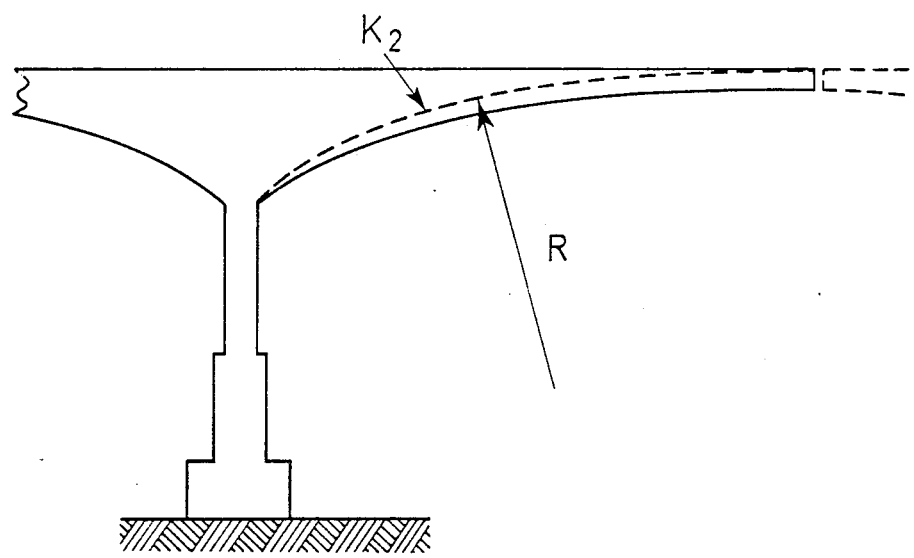
FIG. 76 illustrates part of a bridge span.

FIG. 76 shows half of a bridge span with an arc of a circle $K_2$ defining the maximum radius of curvature.

Aspects of the invention are defined in the appended claims.

I claim:

1. A shaped article comprising a coherent matrix, the matrix comprising
    (A) homogeneously arranged inorganic solid particles of a size of from about 50 Å to about 0.5μ, or a coherent structure formed from such homogeneously arranged particles, and
    (B) densely packed solid particles having a size of the order of 0.5–100μ and being at least one order of magnitude larger than the respective particles stated under (A), or a coherent structure formed from such densely packed particles,
    the particles A or the coherent structure formed therefrom being homogeneously distributed in the void volume between the particles B,
    the dense packing being substantially a packing corresponding to the one obtainable by gentle mechanical influence on a system of geometrically equally shaped large particles in which locking surface forces do not have any significant effect,
    and a surface active dispersing agent effective to secure the homogeneous distribution of particles A and being present in an amount sufficient to secure the homogeneous distribution of particles A, the shaped article additionally comprising embedded in the matrix,
    (C) compact-shaped solid particles of a material having a strength exceeding that of ordinary sand and stone used for ordinary concrete, typically a strength corresponding to at least one of the following criteria:
        (1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm),
        (2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
        (3) a Moh's hardness (referring to the mineral constituting the particles) exceeding 7 and
        (4) a Knoop indentor hardness (referring to the mineral constituting the particles) exceeding 800, said particles having a size of 100μ–0.1 m, and optionally
    (D) additional bodies which have at least one dimension which is at least one order of magnitude larger than the particles A,
    whereby, when the shaped article is not selected from the group consisting of in situ cast oil well walls; duct fillings; fissure fillings; sheets; panels and tiles of thin-walled plane or corrugated shape; anti-corrosion protecting covers applied on steel and concrete members; pipes; tubes; electrically insulating members; nuclear shieldings; seafloor structures for deep water application; brake linings; abrasion aggregates; machine parts; sculptures; and containers; the following provisos apply:
        (1) when additional bodies D are not present or are present and consist of sand and/or stone, at least 20% by weight of the particles B are Portland cement, and further
        (2) when the particles B do not have a molecular structure different from the molecular structure of the particles A, the shaped article is selected from the group consisting of articles produced by shaping in a low stress field of less than 5 kg/cm$^2$, preferably less than 100 g/cm$^2$, articles having at least one dimension of at least one meter and having a minimum cross section of at least 0.1 m$^2$, and articles having a complex shape that does not permit its establishment by powder compaction.

2. A shaped article as claimed in claim 1 in which the particles C are densely packed, the dense packing being substantially a packing corresponding to the one obtainable by gentle mechanical influence on a system of geometrically equally shaped large particles in which locking surface forces do not have any significant effect.

3. A shaped article as claimed in claim 1 or 2 in which the particles A are densely packed, or the coherent unitary structure A is formed from such densely packed particles.

4. A shaped article in either of claims 1, 2 or 3 which contains additional bodies D which have at least one dimension which is at least one order of magnitude larger than the particles A, said additional bodies being bodies of a solid, a gas, or a liquid.

5. A shaped article as claimed in claim 4 in which the additional bodies are selected from the group consisting of compact-shaped bodies, plate-shaped bodies, and elongated bodies.

6. A shaped article as claimed in claim 5 in which the additional bodies are selected from the group consisting of sand, stone, polystyrene, expanded clay, hollow glass bodies, expanded shale, natural light weight aggregate, gas bubbles, metal bars, fibers, whiskers, and hydrogen-rich components other than polystyrene.

7. A shaped article according to claim 5 in which the additional bodies D are inherently weak solid bodies of such strength and rigidity that they would be deformed or crushed to a substantial extent under stresses larger than 5 kg/cm$^2$ applied to a powder mass consisting of the particles, which particles have retained their geometric identity during the shaping process.

8. A shaped article as claimed in claim 5 in which the additional bodies D are densely packed.

9. A shaped article as claimed in claim 1 in which the particles B are particles which cure by partial dissolution in a liquid, chemical reaction in the dissolved phase, and precipitation of a reaction product.

10. A shaped article as claimed in claim 9 in which the particles A are particles which cure by partial dissolution in a liquid, chemical reaction in the solution, and precipitation of a reaction product.

11. A shaped article as claimed in claim 10 in which the particles A show a substantially lower reactivity than the particles B, or substantially no reactivity.

12. A shaped article as claimed in claim 9 in which the particles B comprise at least 50% by weight of Portland cement particles.

13. A shaped article as claimed in claim 12 in which the particles B comprise particles selected from fine sand, fly ash and fine chalk.

14. A shaped article as claimed in claim 12 in which the particles A are particles of silica dust having a specific surface area of about 50,000–2,000,000 $cm^2/g$.

15. A shaped article according to claim 14 in which the silica dust particles are present in a volume which is about 0.1–50% by volume of the total volume of the particles A+B.

16. A shaped article as claimed in claim 1 in which the particles C consist of materials containing strong natural minerals, strong artificial minerals, and strong metals and alloys, the strength of the particles corresponding to at least one of the following criteria:
   (1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially now exceeding 4 mm),
   (2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
   (3) a Moh's hardness (referring to the mineral constituting the particles) exceeding 7,
   (4) a Knoop indentor hardness (referring to the mineral constituting the particles) exceeding 800.

17. A shaped article as claimed in claim 16 in which the particles C consist of one or more of the following components: topaz, lawsonite, diamond, corundum, phenacite, spinel, beryl, chrysoberyl, tourmaline, granite, andalusite, staurolite, zircon, boron carbide, tungsten carbide, refractory grade bauxite.

18. A shaped article as claimed in claim 17 in which the particles C consist of refractory grade bauxite.

19. A shaped article as claimed claim 1 in which the particles C are present in a volume which is about 10–90% by volume of the total volume of the particles A, B, and C.

20. A shaped article as claimed in claim 1 which contains sand and stone as additional bodies D.

21. A shaped article as claimed in claim 1 which contains fibers as additional bodies D.

22. A shaped article as claimed in claim 21 in which the fibers are selected from the group consisting of metal fibers, mineral fibers, glass fibers, asbestos fibers, high temperature fibers, carbon fibers, and organic fibers.

23. A shaped article as claimed in claim 22 in which the fibers are chopped fibers, or continuous fibers or yarns or ropes, or rovings or staple fibers, or fiber nets or webs.

24. A shaped article as claimed in claim 1 which additionally contains reinforcing steel as bars or rods.

25. A shaped article as claimed in either of claims 23 or 24 in which the bars, rods, or fibers are pre-stressed.

26. An article as claimed in either of claims 23 or 24 in which the additional bodies (fibers, bars, or rods) have retained their geometric identity during the shaping process.

27. An article as claimed in claim 1 which article is a sheet or panel of thin-walled plane or corrugated shape; a pipe; a tube; a refractory lining or a refractory lining component; a protecting cover; a roofing material; an electrically-insulating member; a nuclear shielding; a seafloor structure for deep water applications; a brake lining; an abrasion aggregate; a container; an in situ cast oil well wall; a load-bearing member in structural engineering; a machine part; or a sculpture.

28. An article as claimed in claim 27 in which the matrix thereof is fiber reinforced.

29. A composite material for producing a shaped article, comprising
   (A) inorganic particles of a size of from about 50 Å to about $0.5\mu$,
   (B) solid particles having a size of the order of $0.5$–$100\mu$, and being at least one order of magnitude larger than the respective particles stated under (A), and
   (C) compact-shaped solid particles of a material having a strength exceeding that of ordinary sand and stone used for ordinary concrete, typically a strength corresponding to at least one of the following criteria:
      (1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm),
      (2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
      (3) a Moh's hardness (referring to the mineral constituting the particles) exceeding 7 and
      (4) a Knoop indentor hardness (referring to the mineral constituting the particles) exceeding 800, said particles having a size of $100\mu$–0.1 m, a liquid, and a surface-active dispersing agent,
the amount of particles B substantially corresponding to dense packing thereof in the composite material with homogeneously packed particles A in the voids between particles B, the amount of liquid substantially corresponding to the amount necessary to fill out the voids between particles A and B, and the amount of dispersing agent being sufficient to impart to the composite material a fluid to plastic consistency in a low stress field of less than 5 $kg/cm^2$,
and optionally (D) additional bodies which have at least one dimension which is at least one order of magnitude larger than the particles (A), with the proviso that when additional bodies D are not present or are present and consist of sand and/or stone, at least 20% by weight of the particles B are Portland cement particles.

30. A composite material for producing a shaped article, comprising
(A) inorganic particles of a size of from about 50 Å to about 0.5μ,
(B) solid particles having a size of the order of 0.5–100μ, and being at least one order of magnitude larger than the respective particles stated under (A),
(C) compact-shaped solid particles of a material having a strength exceeding that of ordinary sand and stone used for ordinary concrete, typically a strength corresponding to at least one of the following criteria:
  (1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm),
  (2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
  (3) a Moh's hardness (referring to the mineral constituting the particles) exceeding 7 and
  (4) a Knoop indentor hardness (referring to the mineral constituting the particles) exceeding 800, said particles having a size of 100μ–0.1 m, and a surface-active dispersing agent, the amount of particles B substantially corresponding to dense packing thereof in the composite material with homogeneously packed particles A in the voids between particles B, and the amount of dispersing agent being sufficient to impart to the composite material a fluid to plastic consistency in a low stress field of less than 5 kg/cm², when an amount of liquid substantially corresponding to the amount necessary to fill out the voids between particles A and B has been added, and optionally
(D) additional bodies which have at least one dimension which is at least one order of magnitude larger than the particles (A), with the proviso that when additional bodies D are not present or are present and consist of sand and/or stone, at least 20% by weight of the particles B are Portland cement particles.

31. A composite material as claimed in claim 29 or 30 in which the particles A are present in a volume substantially corresponding to dense packing to fill the voids between the particles B when densely packed, and the surface-active dispersing agent is present in an amount sufficient to allow dense packing of the particles A in a low stress field of less than 5 kg/cm².

32. A composite material as claimed in claim either of the claims 29 or 30 the dispersing agent is present in an amount which substantially corresponds to the amount which will fully occupy the surface of the particles A.

33. A composite material as claimed in either of the claims 29 or 30 in which the particles A are silica dust particles having a specific surface area of about 50,000–2,000,000 cm²/g, the particles B comprise at least 50% by weight of Portland cement, and the dispersing agent is a concrete superplasticiser.

34. A composite material as claimed in either of the claims 29 or 30 in which the particles C are present in a volume substantially corresponding to dense packing between the particles C, the dense packing being substantially a packing corresponding to the one obtainable by gentle mechanical influence on a system of geometrically equally shaped large particles in which locking surface forces do not have any significant effect.

35. A composite material as claimed in claim 33 in which the particles B comprise particles selected from fine sand, fly ash, fine chalk, and fine refractory grade bauxite.

36. A composite material as claimed in claim 33 in which the concrete superplasticiser is an alkali or alkaline earth metal salt of a highly condensed naphthalene sulphonic acid/formaldehyde condensate, of which typically more than 70 percent consist of molecules containing 7 or more naphthalene nuclei.

37. A composite material as claimed in claim 36 in which the alkali or alkaline earth metal salt is a sodium or calcium salt.

38. A composite material as claimed in claim 36 in which the amount of the superplasticiser dry matter is in the range of 1–4, percent, calculated on the total weight of the Portland cement and the silica dust.

39. A composite material as claimed in either of the claims 37 or 38 in which the liquid is water to a weight ratio between water and Portland cement and any other particles B plus silica dust of 0.12 to 0.30.

40. A composite material as claimed in either of claims 30 or 31 in which the particles C consist of materials containing strong natural minerals, strong artificial minerals, and strong metals and alloys, the strength of the particles corresponding to
  (1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm),
  (2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
  (3) a Moh's hardness (referring to the mineral constituting the particles) exceeding 7,
  (4) a Knoop indentor hardness (referring to the mineral constituting the particles) exceeding 800.

41. A composite material as claimed in claim 40 in which the particles C consist of one or more of the following components: topaz, lawsonite, diamond, corundum, phenacite, spinel, beryl, chrysoberyl, tourmaline, granite, andalusite, staurolite, zircon, boron carbide, tungsten carbide, refractory grade bauxite.

42. A composite material as claimed in claim 41 in which the particles C consist of refractory grade bauxite.

43. Shaped articles produced from the composite material claimed in either of the claims 29 or 30.

44. A process for preparing a shaped article selected from the group consisting of in situ cast oil well walls; duct fillings; fissure fillings; sheets; panels and tiles of thin-walled plane or corrugated shape; corrosion protecting covers applied on steel and concrete members; pipes; tubes; electrically insulating members; nuclear shieldings; seafloor structures for deep water application; brake linings; abrasion aggregates; containers; machine parts; and sculptures; comprising combining (A) inorganic solids particles of a size of from about 50 Å to about 0.5μ, and (B) solid particles having a size of the order of 0.5–100μ and being at least one order of magnitude larger than the respective particles stated under (A), (C) compact-shaped solid particles of a material having a strength exceeding that of ordinary sand and stone used for ordinary concrete, typically a strength corresponding to at least one of the following criteria:

(1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm), (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), (3) a Moh's hardness (referring to the mineral constituting the particles) exceeding 7 and (4) a Knoop indentor hardness (referring to the mineral constituting the particles) exceeding 800, said particles having a size of 100 μ–0.1 m, a liquid, and a surface-active dispersing agent, the amount of particles B substantially corresponding to dense packing thereof in the composite material with homogeneously packed particles A in the voids between particles B, the amount of liquid substantially corresponding to the amount necessary to fill out the voids between particles A and B, and the amount of dispersing agent being sufficient to impart to the composite material a fluid to plastic consistency in a low stress field of less than 5 kg/cm², and optionally (D) additional bodies which have at least one dimension which is one order of magnitude larger than the particles A, by mechanically mixing the particles A, the liquid, and the surface active dispersing agent, optionally together with particles B, particles C and/or additional bodies D until a viscous to plastic mass has been obtained, and therfter, if necessary or if desired, respectively, combining the resulting mass with particles and/or bodies of the type mentioned above (B, C, D) by mechanical means to obtain the desired distribution of the components and finally casting the resulting mass in the desired shape in a stress field optionally with incorporation of particles C and/or additional bodies D during the casting.

45. A shaped article comprising a matrix which comprises a Portland cement-based binder and compact-shaped solid particles having a size of 100μ–0.1 m embedded in the matrix, the article having a compressive strength of more than 150 MPa measured on a test specimen having a diameter of 10 cm and a height of 20 cm, when the largest of the compact-shaped bodies is larger than 4 mm, and more than 180 MPa, measured on a test specimen having a diameter of 3 cm and a height of 6 cm, when the largest of the compact-shaped bodies is at most 4 mm, with the proviso that the shaped article has at least one dimension which is at least one meter and a cross section of at least 0.1 m², and/or has a complex shape which does not permit its establishment by powder compaction.

46. A shaped article comprising a coherent matrix, the matrix comprising (A) homogeneously arranged inorganic solid particles of a size of from about 50 Å to about 0.5μ, or a coherent structure formed from such homogeneously arranged particles, and (B) densely packed solid particles having a size of the order of 0.5–100μ and being at least one order of magnitude larger than the respective particles stated under (A), or a coherent structure formed from such densely packed particles, the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect, and optionally (D) additional bodies which have at least one dimension which is at least one order of magnitude larger than the particles A, the article additionally comprising a surface layer or surface layers which has (have) a substantially uniform thickness and a structure which is different from the above-defined structure adjacent to the surface layer or layers.

47. An article as claimed in claim 46 which comprises the structure constituted by the particles A, B and optionally the additional bodies D is arranged between surface layers which have a substantially uniform thickness and which are of a material different from the matrix constituted by the particles A and B.

48. An article as claimed in claim 46 or 47 in which the structure covered by surface or surfaces comprises a coherent matrix, the matrix comprising (A) homogeneously arranged inorganic solid particles of a size of from about 50 Å to about 0.5μ, or a coherent structure formed from such homogeneously arranged particles, and (B) densely packed solid particles having a size of the order of 0.5–100μ and being at least one order of magnitude larger than the respective particles stated under (A), or a coherent structure formed from such densely packed particles, the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect, and additionally comprises, embedded in the matrix, (C) compact-shaped solid particles of a material having a strength exceeding that of ordinary sand and stone used for ordinary concrete, typically a strength corresponding to at least one of the following criteria:

(1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm), (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), (3) a Moh's hardness (referring to the mineral constituting the particles) exceeding 7 and (4) a Knoop indentor hardness (referring to the mineral constituting the particles) exceeding 800, said particles having a size of 100μ–0.1 m, and optionally (D) additional bodies which have at least one dimension which is at least one order of magnitude larger than the particles A.

49. An article as claimed in claim 46 in which the material constituting a surface layer is selected from the group consisting of glass; ceramics; plastic; metals; wood; paper; leather; cement mortar; concrete; fiber reinforced cement materials; and materials with a matrix according to claim 1.

50. An article as claimed in either of the claims 46 or 49 which is an electrical insulating member, a piece of furniture, a bookshelf, a door, a strongbox or a part thereof, a container for radioactive material, a sculpture, a load-bearing member, a ship hull, a tube or line, or a chimney.

51. A shaped article comprising a coherent matrix, the matrix comprising (A) homogeneously arranged bodies of a size of from about 50 Å to about 0.5μ, or a coherent structure formed from such homogeneously arranged particles, and (B) densely packed bodies having a size of the order of 0.5–100μ and being at least one order of magnitude larger than the respective particles stated under (A), or a coherent structure formed from such densely packed particles, the bodies A or the coherent structure formed therefrom being homogeneously distributed in the void volume between the bodies B, the dense packing being substantially a packing corresponding to the one obtainable by gentle mechanical influence on a system of geometrically equally shaped large particles in which locking surface forces do not have any significant effect, the shaped article optionally additionally comprising, embedded in the matrix, (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm), (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), (3) a Moh's hardness (referring to the mineral constituting the particles) exceeding 7 and (4) a Knoop indentor hardness (referring to the mineral constituting the particles) exceeding 800, said particles having a size of 100μ–0.1 m, and optionally (D) additional bodies which have at least one dimension which is at least one order of magnitude larger than the particles A, the bodies A and B being bodies of a gas, a liquid, or a solid.

52. A shaped article comprising a matrix comprising fibers having a transverse dimension of less than 100 μm and bodies or particles of a size of from about 50 Å to about 0.5 μm homogeneously arranged and substantially densely packed in the voids between the fibers, the fiber volume percentage of the matrix being at least 30%.

53. A shaped article according to claim 52 wherein the fiber volume is at least 40%.

54. A shaped article according to claim 52 or 53 wherein the inter-particle substance is a metal or plastics material.

55. A cast which consists of a material comprising (A) homogeneously arranged inorganic solid particles of a size of from about 50 Å to about 0.5μ, or a coherent structure formed from such homogeneously arranged particles, and (B) densely packed solid particles having a size of the order of 0.5–100μ and being at least one order of magnitude lrger than the respective particles stated under (A), or a coherent structure formed from such densely packed particles, the particles A or the coherent structure formed therefrom being homogeneously distributed in the void volume between the particles B, the dense packing being substantially a packing corresponding to the one obtainable by gentle mechanical influence on a system of geometrically equally shaped large particles in which locking surface forces do not have any significant effect, and optionally additionally comprising, embedded in the matrix, (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm), (2) a compressive strength of a composite material with the particles embedded in a specified matrix exceeding 170 MPa (in case of a substantial amount of the particles being larger than 4 mm)

and 200 MPa (in case of substantially all particles being smaller than 4 mm),
(3) a Moh's hardness (referring to the mineral constituting the particles) exceeding 7 and
(4) a Knoop indentor hardness (referring to the mineral constituting the particles) exceeding 800,
said particles having a size of 100μ–0.1 m,
and optionally
(D) additional bodies which have at least one dimension which is at least one order of magnitude larger than the particles A.

56. A coating composition comprising a material comprising
(A) homogeneously arranged inorganic solid particles of a size of from about 50 Å to about 0.5μ, or a coherent structure formed from such homogeneously arranged particles, and
(B) densely packed solid particles having a size of the order of 0.5–100μ and being at least one order of magnitude larger than the respective particles stated under (A), or a coherent structure formed from such densely packed particles,
the particles A or the coherent structure formed therefrom being homogeneously distributed in the void volume between the particles B,
the dense packing being substantially a packing corresponding to the one obtainable by gentle mechanical influence on a system of geometrically equally shaped large particles in which locking surface forces do not have any significant effect,
and additionally comprising, embedded in the matrix,
(C) compact-shaped solid particles of a material having a strength exceeding that of ordinary sand and stone used for ordinary concrete, typically a strength corresponding to at least one of the following criteria:
(1) a die pressure of above 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm),
(2) a compressive strength of a composite material with the particles embedded in a specified matrix exceeding 170 MPa (in case of a substantial amount of the particles being larger than 4 mm) and 200 MPa (in case of substantially all particles being smaller than 4 mm),
(3) a Moh's hardness (referring to the mineral constituting the particles) exceeding 7 and
(4) a Knoop indentor hardness (referring to the mineral constituting the particles) exceeding 800,
said particles having a size of 100μ–0.1 m,
and optionally
(D) additional bodies which have at least one dimension which is at least one order of magnitude larger than the particles A.

57. A coating composition according to claim 56 in which the matrix comprises components improving the attachment of the coating to the substrate on which the coating is applied, said components comprising long and or tangled molecules of high molecular weight selected from the group consisting of ionic polymers, silica in polymeric form, polycarboxylates and chains of dentin collagen.

58. A shaped article according to claim 14 in which the silica dust particles have a specific surface area of about 250,000 $cm^2/g$.

59. A shaped article according to claim 15 in which the silica dust particles are present in about 5–50% of the total volume of the particles A+B.

60. A shaped article according to claim 59 in which the silica dust particles are present in about 10–30% of the total volume of the particles A+B.

61. A shaped article according to claim 33 in which the silica dust particles have a specific surface area of about 250,000 $cm^2/g$.

* * * * *

UNITED STATES PATENT AND TRADEMARK OFFICE
CERTIFICATE OF CORRECTION

PATENT NO. : 4,588,443

DATED : May 13, 1986

INVENTOR(S) : Hans H. Bache, Hjallerup, Denmark

It is certified that error appears in the above-identified patent and that said Letters Patent is hereby corrected as shown below:

On the Title page, Item [73] "assignee: Aktieselskabet Aalborg Pottland-Cement-Fabrik, Aalborg, Denmark" should read --Assignee: Aktieselskabet Aalborg Portland-Cement-Fabrik, Aalborg, Denmark--.

Column 9, line 64: "solidifed" should read --solidified--.

Column 18, line 41: "wass" should read --was--.

Column 38, line 46: "obtaine" should read --obtained--.

Column 84, line 36: "thn" should read --than--.

Column 88, line 49: "craks" should read --cracks--.

Signed and Sealed this

Tenth Day of February, 1987

Attest:

DONALD J. QUIGG

Attesting Officer

Commissioner of Patents and Trademarks